(12) United States Patent
Kindo

(10) Patent No.: US 9,307,065 B2
(45) Date of Patent: Apr. 5, 2016

(54) METHOD AND APPARATUS FOR PROCESSING E-MAIL AND OUTGOING CALLS

(75) Inventor: Tsuyoshi Kindo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/500,984

(22) PCT Filed: Oct. 6, 2010

(86) PCT No.: PCT/JP2010/005997
§ 371 (c)(1),
(2), (4) Date: Apr. 9, 2012

(87) PCT Pub. No.: WO2011/043072
PCT Pub. Date: Apr. 14, 2011

(65) Prior Publication Data
US 2012/0196583 A1    Aug. 2, 2012

(30) Foreign Application Priority Data

Oct. 9, 2009  (JP) ................. 2009-234777
Oct. 9, 2009  (JP) ................. 2009-234778
Oct. 9, 2009  (JP) ................. 2009-234779

(51) Int. Cl.
*H04M 1/00*    (2006.01)
*H04M 1/60*    (2006.01)
(Continued)

(52) U.S. Cl.
CPC ...... *H04M 1/6091* (2013.01); *H04M 1/274516* (2013.01); *H04M 1/663* (2013.01); *H04M 1/72552* (2013.01); *H04M 2250/02* (2013.01)

(58) Field of Classification Search
CPC ............ H04M 1/6033; H04M 1/6041; H04M 1/6075; H04M 1/6083; H04M 1/6091; H04M 2250/02; H04M 1/274516; H04M 1/72547; H04M 1/72552
USPC .............. 455/345, 346, 466, 566, 567, 569.1, 455/569.2, 575.9
See application file for complete search history.

(56) References Cited

U.S. PATENT DOCUMENTS 6,407,325 B2 *  6/2002  Yi et al. ............... G10H 1/0041
                                                          84/600
6,963,759 B1    11/2005 Gerson
(Continued)

FOREIGN PATENT DOCUMENTS

CN    1408111 A    4/2003
CN    1408182 A    4/2003
(Continued)

OTHER PUBLICATIONS

Car Working Group, "Message Access Profile", Jun. 4, 2009, revision 10r00, 80 pages.*
(Continued)

*Primary Examiner* — Thai Vu
(74) *Attorney, Agent, or Firm* — RatnerPrestia

(57) ABSTRACT

A vehicle-mounted device includes: a phone book acquiring section for acquiring a phone book data of a portable device via a communication section; a manipulation section for rejecting an arrival of a call at a call section; a specification section for specifying a mail address of the opposite party from which the arrival of a call is rejected by the manipulation section with reference to the phone book data; and a call-rejected party mail-reception notification suppressing section for suppressing the notification of reception of an E-mail from the mail address specified by the specification section to the vehicle-mounted device.

10 Claims, 34 Drawing Sheets

(51) Int. Cl.
    *H04M 1/2745*     (2006.01)
    *H04M 1/663*     (2006.01)
    *H04M 1/725*     (2006.01)

(56) References Cited

U.S. PATENT DOCUMENTS

| | | |
|---|---|---|
| 2003/0040903 A1 | 2/2003 | Gerson |
| 2004/0095260 A1 | 5/2004 | Shintani |
| 2005/0003850 A1 | 1/2005 | Tsuda et al. |
| 2005/0070336 A1 | 3/2005 | Tamura |
| 2005/0128974 A1 | 6/2005 | Yamada |
| 2005/0143134 A1 | 6/2005 | Harwood et al. |
| 2006/0166655 A1* | 7/2006 | Montemer ............ 455/414.1 |
| 2007/0042812 A1 | 2/2007 | Basir |
| 2007/0154008 A1* | 7/2007 | Pomerantz et al. ...... 379/355.02 |
| 2009/0138507 A1* | 5/2009 | Burckart et al. ............ 707/104.1 |
| 2009/0187620 A1* | 7/2009 | Kisel et al. .................... 709/202 |
| 2009/0233633 A1* | 9/2009 | Morrison ....................... 455/466 |
| 2010/0023204 A1* | 1/2010 | Basir et al. ....................... 701/33 |
| 2010/0062749 A1* | 3/2010 | Yasuda et al. ............. 455/414.1 |
| 2010/0233998 A1 | 9/2010 | Saito |

FOREIGN PATENT DOCUMENTS

| | | |
|---|---|---|
| CN | 1503178 A | 6/2004 |
| CN | 201080052532 | 12/2013 |
| EP | 1463279 A2 | 9/2004 |
| EP | 1521435 A2 | 4/2005 |
| JP | 10294971 A | 11/1998 |
| JP | 2001333164 A | 11/2001 |
| JP | 2003157217 A | 5/2003 |
| JP | 2004064147 A | 2/2004 |
| JP | 2004180028 A | 6/2004 |
| JP | 2004252563 A | 9/2004 |
| JP | 2005129110 A | 5/2005 |
| JP | 2005175832 A | 6/2005 |
| JP | 2005222410 A | 8/2005 |
| JP | 2009503920 | 1/2009 |
| JP | 2009027403 A | 2/2009 |
| JP | 2010193149 | 9/2010 |

OTHER PUBLICATIONS

"Phone Book Access Profile", Bluetooth Specification, (Apr. 27, 2006), 41 pgs.
"Object Push Profile", Bluetooth Specification Version 1.1, (Feb. 22, 2001), 340-452.
"Dial Up Networking Profile", Bluetooth Specification Version 1.1, (Feb. 22, 2001), 228-452.
"Message Access Profile", Bluetooth Specification, (Jun. 4, 2009), 80 pgs.
"Audio/Video Remote Control Profile", Bluetooth Specification, (Jun. 26, 2008), 166 pgs.
"Advanced Audio Distribution Profile Specification", Bluetooth Specification, (Apr. 16, 2007), 71 pgs.
"Hands Free Profile 1.5", Bluetooth Specification, (Nov. 25, 2005), 93 pgs.
International Application Serial No. PCT/JP2010/005997, International Search Report mailed Nov. 9, 2010, 4 pgs.
Supplementary European Search Report for Application No. EP 10821747 dated Feb. 28, 2014.

\* cited by examiner

FIG. 2

| APPLICATION | | | | | | | | |
|---|---|---|---|---|---|---|---|---|
| GAP | SDP | DUN | HFP | MAP | OPP | PBAP | AVRCP | A2DP |
| | | | | | | | | GAVDP |
| | | | | OBEX | | | AVCTP | AVDTP |
| | | | RFCOMM | | | | | |
| L2CAP | | | | | | | | |
| HCI | | | | | | | | |
| LMP | | | | | | | | |
| BaseBand | | | | | | | | |
| RF | | | | | | | | |

2

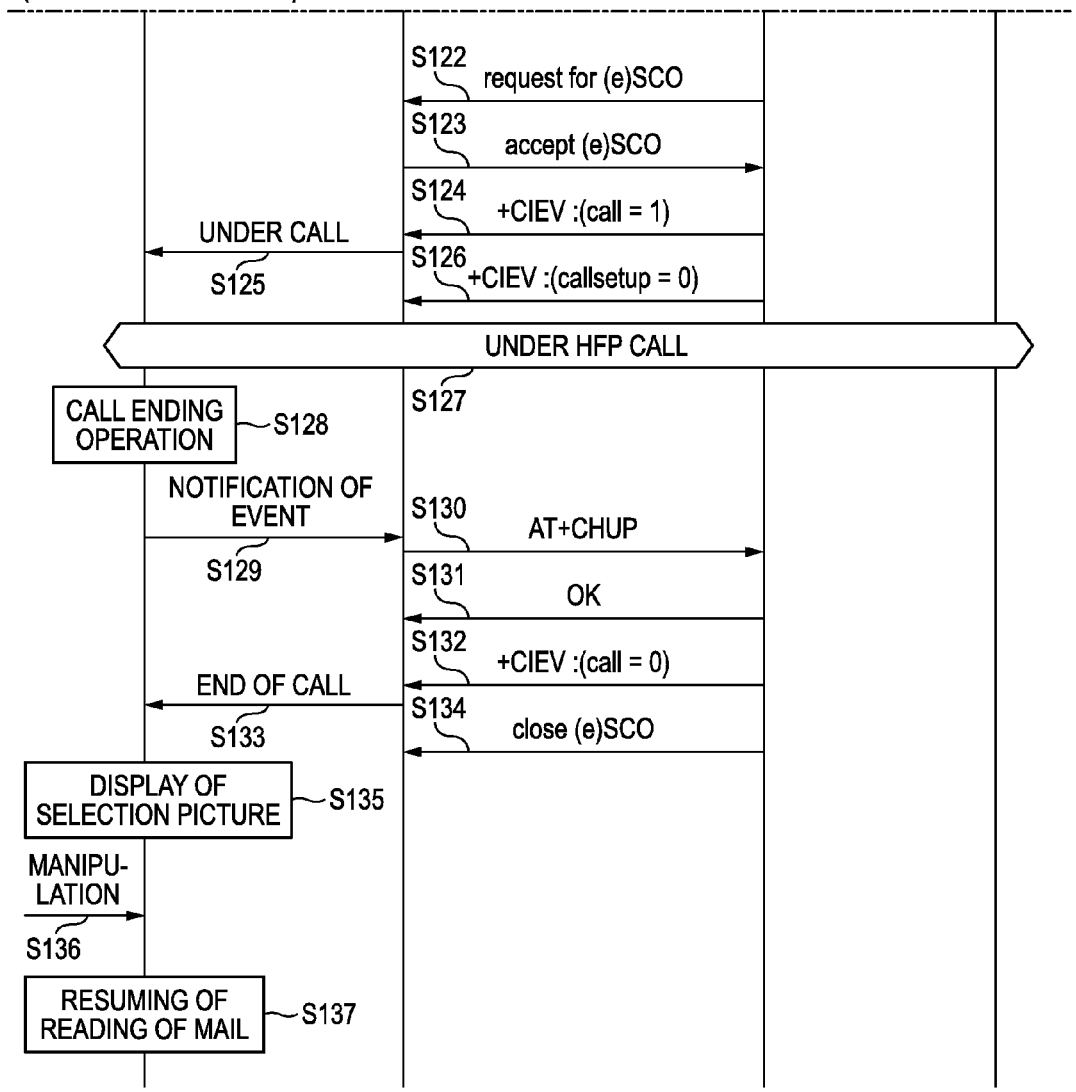

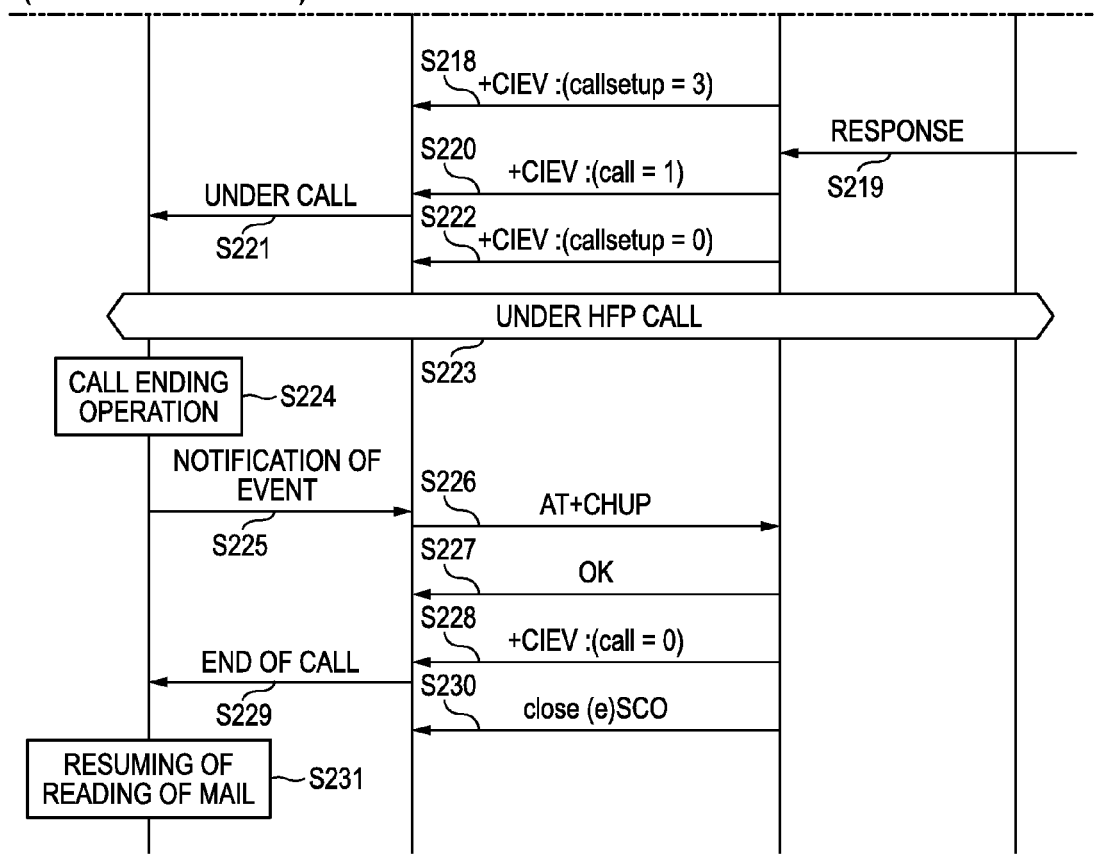

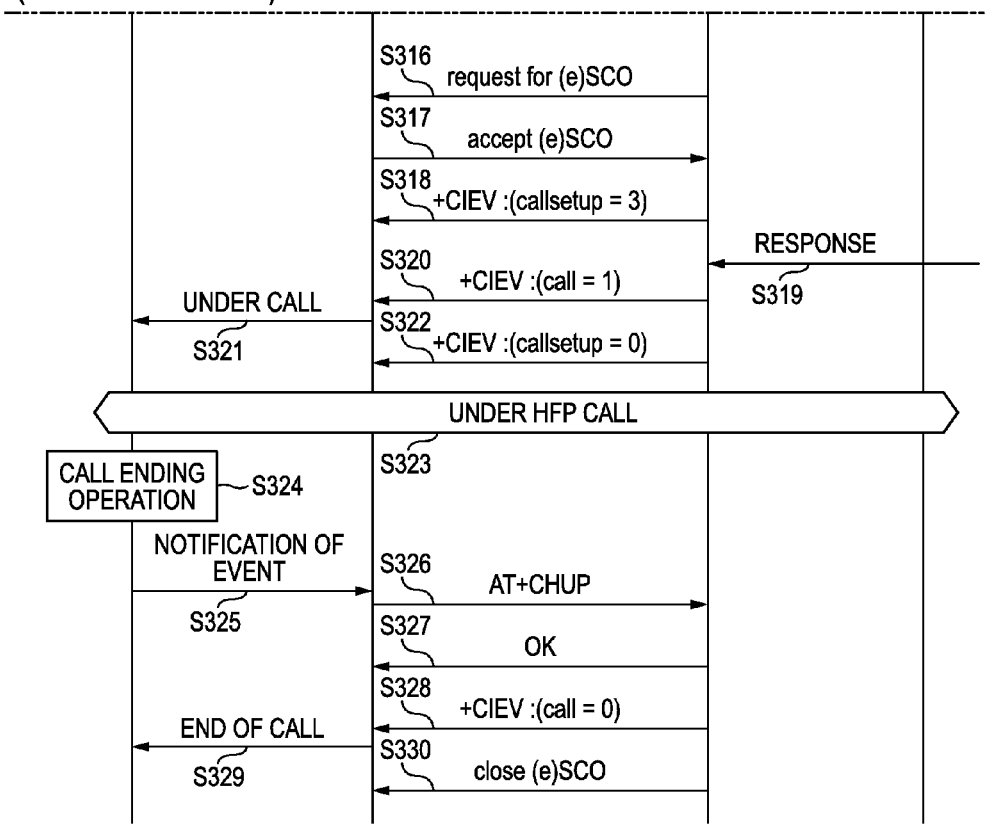

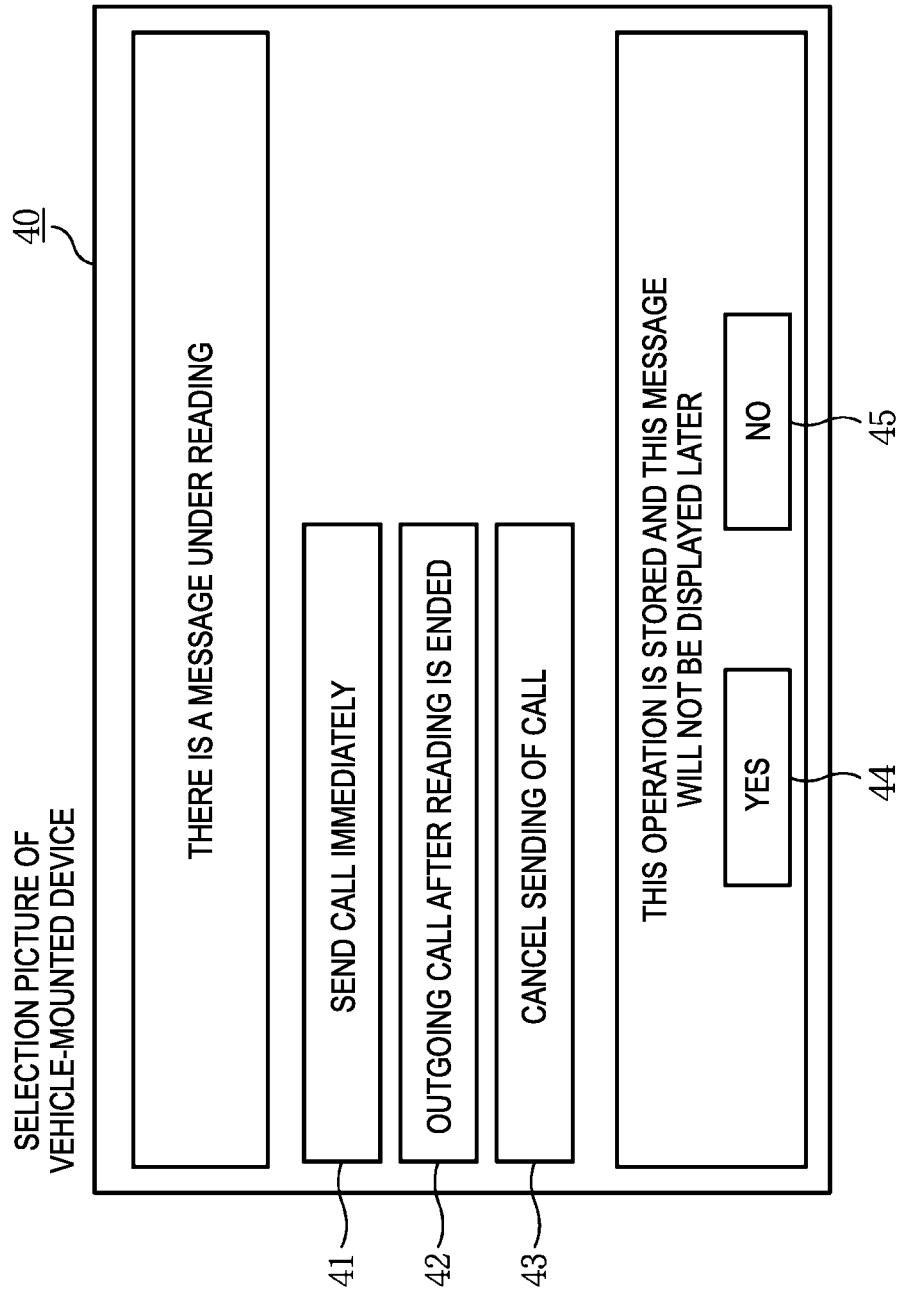

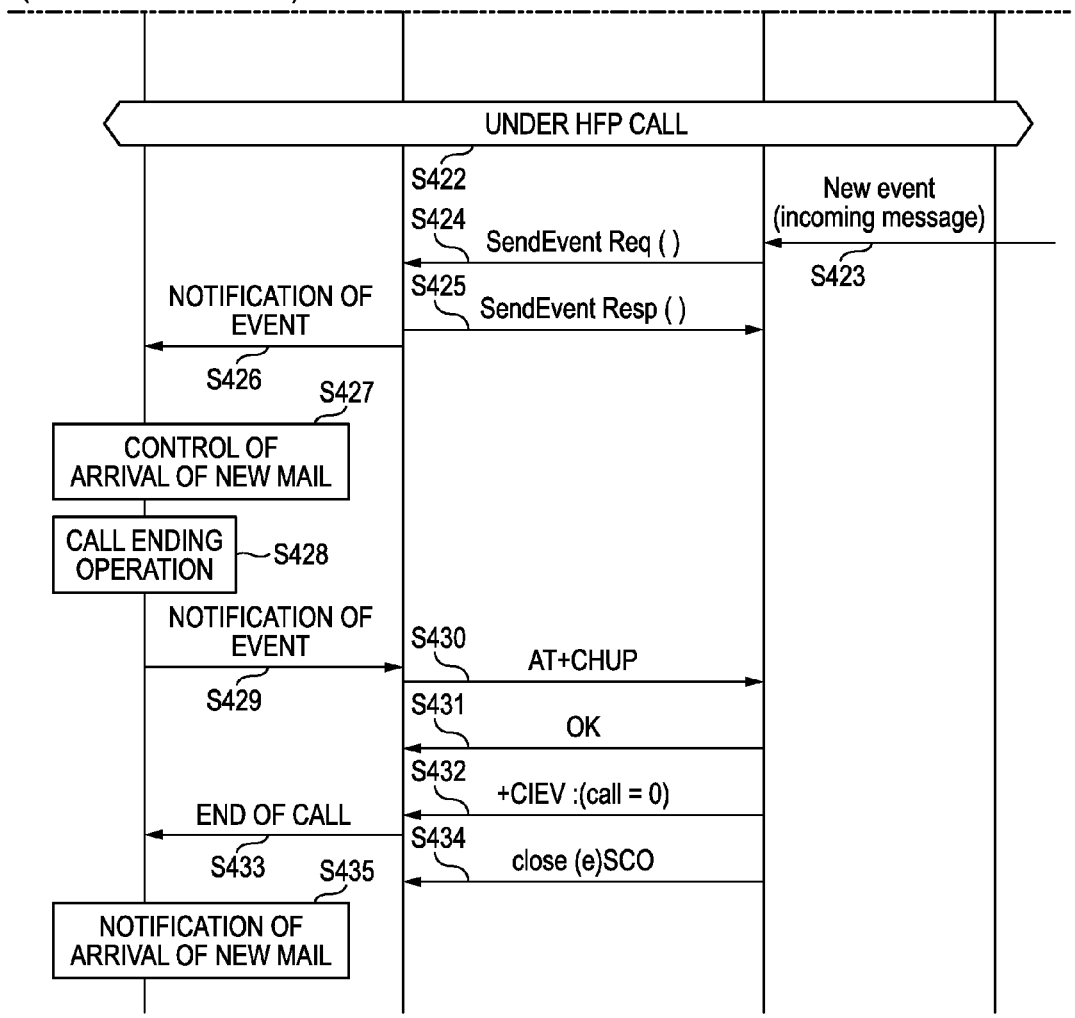

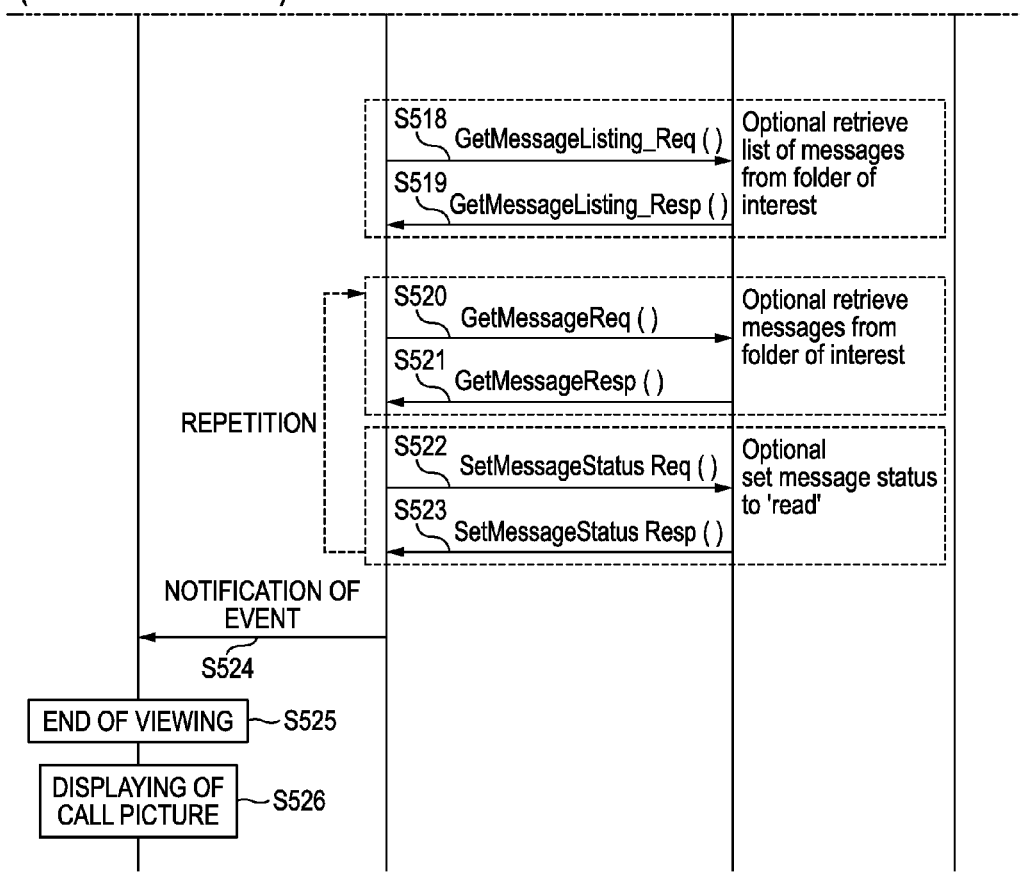

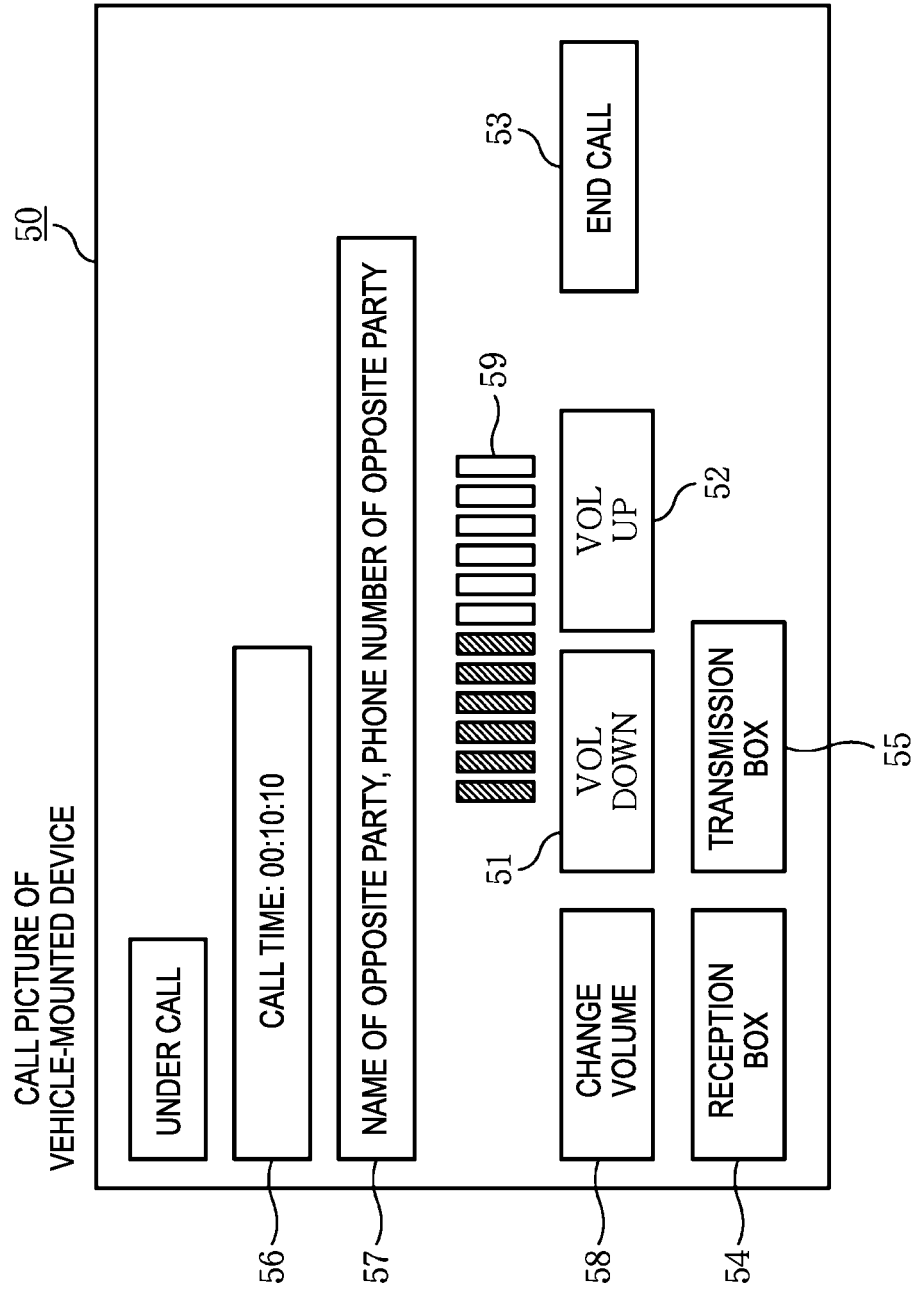

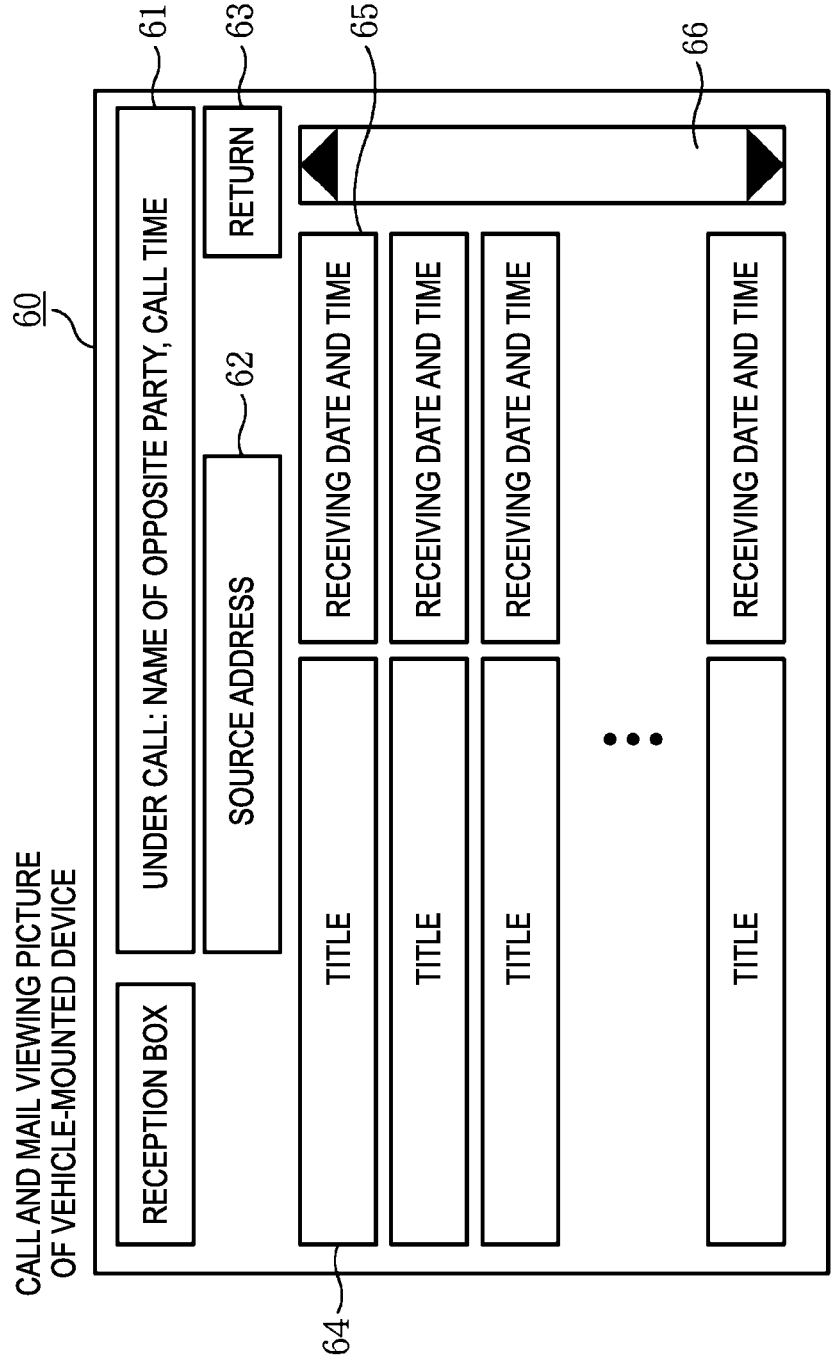

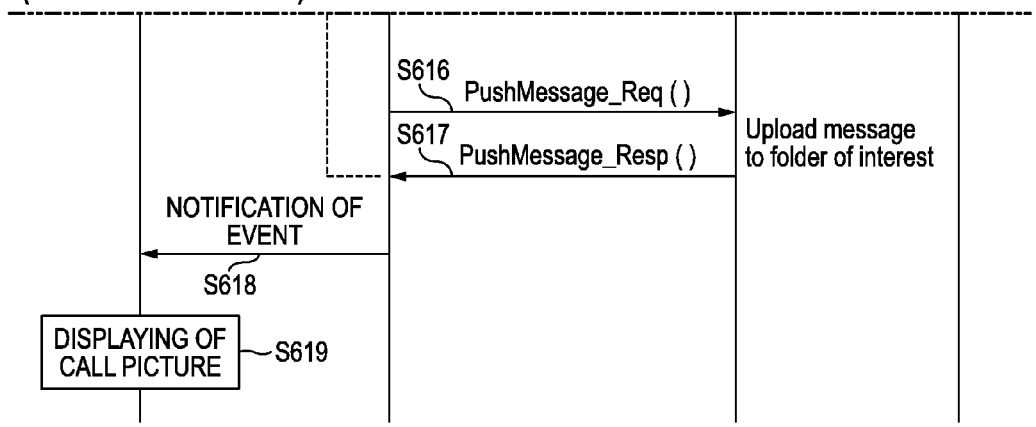

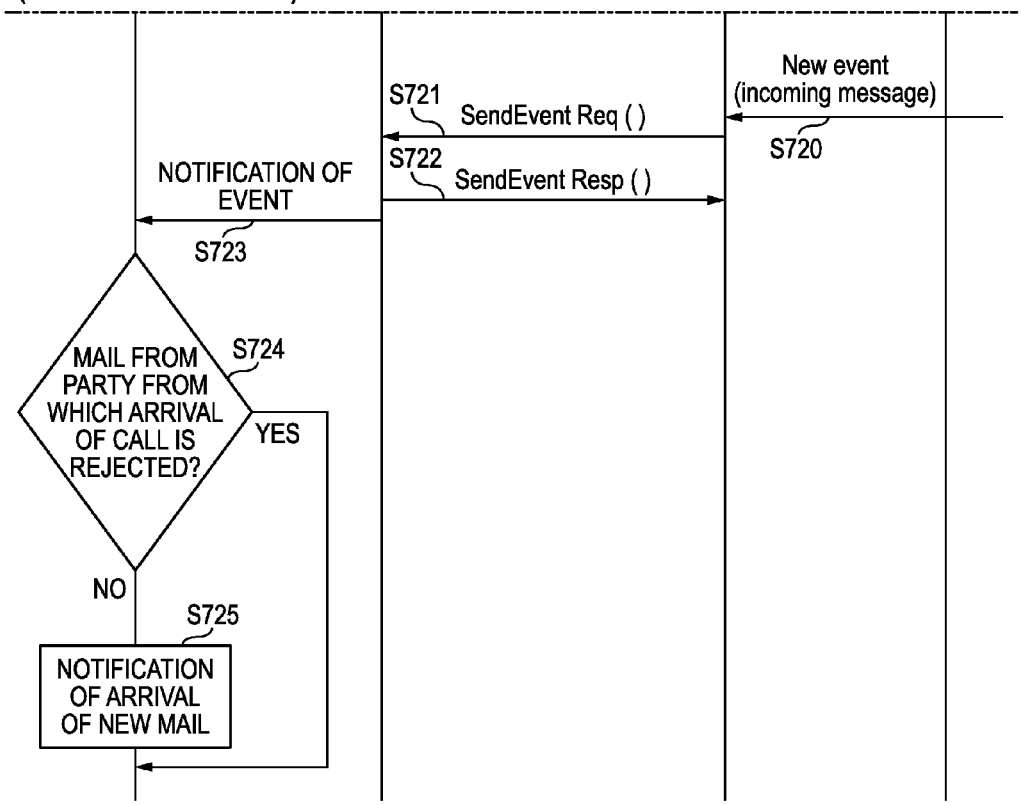

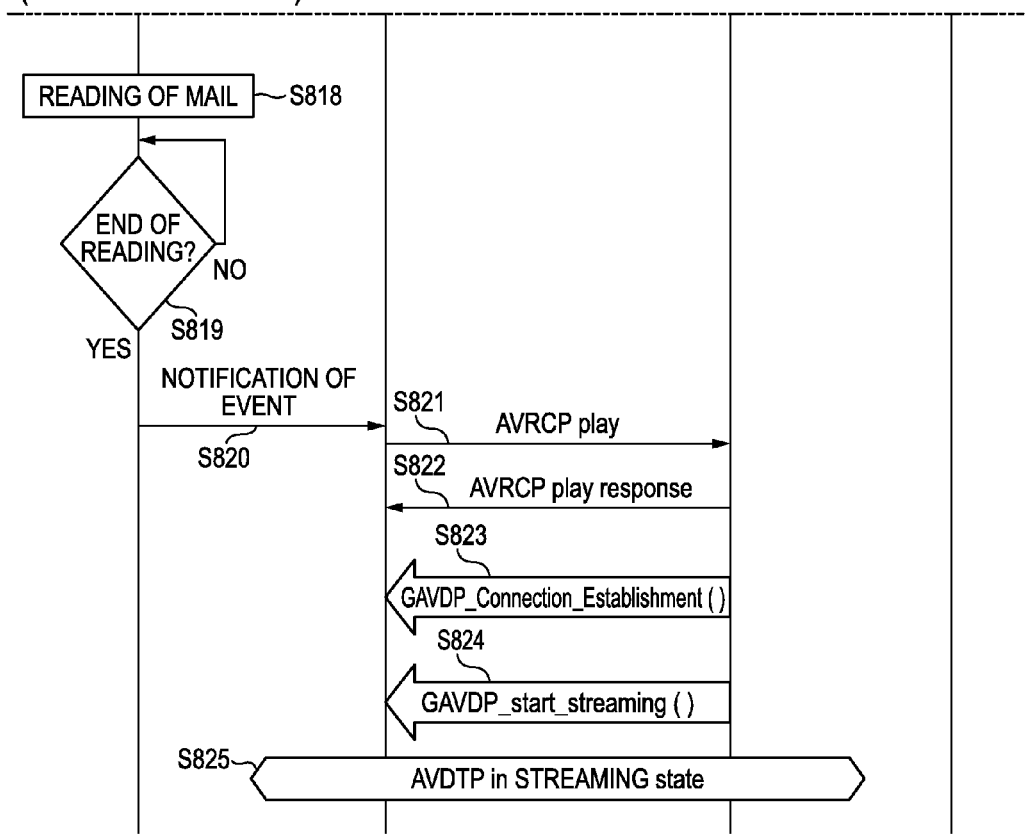

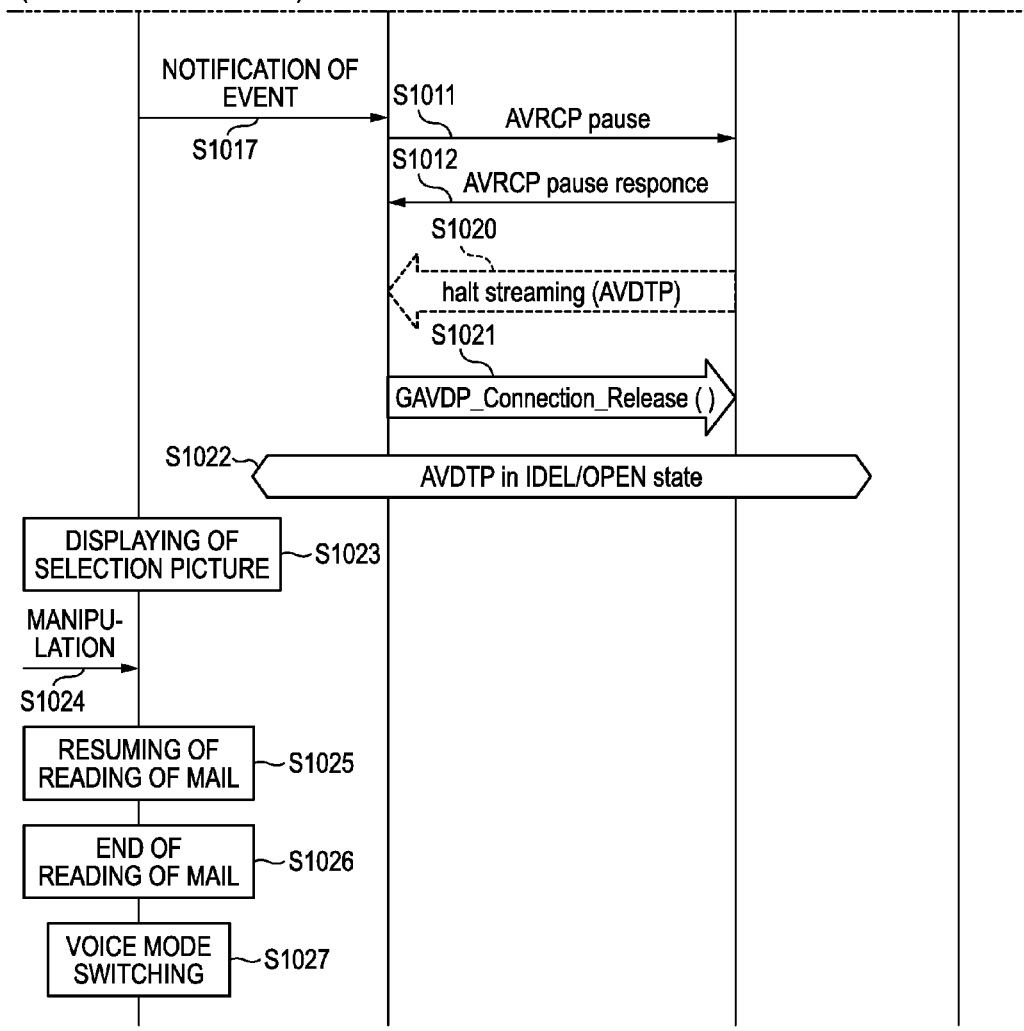

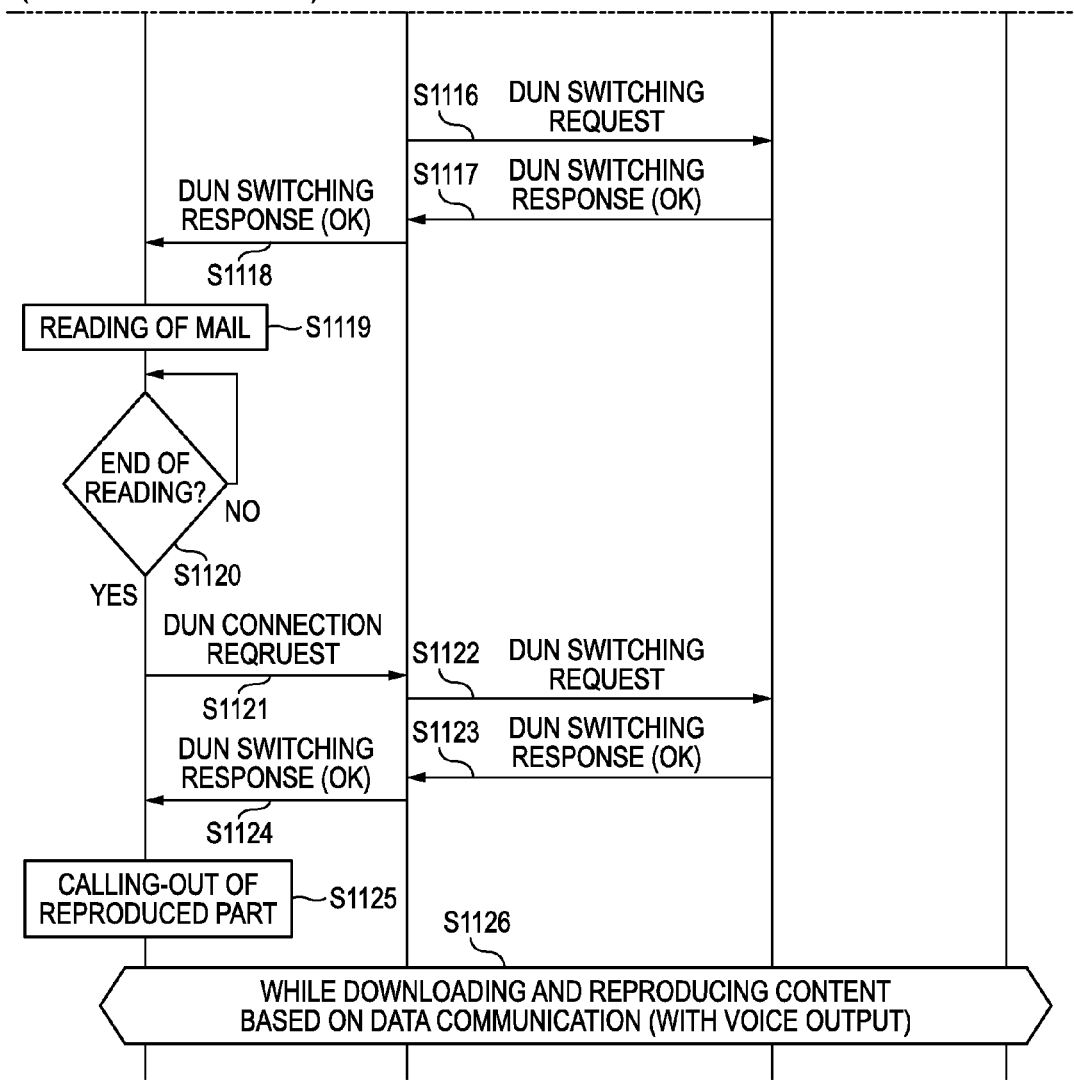

METHOD AND APPARATUS FOR PROCESSING E-MAIL AND OUTGOING CALLS

TECHNICAL FIELD

The present invention relates to a vehicle-mounted device which is mounted on a vehicle, and more particularly, to a vehicle-mounted device in which functions enjoyed through the existing wireless connection, such as a handsfree call function, can operate in combination with an E-mail transmitting and receiving function when the E-mail transmitting and receiving function is actualized by wireless connection to a portable device.

BACKGROUND ART

In vehicle-mounted devices which can utilize a communication function, a technique of transmitting a routine message in response to a mail received while driving has been known as a technique of transmitting and receiving an E-mail in a vehicle (for example, see PTL 1).

A handsfree device that notifies the reception of an E-mail with voice has been known (for example, see PTL 2).

A vehicle-mounted device such as a car navigation apparatus and a portable device such as a mobile phone are connected to each other using Bluetooth (registered trademark) which is a near field communication standard to actualize a handsfree call function, a phone book transmitting function, an audio or video stream reproducing function, a data communication (dial-up communication) function, and the like.

In Bluetooth (registered trademark), various functions are defined as profiles by Bluetooth SIG (Special Interest Group).

The handsfree call function is actualized using HFP (Hands Free Profile) (see NPL 1). The phone book transmitting function is actualized using PBAP (Phone Book Access Profile) or OPP (Object Push Profile) (see NPL 2 or NPL 3). The audio stream reproduction remotely-controlling function is actualized using A2DP (Advanced Audio Distribution Profile) and AVRCP (Audio/Video Remote Control Profile) (see NPL 4 and NPL 5). The data communication function is actualized using DUN (Dial-Up Networking Profile) (see NPL 6).

In June, 2009, MAP (Message Access Profile) ver. 1.0 is formulated by Bluetooth SIG and the profile by which an E-mail of a mobile phone can be viewed or the like by a vehicle-mounted device is completely formulated (see NPL 7).

CITATION LIST

Patent Literature

[PTL 1] JP-A-2004-252563
[PTL 2] JP-A-2009-27403

Non Patent Literature

[NPL 1] Bluetooth Specification, Hands Free Profile (HFP) 1.5, issued Nov. 25, 2005
[NPL 2] Bluetooth Specification, Phone Book Access Profile (PBAP) 1.0, V10r00, issued Apr. 27, 2006
[NPL 3] Bluetooth Specification, Object Push Profile (OPP) 1.1, issued Feb. 22, 2001
[NPL 4] Bluetooth Specification, Advanced Audio Distribution Profile (A2DP) 1.2, issued Apr. 16, 2007
[NPL 5] Bluetooth Specification, Audio/Video Remote Control Profile (AVRCP) 1.4, issued Jun. 26, 2008
[NPL 6] Bluetooth Specification, Dial-Up Networking Profile (DUN) 1.1, issued Feb. 22, 2001
[NPL 7] Bluetooth Specification, Message Access Profile (MAP) 1.0, Jun. 4, 2009

SUMMARY OF INVENTION

Technical Problem

However, the MAP is only standardized just before a use case (so-called multi-profile operation) in which the E-mail transmitting and receiving function operates in combination with the existing profiles is not standardized when an E-mail is transmitted and received by the use of a vehicle-mounted device. Accordingly, when a profile is installed with only the logic of the vehicle-mounted device maker, there may be a problem in interconnectivity and thus there may be a problem in that an intended operation cannot be performed due to a difference in standard analysis from the maker of a portable device serving as an opposite party.

In an example of such a use case, a vehicle-mounted device and a mobile phone are wirelessly connected to each other on the basis of Bluetooth (registered trademark) standard and a mail is received during a handsfree call. In another example of the use case, a vehicle-mounted device and a mobile phone are wirelessly connected to each other on the basis of Bluetooth (registered trademark) standard, a mail is received during a handsfree call, and a user views the received mail during the handsfree call.

When plural profiles operate in combination in a vehicle-mounted device, the manipulation thereof is complicated for a user and there is a possibility that it is difficult for the user to use it.

When the handsfree call function, the audio or video stream reproducing function, or the data communication function is performed and operates in combination in the state where a vehicle-mounted device can perform the E-mail transmitting and receiving function using the MAP, which operation of the vehicle-mounted device is convenient for a user becomes a competitive area of the makers.

Easy understanding and convenience of use are required for a picture configuration used to perform operations of a vehicle-mounted device.

The invention is made in consideration of the above-mentioned problems and an object of the invention is to provide a vehicle-mounted device which can operate in combination with the existing profiles when the vehicle-mounted device and a portable device such as a mobile phone are connected to each other using Bluetooth (registered trademark) and transmit and receive an E-mail and also to provide a vehicle-mounted device which is safe and convenient for a user when the handsfree call function, the audio or video stream reproducing function, and the data communication function are performed in a state where an E-mail transmitting and receiving function can be performed, and operate in combination.

To achieve the above object, there is provided a vehicle-mounted device which is mounted on a vehicle and which is connected to a portable device having a call function, an E-mail function, and phone book data by near field communication, the vehicle-mounted device including: a communication section that wirelessly communicates with the portable device by near field communication; a call section that has a call via the communication section; a phone book acquiring section that acquires the phone book data of the portable device via the communication section; a manipulation section that rejects an arrival of a call at the call section; a specification section that specifies a mail address of the opposite party from which the arrival of the call is rejected by the manipulation section with reference to the phone book data; and a call-rejected party mail-reception notification suppressing section that suppresses a notification of reception of an E-mail from the mail address specified by the specification section to the vehicle-mounted device.

Also, to achieve the above object, there is provided a vehicle-mounted device which is mounted on a vehicle and which is connected to a portable device having a call function and an E-mail function by near field communication, the vehicle-mounted device including: a communication section that wirelessly communicates with the portable device by near field communication; an E-mail transmitting and receiving section that controls the portable device to transmit and receive an E-mail via the communication section; an E-mail reading section that reads a received E-mail with voice; an interruption section that interrupts the reading of the E-mail by the E-mail reading section; a ringtone ringing section that rings a ringtone for alerting an arrival of a call; a call receiving section that receives an arriving call receiving operation; a call entering section that causes the vehicle-mounted device to enter a call state; a call end sensing section that senses the end of the call; and a reading resuming section that resumes the reading of the E-mail under reading, wherein when an arrival of a call is sensed while the E-mail reading section is reading an E-mail with voice, the interruption section interrupts the reading of the E-mail, the ringtone ringing section rings a ringtone, and the call receiving section receives the call receiving operation, the call entering section causes the vehicle-mounted device to enter the call state, and the reading resuming section resumes the reading of the E-mail under reading when the telephone call end sensing section senses the end of the call.

Also, to achieve the above object, there is provided a vehicle-mounted device which is mounted on a vehicle and which is connected to a portable device having a call function, an E-mail function, and phone book data by near field communication, the vehicle-mounted device including: a communication section that wirelessly communicates with the portable device by near field communication; a call section that has a call via the communication section; a call picture display section that displays a call picture which is a display picture of information on a call status; a phone book acquiring section that acquires the phone book data of the portable device via the communication section; an opposite party specifying section that specifies the opposite party under a call with reference to the phone book data; and a button arranging section that arranges a button on the picture displayed by the call picture display section, wherein the button arranged by the button arranging section is a button for acquiring at least one of an information piece of an outgoing mail to the opposite party under a call specified by the opposite party specifying section and an information piece of an incoming mail from the opposite party under a call.

Advantageous Effects of Invention

According to the invention, it is possible to provide a vehicle-mounted device which can cause plural profiles to operate in combination without having a situation where an intended operation is not performed and which is excellent in manipulability for a user and convenient for use, when a vehicle-mounted device and a portable device such as a mobile phone are wirelessly connected to each other on the basis of Bluetooth (registered trademark) and plural profiles are made to operate in combination.

According to the invention, it is possible to provide a vehicle-mounted device which can operate in combination with the existing profiles and which is excellent in manipulability for a user and convenient for use, when a vehicle-mounted device and a portable device such as a mobile phone are wirelessly connected to each other on the basis of Bluetooth (registered trademark) and a mail is received during a handsfree call.

BRIEF DESCRIPTION OF DRAWINGS

FIG. 2 is a hierarchical diagram illustrating a Bluetooth protocol stack of the vehicle-mounted device.

FIG. 7 is a schematic diagram illustrating an example of a selection picture displayed on a display unit 102 of the vehicle-mounted device.

FIG. 10 is a schematic diagram illustrating an example of a call picture displayed on the display unit 102 of the vehicle-mounted device.

FIG. 11 is a schematic diagram illustrating an example of a call and mail viewing picture (Reception Box) displayed on the display unit 102 of the vehicle-mounted device.

DESCRIPTION OF EMBODIMENTS

Figure 1:
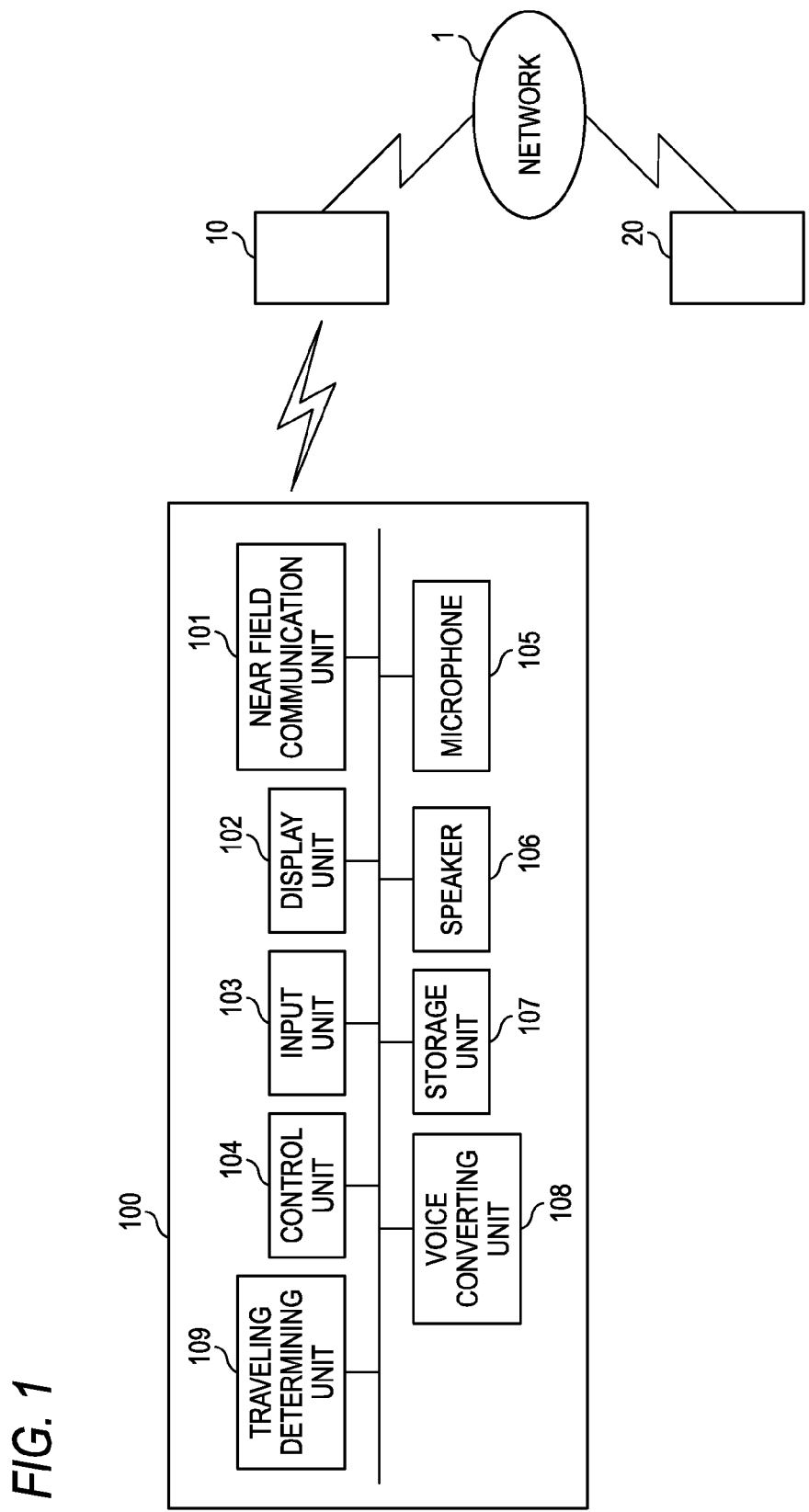
FIG. 1 is a block diagram illustrating the entire configuration of a vehicle-mounted device according to Embodiment 1 of the invention.

Hereinafter, a vehicle-mounted device according to Embodiment 1 of the invention will be described with reference to the accompanying drawings. In the drawings, elements not associated with the invention are not shown.

Embodiment 1

FIG. 1 is a block diagram illustrating the entire configuration of a vehicle-mounted device according to Embodiment 1 of the invention. FIG. 1 shows a navigation device 100 as an example of a vehicle-mounted device mounted on a vehicle and a mobile phone 10 and a mobile phone 20 as an example of a portable device.

In FIG. 1, the navigation device 100 includes a near field communication unit 101 (including a so-called Bluetooth (registered trademark) module or plural combo modules such as Bluetooth (registered trademark) and wireless LA/V which can wirelessly communicate) as a communication section, a display unit 102, an input unit 103, a control unit 104, a microphone 105, a speaker 106, a storage unit 107, a voice converting unit 108, and a traveling determining unit 109. The traveling determining unit 109 may not be provided depending on the situation.

The mobile phone 10 is a typical mobile phone and has at least a call function and an E-mail function. Here, the call function means a function of converting a voice into an electrical signal and having a call via a telephone line, that is, transmitting the voice to the opposite party remotely located and having a call with each other and also includes a function of sensing an arrival of a call and outputting the sensed signal when a call from another terminal having a call function arrives. The E-mail function means a function of exchanging a message through the use of a communication system using known electronic engineering and includes a function of sensing reception of an E-mail and outputting the sensed signal when the E-mail is received from another terminal having an E-mail function.

The mobile phone 10 may have phone book data or an audio stream transmitting function. Here, the phone book data means data in which names of predetermined persons, phone numbers specific to terminals such as telephones possessed by the persons, and E-mail addresses specific to the terminals are recorded in the mobile phone 10 in correlation with each other. The audio stream transmitting function means a function of transmitting a data file such as an audio file stored in the mobile phone to the navigation device 100 or the like as data.

Here, in the below description (all the embodiments), it is assumed that a voice file (audio file) is handled, but the portable device may have a video stream transmitting function of handling an image or a moving image file (video file). In this case, the operation of the vehicle-mounted device of reproducing a video stream is carried out in the same way as reproducing an audio stream in the below description on the basis of the fact that the vehicle-mounted device can reproduce a stream of video data received from the portable device.

An "AV stream" may be used as "at least one of an audio stream and a video stream".

The mobile phone 10 is carried by a passenger of a vehicle such as a driver who gets into the vehicle mounted with the navigation device 100. The mobile phone 10 has a near field communication function in addition to an antenna used for a call.

The mobile phone 10 can communicate with the navigation device 100 by the near field communication function. The mobile phone 20 is used by a third party and transmits and receives a telephone call or an E-mail to and from the mobile phone 10 via a network 1.

Elements of the navigation device 100 will be described below.

The near field communication unit 101 includes an antenna for wireless communication, a wireless circuit, a protocol stack, and an operation circuit and performs data communication with the mobile phone 10 by the near field communication. In this embodiment, Bluetooth (registered trademark) is used as the wireless standard used in the data communication.

To perform the near field communication with the mobile phone 10, the navigation device 100 has a handsfree call function for a call with the user of the mobile phone 20, a phone book transmitting function of transmitting phone book data of the mobile phone 10 to the navigation device 100, a stream reproducing function of reproducing an audio stream accumulated in the mobile phone 10 by the use of the navigation device 100, and a data communication (dial-up communication) function of performing data communication with an external network using a gateway function of the mobile phone 10. These functions are performed using profiles based on Bluetooth (registered trademark) standard (of which the details will be described later).

The display unit 102 is a display device such as a liquid crystal display and an organic EL display and includes circuits for drawing a variety of information associated with Bluetooth (registered trademark) communication under the control of the control unit 104.

The input unit 103 receives instructions from a user and is constructed with a structure in which a predetermined number of press switches are arranged, or a touch panel, or a remote controller. The input unit 103 may be disposed inside the case of the navigation device 100 or may be separated from the case by cable connection. In this embodiment, it is assumed that a touch panel is used.

The control unit 104 includes a CPU (Central Processing Unit) or an MPU (Micro Processing Unit) controlling all the operations of the navigation device 100 and a ROM (Read Only Memory) or a RAM (Random Access Memory). The CPU or MPU executes application software programs stored in the ROM, whereby the functional blocks are combined with each other to actualize the processes of this embodiment. The CPU or MPU uses the RAM as a work area in the process of executing the programs.

The microphone 105 and the speaker 106 are used to input and output a voice.

A user's voice may be recognized using the microphone 105 instead of the input unit 103 and may be converted into input information to the navigation device 100.

The storage unit 107 is constructed with a rewritable nonvolatile memory storing the phone book data and outgoing and incoming call history data received from the mobile phone 10 by wireless communication.

The voice converting unit 108 is means for converting a character string of an E-mail into a voice and reading the E-mail (with a voice) and is embodied by a program. The converted voice is output from the speaker 106. By using a known fellow passenger sensor (not shown) sensing the presence of a fellow passenger in the vehicle when reading an E-mail with a voice, an operation of not reading the E-mail with a voice when a fellow passenger other than a driver is present in the vehicle and reading the E-mail with a voice when a fellow passenger other than a driver is not present in the vehicle may be performed.

The traveling determining unit 109 is means for determining whether the vehicle is traveling or stopped and is embodied by a sensor such as a vehicle speed sensor sensing a vehicle wheel speed or positioning means such as a GPS (Global Positioning System) and/or an inertia sensor and a program. The traveling determining unit 109 is used to perform "traveling regulation" of disabling buttons displayed on the touch panel while the vehicle is traveling.

The display unit 102, the input unit 103, the microphone 105, the speaker 106, and the traveling determining unit 109 may be built in the device or may be separated from the device so as to be connected to the device.

The navigation device 100 includes a database storing map information such as data associated with roads or intersections not shown, positioning means such as a GPS, and a program for performing a known path search or a guidance, and can display a map on the display unit 102, update a display of the vehicle position, overlap a path on the map, and guide with a voice in front of an intersection as a guidance target.

FIG. 2 is a hierarchical diagram illustrating the protocol stack 2 based on Bluetooth (registered trademark) standard in the near field communication unit 101 of the navigation device 100.

In FIG. 2, the GAP (Generic Access Profile) defines a method of setting up a baseband link between devices corresponding to Bluetooth (registered trademark).

The SDP (Service Discovery Profile) is used to search for services supported by the navigation device 100 or the mobile phone 10.

The DUN (Dial-Up Networking Profile) is used to access the Internet or another dial-up service.

The HFP (HandsFree Profile) is used to connect the navigation device 100 and the mobile phone and to perform the handsfree call function.

The MAP (Message Access Profile) is used to connect the navigation device 100 and the mobile phone and to exchange mail information.

The OPP (Object Push Profile) is used to access the mobile phone and to transmit the phone book data from the mobile phone to the navigation device 100. An arrival of a new mail can be notified from the mobile phone to the navigation device 100, a mail folder of the mobile phone can be browsed to acquire a message in the folder by the use of the navigation device 100, a mail prepared by the use of the navigation device 100 can be transmitted to the mobile phone or the network, or a mail of the mobile phone can be deleted by the use of the navigation device 100.

The PBAP (Phone Book Access Profile) is used to connect the navigation device 100 and the mobile phone and to transmit the phone book data and the outgoing and incoming call history data from the mobile phone to the navigation device 100. Any profile of the OPP and the PBAP can be used to transmit the phone book data.

The AVRP (Audio/Video Remote Control Profile) is used to access the mobile phone or a portable music player and to remotely control it by the use of the navigation device 100.

The A2DP (Advanced Audio Distribution Profile) is used to access the mobile phone or the portable music player and to stream an audio with stereo quality from a medium source to a medium sink.

The GAVDP (General Audio/Video Distribution Profile) serves as a basis of the A2DP and is used to deliver a video stream and an audio stream from Source (SRC) to Sink (SNK).

The AVDTP (Audio/Video Distribution Transport Protocol) defines a negotiation sequence of an NV stream, a check sequence, and a transport sequence.

The AVCTP (Audio/Video Control Transport Protocol) defines a transport mechanism for exchanging a control message of an A/V device between Controller (CT) and Target (TG).

The OBEX (Object Exchange) is a communication protocol which two devices (the navigation device 100 and the mobile phone in this embodiment) can use to exchange an object and is defined to exchange various data or commands.

The RFCOMM is used to set a serial cable and to emulate an RS-232C serial port.

The L2CAP (Logical Link Control and Adaptation Protocol) supports multiplexing of a higher protocol, segmentation and reconstruction of a packet, and transmission of service quality information.

The HCI (Host Controller Interface) provides a command interface to a baseband controller and a link manager and provides an interface for accessing constituent parameters.

The LMP (Link Manager Protocol) is used to control and negotiate all the aspects (access, authentication, encryption, power save control, and the like) of the connection based on Bluetooth (registered trademark) standard between two devices (the navigation device 100 and the mobile phone in this embodiment).

The BaseBand defines the medium access between the devices based on Bluetooth (registered trademark) standard and the rank of physical layers.

The RF (Radio Frequency) defines a modulation mode for communication at a 2.4 GHz band and defines characteristics (maximum transmission power and the like) of a transmitter, characteristics (sensitivity and the like) of a receiver, and the like.

In the profiles based on Bluetooth (registered trademark) standard, functions defined between both devices communicating with each other are divided by the devices and the respective devices are defined as roles.

For example, the navigation device 100 operates as a vehicle-mounted device and operates in the role of a data terminal (DT) when the DUN is used. When the HFP is used, the navigation device operates in the role of a handsfree unit (HF). When the MAP is used, the navigation device operates in the role of a message client equipment (MCE). When the OPP is used, the navigation device operates in the role of a push server. When PBAP is used, the navigation device operates in the role of a phone book client equipment (PCE). When the AVRCP is used, the navigation device operates in the role of a controller (CT). When the A2DP is used, the navigation device operates in the role of a sink (SNK).

On the other hand, when the DUN is used, the mobile phone 10 operates in the role of a gateway (GW). When the HFP is used, the mobile phone operates in the role of an audio gateway (AG). When the MAP is used, the mobile phone operates in the role of message server equipment (MSE). When the OPP is used, the mobile phone operates in the role of a push client. When the PBAP is used, the mobile phone operates in the role of a phone book server equipment (PSE). When the AVRCP is used, the mobile phone operates in the role of a target (TG). When the A2DP is used, the mobile phone operates in the role of a source (SRC).

The operations of the navigation device 100 and the screen display displayed on the display unit 102 will be described below with reference to the accompanying drawings.

Since plural use cases can be considered, the operations of the navigation device 100 will be described through the use cases.

In this embodiment, the operations of the navigation device 100 in the use case where a call arrives while reading a mail will be described with reference to the sequence diagram of FIG. 3.

In this use case, the MAP and the HFP operate in a multi-profile operation manner. Here, the multi-profile manipulation section that two or more profiles are simultaneously accessed and the functions of the profiles simultaneously operate in parallel.

Figure 3:
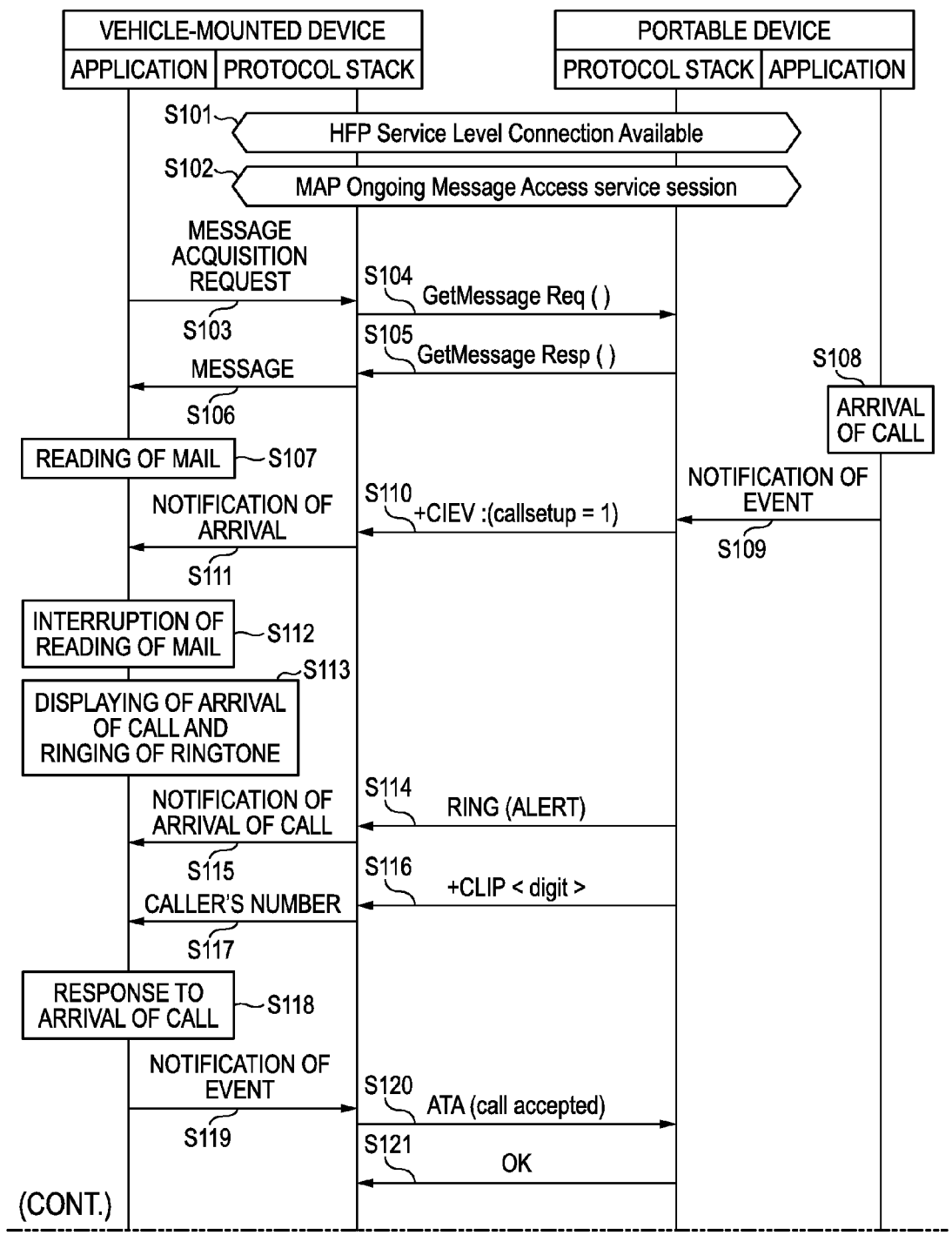
FIG. 3 is a sequence diagram illustrating the sequence of operations of the vehicle-mounted device when a call arrives while a mail is being read with the vehicle-mounted device.

In FIG. 3 and the below description, a vehicle-mounted device represents the navigation device 100 of FIG. 1 and a portable device represents the mobile phone 10 of FIG. 1. The same is true for the subsequent sequence diagrams.

It is assumed that the vehicle-mounted device and the portable device are registered in Bluetooth (registered trademark) in advance and a communication line is set up.

In FIG. 3, the communication with the protocol stack 2 represents an exchange at the level of commands of the profiles and lower commands (for example, HCI command) are not shown. However, in practice, when data is transmitted from an upper layer to a lower layer, the header of the lower layer is added and the data of the upper layer is encapsulated and transmitted. On the contrary, when data is transmitted from a lower layer to an upper layer, the data is transmitted to the upper layer with the head of the lower layer removed.

In FIG. 3, S101 represents a state where the service level connection of the HFP is set up. S102 represents a state where the message access service session of the MAP is set up.

When a request for acquiring a mail from the mobile phone 10 is input from a user through the use of the input unit 103 of the navigation device 100 (step S103), a message acquisition request command (GetMessage_Req( )) is issued in step S104.

In step S105, the mobile phone 10 returns the response (GetMessage_Resp( )) to the message acquisition request command in step S104.

In step S105, the protocol stack 2 of the vehicle-mounted device transmits the message acquired in step S105 to the application (step S106).

The application of the vehicle-mounted device converts the received message into a voice by the use of the voice converting unit 108 and outputs the voice from the speaker 106 (step S107).

Here, when a call arrives at the mobile phone 10 from a public network (the network 1) while reading the message (step S108), the application of the mobile phone 10 notifies an event to the protocol stack 2 of the mobile phone 10 (step S109).

In step S110, an AT command (+CIEV: (callsetup=1)) representing the arrival of a call is notified to the vehicle-mounted device.

The protocol stack 2 of the vehicle-mounted device notifies the arrival of a call to the application (step S111).

The application of the vehicle-mounted device having receiving the notification of the arrival of a call interrupts the reading of the message (step S112) and gives priority to the arrival of the call.

In step S113, a message representing the arrival of a call is displayed on the display unit 102 and a ringtone rings from the speaker 106.

During the arrival of a call, RING (ALERT) and +CLIP<digit> (a caller's number is included in the digit) of the AT command are sent from the mobile phone 10 to the vehicle-mounted device in steps S114 and S116.

The protocol stack 2 of the vehicle-mounted device notifies the arrival of a call and the caller's number (the phone number of a caller) to the application in correspondence with steps S114 and S116 (steps S115 and S117).

At this time, the caller's number is displayed on the display unit 102. When the phone book of the mobile phone 10 is acquired in advance using the OPP or the PBAP, the name of the caller is displayed on the display unit 102.

Subsequently, when the user responds to the arrival of a call through the use of the input unit 102 (step S118), an event is notified to the protocol stack 2 from the application (step S119).

In step S120, the AT command (ATA) representing the arrival of a call is transmitted from the navigation device 100 to the mobile phone 10. As a response thereto, the portable device returns an AT command (OK) representing "acceptance" (step S121).

In step S122, a voice path ((e)SCO) setup request is transmitted from the mobile phone 10 to the navigation device 100. In step S123, an acceptance command of the voice path setup request is returned as a response thereto and a voice path is set up.

Subsequently, in steps S124 and S126, a result command (+CIEV) in which an indicator (call=1) indicating "start of a call and an indicator (callsetup=0) indicating "call non-setup" are set is transmitted from the mobile phone 10 to the navigation device 100.

In step S125, the application of the navigation device 100 receives an event entering the call state from the protocol stack 2.

Step S127 represents a state where a handsfree call is taken. A voice input from the microphone 105 reaches the mobile phone 10 through the voice path and reaches the mobile phone 20 through the network 1. On the other hand, a voice from the mobile phone 20 reaches the navigation device 100 through the voice path similarly and is output from the speaker 106.

When a call ending operation is performed by the use of the input unit 103 in step S128, the event is notified to the protocol stack 2 (step S129).

In step S130, an AT command (AT+CHUP) representing the end of the call is sent to the mobile phone 10 and the mobile phone 10 returns an AT command (OK) representing the acceptance to the vehicle-mounted device (step S131).

In step S132, the mobile phone 10 transmits a result command (+CIEV) in which an indicator (call=0) indicating the end of a call is set to the navigation device 100. In step S133, the end of a call is transmitted to the application of the vehicle-mounted device.

In step S134, the voice path ((e)SCO) is released.

The application of the navigation device 100 displays a selection picture on the display unit 102 (step S135).

An example of the selection picture displayed on the display unit 102 will be described below with reference to FIG. 4.

Figure 4:
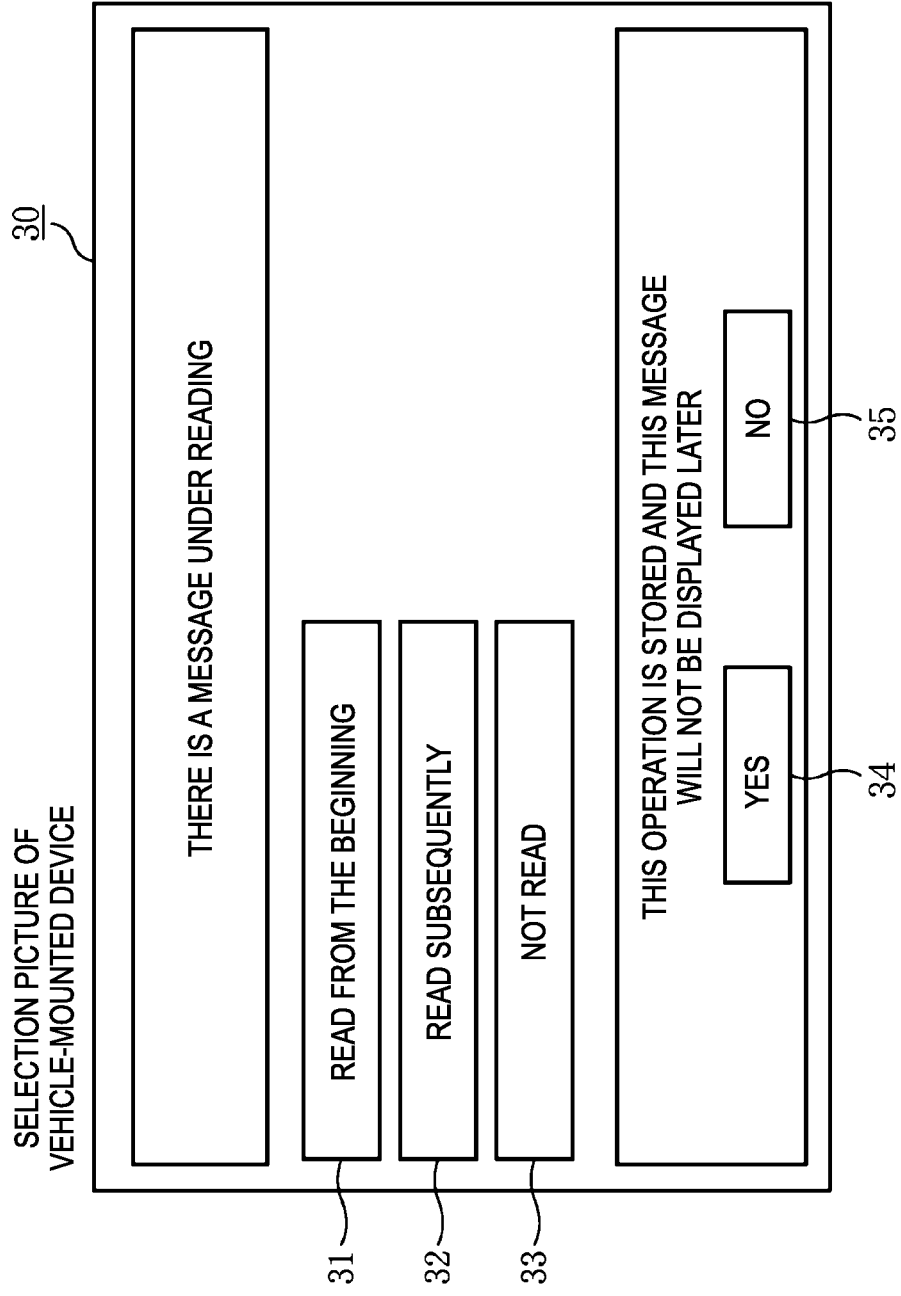
FIG. 4 is a schematic diagram illustrating an example of a selection picture displayed on a display unit 102 of the vehicle-mounted device.

The selection picture 30 shown in FIG. 4 is a screen of a touch panel and buttons 31 to 35 are selectively arranged therein (corresponding to the input unit 103).

The button 31 is a button which is pressed when it is desired to read the mail under reading from the beginning. When the button 31 is selected, the navigation device 100 performs a process of reading the mail under reading before the arrival of the handsfree call from the beginning.

The button 32 is a button which is pressed when it is desired to read the mail under reading subsequently. When the button 32 is selected, the navigation device 100 performs a process of reading the mail subsequently to the interrupted position before the arrival of the handsfree call.

The button 33 is a button used to cancel the reading.

The navigation device 100 can select whether the selection picture 30 should be displayed by the use of the buttons 34 and 35 when the same use case occurs later.

That is, the button 34 is a button for storing the operation allocated to one of the buttons 31 to 33 when a user presses one of the buttons 31 to 33 and automatically performing the stored operation without displaying the selection picture 30 when the same use case occurs later. The button 35 is a button for not storing the operation allocated to one of the buttons 31 to 33 even when a user presses one of the buttons 31 to 33 and displaying the selection picture 30 when the same use case occurs later.

In this embodiment, the button 35 is selected as a default.

As described above, by providing the buttons 34 and 35 to the vehicle-mounted device, it is not necessary to prepare a dedicated setting menu (a menu which can be used to set the operation of the vehicle-mounted device at any time by a user) for a use case rarely occurring and it is possible to suppress the number of items to be set by the dedicated setting menu as small as possible.

The description is continued referring to the sequence diagram of FIG. 3 again.

When it is sensed in step S136 that one of the buttons 31 and 32 is pressed by a user, the reading corresponding to the pressed button is performed in step S137.

In this way, in the use case where a call arrives while reading a mail, priority is given to the arrival of a call to rapidly enter the handsfree call state, and the reading of the mail under reading can be resumed after the end of the call.

Accordingly, in the state where the application of the vehicle-mounted device is performing a process requiring a predetermined time such as a mail reading process, the vehicle-mounted device can receive the arrival of a call of the HFP and it is possible to prescribe the operation of the vehicle-mounted device actualizing the multi-profile control of the MAP and the HFP. Since the selection picture 30 is automatically displayed after the end of the call, the user can smoothly enter the operation performed before the start of the call and it is thus possible to actualize the vehicle-mounted device convenient for use.

It has been stated in this use case that a call arrives while reading a mail, but when a call arrives after receiving a message and before reading the message in step S106, a process of reading the mail from the beginning can be automatically performed without displaying the selection picture 30 shown in FIG. 4.

The vehicle-mounted device according to Embodiment 1 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or the lower part than the HCE layer may be built in the near field communication unit 101 and the upper part than the HCI layer may be actualized by the software operating by the use of the CPU of the control unit 104.

The E-mail transmitting and receiving section is embodied using the near field communication unit 101, the control unit 104, the MAP communication protocol stored in the near field communication unit 101 so as to cause the control unit 104 to perform the processes of steps S103 to S106, and application software (which is stored in the control unit 104) for processing a received mail.

The E-mail reading section is embodied using the control unit 104, the speaker 106, and the voice converting unit 108 by causing the control unit 104 to perform the process of step S107 of FIG. 3.

The interruption section is embodied by causing the control unit 104 to perform the process of step S112 of FIG. 3 by the use of the application software stored in the control unit 104.

The ringtone ringing section is embodied using the near field communication unit 101, the control unit 104, and the speaker 106 by performing the processes of steps S113 to S115 of FIG. 3 by the use of the HFP, the communication protocol, and the application software stored in the control unit 104.

The call receiving section is embodied using the near field communication unit 101, the input unit 103, and the control unit 104 by causing the control unit 104 to perform the processes of steps S118 and S119 of FIG. 3 by the use of the application software issuing notification.

The call entering section is embodied using the near field communication unit 101 and the control unit 104 by causing the HFP, the communication protocol, and the application software to perform the processes of steps S120 to S126 shown in FIG. 3.

The call end sensing section is embodied using the near field communication unit 101 and the control unit 104 by causing the HFP, the communication protocol, and the application software to perform the processes of steps S129 to S134 shown in FIG. 3.

The reading resuming section is embodied using the control unit 104, the speaker 106, and the voice converting unit 108 by causing the control unit 104 to perform the process of step S137 of FIG. 3.

The selection section is embodied using the control unit 104 and the input unit 103 and is embodied by the use of the application software performing at least the function corresponding to the display details shown in FIG. 4 by the user's manipulation.

Embodiment 2

A navigation device 100 as the vehicle-mounted device according to Embodiment 2 of the invention has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

The navigation device 100 according to Embodiment 2 has features to be described below in a use case where an outgoing call is given from a user while reading a mail.

The operations of the navigation device 100 in the use case where an outgoing call is given from the user while the navigation device 100 is reading a mail will be described with reference to the sequence diagrams of FIGS. 5 and 6.

In this use case, the MAP and the HFP operate in a multi-profile operation manner.

It is assumed that the vehicle-mounted device 100 and the portable device are registered in Bluetooth (registered trademark) in advance and a communication line is set up therebetween.

Figure 5:
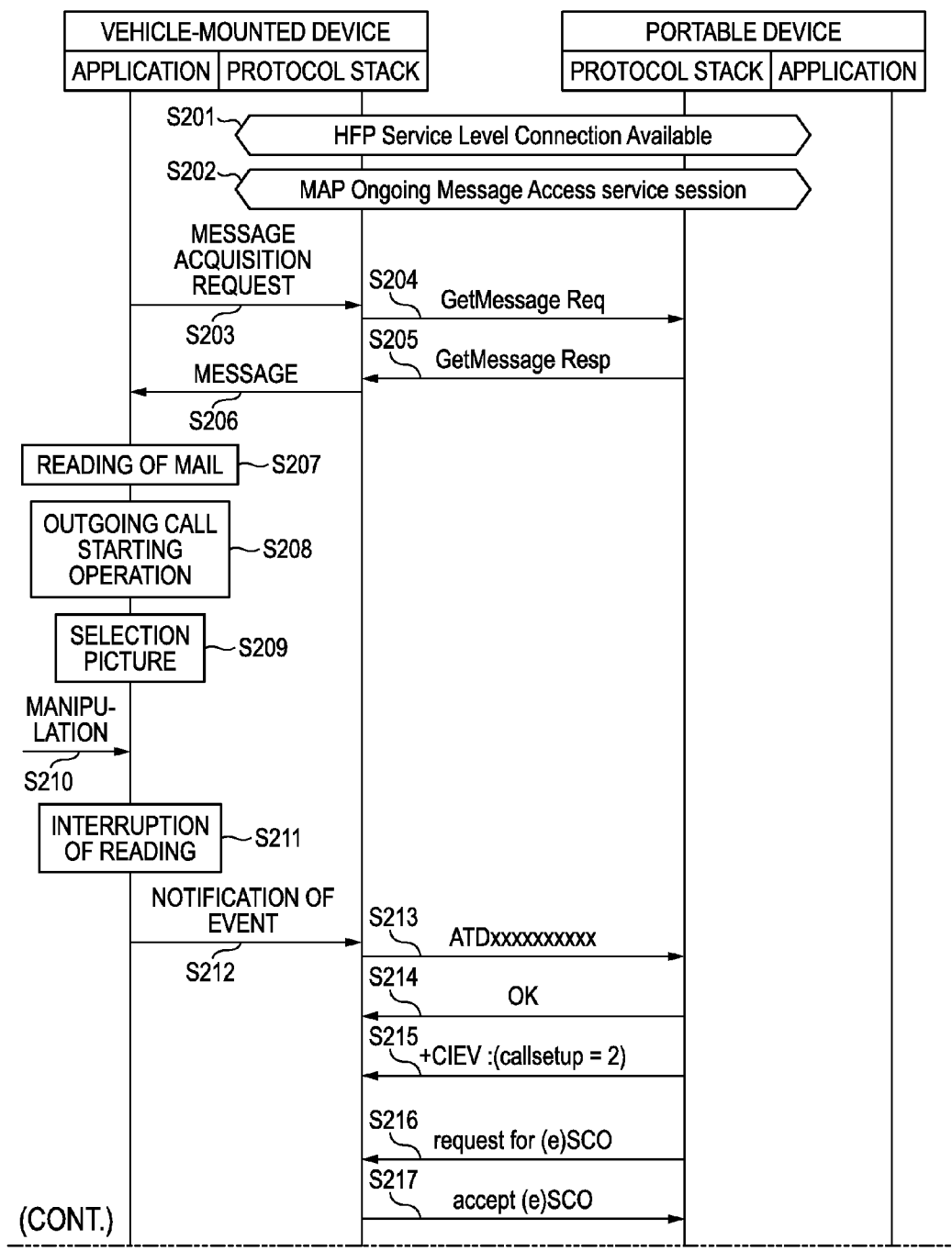
FIG. 5 is a sequence diagram illustrating the sequence of operations of the vehicle-mounted device when a call is sent out while reading an E-mail and when the reading is interrupted and the call is sent out at once.

In FIG. 5, the processes of steps S201 to S207 are the same as the processes of steps S101 to S107 and description thereof will not be repeated.

In step S208, a user performs a calling start operation by the use of the input unit 103. The calling start manipulation means an operation of giving a call to a desired destination, for example, by pressing ten keys for dialing included in the input unit 103, selecting an outgoing and incoming call history displayed on the display unit 102, or displaying a phone book downloaded from the mobile phone 10 and referring to the displayed phone book on the display unit 102.

In step S209, a selection picture is displayed on the display unit 102 of the navigation device 100.

An example of the selection picture displayed on the display unit 102 will be described below with reference to FIG. 7.

In FIG. 7, buttons 41 to 45 (corresponding to the input unit 103) are selectively arranged on the selection picture 40 displayed on the display unit 102.

The outgoing call selecting operation of selecting to end an operation of reading an E-mail under reading and to send a call, or to send a call after the reading of the E-mail is ended is performed as follows. That is, the button 41 is a button which is pressed when it is desired to interrupt the reading of a mail under reading and to give a call at once. When the button 41 is selected, the navigation device 100 ends the reading of the mail and performs the call giving process at once.

The button 42 is a button which is pressed when it is desired to give a call after the reading of the mail under reading is ended. When the button 42 is selected, the navigation device 100 performs a process of waiting for the end of the reading of the mail under reading and giving a call after the end thereof. The button is a button used to cancel the sending of the call.

The navigation device 100 can select whether the selection picture 40 should be displayed by the use of the buttons 44 and 45 when the same use case occurs later.

That is, the button 44 is a button for storing the operation allocated to one of the buttons 41 to 43 when a user presses one of the buttons 41 to 43 and automatically performing the stored operation without displaying the selection picture 40 when the same use case occurs later. The button 45 is a button for not storing the operation allocated to one of the buttons 41 to 43 even when a user presses one of the buttons 41 to 43 and displaying the selection picture 40 when the same use case occurs later.

In this embodiment, the button 45 is selected as a default.

As described above, by providing the buttons 44 and 45 to the vehicle-mounted device, it is not necessary to prepare a dedicated setting menu (a menu which can be used to set the operation of the vehicle-mounted device at any time by a user) for a use case rarely occurring and it is possible to suppress the number of items to be set by the dedicated setting menu as small as possible.

The description is continued referring to the sequence diagram of FIG. 5 again. In the subsequent sequence diagram, the reading of the mail under reading is interrupted and a call is sent out at once.

When the button 41 is pressed by the manipulation in step S210, the reading of the mail is interrupted in step S211.

In step S212, an event indicating a calling request is notified to the protocol stack 2 from the application of the navigation device 100.

The navigation device 100 transmits an AT command (ATD xxxxxxxxxx) indicating the calling to the portable device (step S213). The phone number of the destination is input to xxxxxxxxxx. The portable device returns an AT command (OK) indicating the acceptance as a response to the navigation device 100 (step S214).

The mobile phone 10 as the portable device transmits a result command (+CIEV) in which an indicator (callsetup=2) indicating the notification of the sending of the call to the navigation device 100 (step S215).

In step S216, a voice path ((e)SCO) setup request is transmitted from the mobile phone 10 to the navigation device 100. In step S217, an acceptance command of the voice path setup request is returned as a response thereto and a voice path is set up.

Subsequently, in step S218, a result command (+CIEV) having an indicator (callsetup=3) indicating that the opposite party is alert is transmitted from the mobile phone 10 to the navigation device 100.

In step S219, a response from the opposite mobile phone 20 is received by the mobile phone 10 via the network 1.

In steps S220 and S222, the mobile phone 10 transmits a result command (+CIEV) in which an indicator (call=1) indicating the start of a call and an indicator (callsetup=0) indicating the call non-setup are set to the navigation device 100.

In step S221, the application of the navigation device 100 receives an event entering an under-call state from the protocol stack 2.

The processes of steps S223 to S230 are the same as the processes of steps S127 to S134 and thus the description thereof is not repeated.

In step S231, the reading of the mail interrupted in step S211 is resumed. Although not shown in the sequence diagram of FIG. 3, the selection picture 30 shown in FIG. 4 may be displayed similarly to cause the user to select the reading of the mail from the beginning or the subsequent reading of the mail at the time of resuming the reading.

The operation of the navigation device 100 when the end of the reading of the mail under reading is waited and a call is sent after the end will be described with reference to the sequence diagram of FIG. 6. In the sequence diagram of FIG. 6, the case where the end of the reading of the mail under reading is waited and a call is sent after the end.

Figure 6:
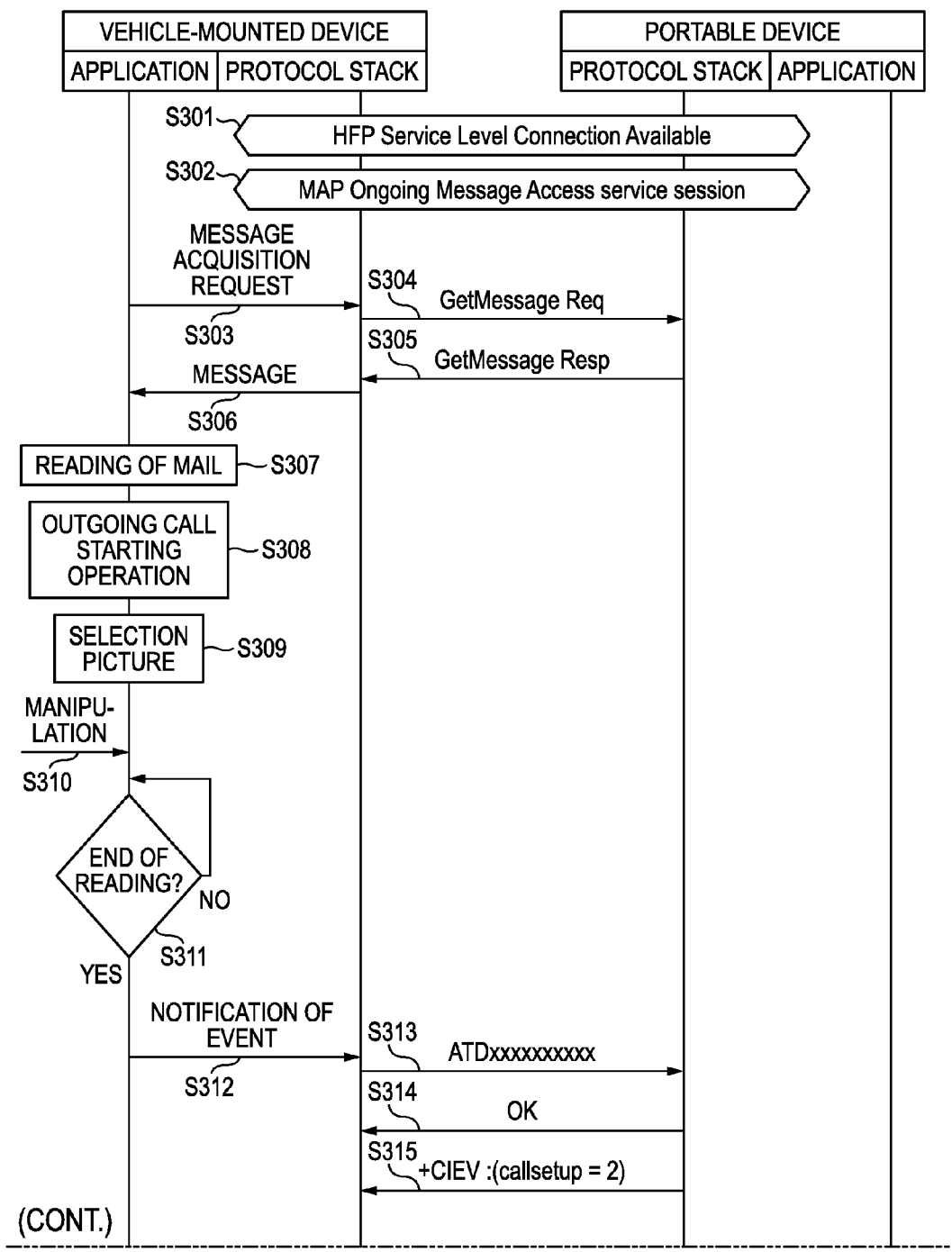
FIG. 6 is a sequence diagram illustrating the sequence of operations of the vehicle-mounted device when a call is sent out while reading an E-mail and the call is sent out after the reading is ended.

In FIG. 6, the processes of steps S301 to S309 are the same as the processes of steps S201 to S209 and thus the description thereof is not repeated.

When the button 42 is pressed by the user's manipulation in step S310, it is determined in step S311 whether the reading of the mail is ended.

When it is determined that the reading of the mail is not ended (No in step S311), the flow of processes is returned to step S310.

When it is determined that the reading of the mail is ended (Yes in step S311), the flow of processes goes to step S312.

The processes of steps S312 to step S330 are the same as the processes of steps S212 to S230 and thus the description thereof is not repeated.

As described hitherto, in the use case where a call is sent while reading the mail, a user is made to select whether the call is sent immediately or the call is sent after the end of the reading, and the handsfree call state is rapidly entered when the user selects that the call should be sent immediately.

When the call is sent immediately, the reading of the mail under reading can be resumed after the end of the call and thus the operation before the call can be rapidly performed again.

Accordingly, even when an application performs a process requiring a predetermined time such as reading a mail, it is possible to prescribe the operation of the vehicle-mounted device of receiving the calling of the HFP and actualizing the multi-profile control of the MAP and the HFP.

Since the selection picture is automatically displayed before sending a call, it is possible to smoothly go to the operation desired by the user. Particularly, even when the user unintentionally sends a call, the call can be sent after the end of the reading, which is confident to the user.

In the use case of this embodiment, it has been stated that a call is sent while reading a mail. However, when a calling request is given after receiving a message in step S106 and before reading the message, the call can be sent immediately without displaying the selection picture 40 shown in FIG. 7.

The vehicle-mounted device according to Embodiment 2 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or may be embodied by the software operating by the use of the CPU of the control unit 104.

The E-mail transmitting and receiving section is embodied using the near field communication unit 101, the control unit 104, the MAP communication protocol stored in the near field communication unit 101 so as to cause the control unit 104 to perform the processes of steps S103 to S106, and the application software (which is stored in the control unit 104) for performing the processes of steps S203 to S206 of FIG. 5 and the processes of steps S303 to S306 of FIG. 6 on the received mail.

The E-mail reading section is embodied using the control unit 104, the speaker 106, and the voice converting unit 108, and the application software causing the control unit 104 to perform the processes of step S207 of FIG. 5 and step S307 of FIG. 6.

The outgoing call sensing section is embodied using the input unit 103, the control unit 104, the application software causing the control unit 104 to perform the processes of steps S208 of FIG. 5 and step S308 of FIG. 6.

The outgoing call selecting section is embodied using the control unit 104, the input unit 103, and the application software performing at least the functions corresponding to the display details shown in FIG. 7 by the user's manipulation.

The interruption section is embodied by causing the control unit 104 to perform the process of step S211 of FIG. 5 by the use of the application software stored in the control unit 104.

The control means is embodied using the application software causing the control unit 104 to perform the processes of steps S311 and S312 of FIG. 6.

The reading resuming section is embodied using the control unit 104, the speaker 106, the voice converting unit 108, and the application software performing the process of step S231 of FIG. 5.

Embodiment 3

A navigation device 100 as the vehicle-mounted device according to Embodiment 3 of the invention has the same entire configuration as the navigation device 100 as the vehicle-mounted device according to Embodiment 1 and thus detailed description thereof is not repeated.

A mobile phone used in this embodiment has the functions equivalent to those of the mobile phones 10 and 20 used in Embodiment 1.

The navigation device 100 as the vehicle-mounted device according to Embodiment 3 has features to be described below in a use case where an arrival of a new mail is notified under a handsfree call.

The operation of the navigation device 100 in the use case where an arrival of a new mail is notified under a handsfree call will be described below with reference to the sequence diagram of FIG. 8.

In this use case, the MAP and the HFP operate in a multi-profile operation manner.

It is assumed that the vehicle-mounted device 100 and the portable device are registered in Bluetooth (registered trademark) in advance and a communication line is set up therebetween.

Figure 8:
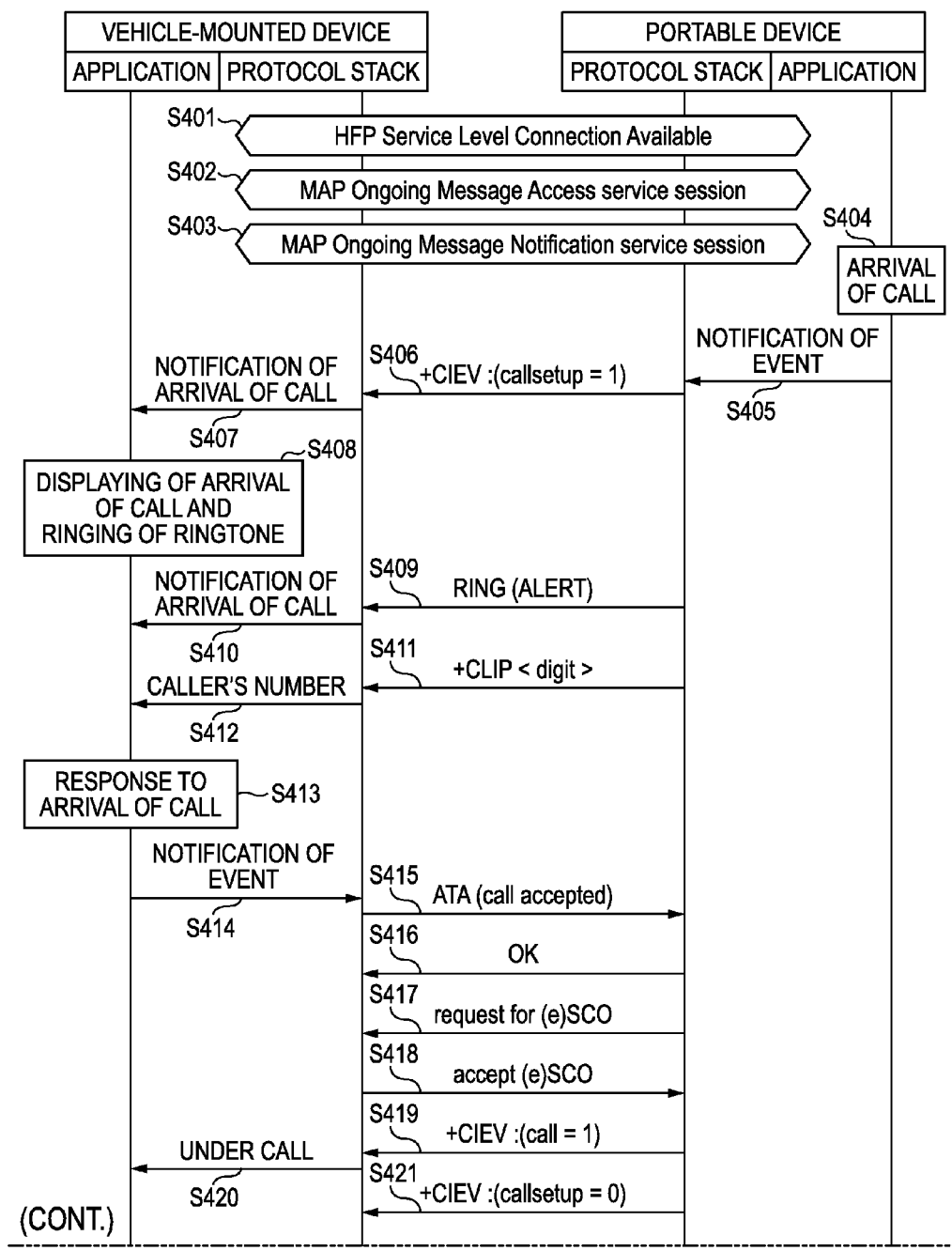
FIG. 8 is a sequence diagram illustrating the sequence of operations of the vehicle-mounted device which delays notification of an arrival of a new E-mail when the arrival of the new E-mail is notified under a handsfree call.

In FIG. 8, the processes of steps S401 to S402 are the same as the processes of steps S101 to S102 described in Embodiment 1 and thus description thereof will not be repeated.

Step S403 represents a state where a message notification service session of the MAP is set up.

The processes of steps S404 to S422 are the same as the processes of steps S108 to S111 and the processes of S113 to S127 and thus description thereof will not be repeated.

When a new mail arrives at the portable device via the network 1 under a handsfree call (step S423), a command (SendEvent_Req( )) for notifying the arrival of a message from the protocol stack 2 of the portable device to the navigation device 100 is issued (step S424).

The navigation device 100 returns a response (SendEvent_Resp( )) to the command for notifying the arrival of a new message in step S424 to the portable device (step S425).

In step S426, an event indicating that there is a message newly arriving at the portable device is notified from the protocol stack 2 to the application.

The application of the navigation device 100 determines that it is under the HFP call and suppresses the notification of the arrival of a new mail (step S427).

The processes of steps S428 to S434 are the same as the processes of steps S128 to S134 and thus description thereof will not be repeated.

When sensing that the end of the HFP call is sensed by the end of a call in step S433, the application of the navigation device 100 notifies the arrival of a new mail (step S435). The notification of the arrival of a new mail is performed through the use of the display unit 102 and/or the speaker 106.

It has been stated that it is under the HFP call, but even when an arrival of a new mail is notified under an outgoing call or under an incoming call, the notification of the arrival of a new mail can be supplied and the arrival of a new mail can be notified after the end of the call, similarly.

In this way, in the use case where a new mail arrives under a call, the vehicle-mounted device operates so as to give priority to the call and to suppress the notification of the arrival of a new mail under the call and to notify the arrival of a new mail after the end of the call. Accordingly, the operation of the vehicle-mounted device actualizing the multi-profile control of the MAP and the HFP can be prescribed so as to receive a newly-arriving mail of the MAP even when the application performs the HFP process under a call. Since the user can continue to have a call without caring about other events such as the notification of the arrival of a new mail, it is possible to implement a vehicle-mounted device which can achieve the simplified manipulation and which is convenient for use.

The suppression of the notification of the arrival of a new mail (step S427) may be carried out only while the vehicle is traveling and the arrival of a new mail may be notified through the use of the display unit 102 while the vehicle is stopped. Accordingly, the vehicle-mounted device can operate so as for a user to pay attention to the driving while the vehicle is traveling and so as to give priority to the convenience to the user while the vehicle is stopped.

The vehicle-mounted device according to Embodiment 3 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or may be embodied by the software operating by the use of the CPU of the control unit 104.

The call section is embodied using the near field communication unit 101, the control unit 104, the microphone 105, the speaker 106, and the application software causing the control unit 104 to perform the processes of steps S406 to S422 of FIG. 8 by the use of the HFP protocol stored in the near field communication unit 101.

The received mail sensing means is embodied using the near field communication unit 101, the control unit 104, and the application software causing the control unit 104 to perform the processes of steps S424 to S426 of FIG. 8 by the use of the MAP communication protocol stored in the near field communication unit 101.

The state acquiring section is embodied using the near field communication unit 101, the control unit 104, and the application software causing the control unit 104 to perform the processes of steps S419 to S421 of FIG. 8 by the use of the HFP protocol stored in the near field communication unit 101.

The suppression section is embodied by causing the control unit 104 to perform the process of step S427 of FIG. 8.

The notification section is embodied using the control unit 104, the display unit 102 or the speaker 106, and the application software performing the process of step S435 of FIG. 8.

Embodiment 4

A navigation device 100 as the vehicle-mounted device according to Embodiment 4 of the invention has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

Although the use case where the arrival of a new mail is notified under a handsfree call using the navigation device 100 as the vehicle-mounted device has been described in Embodiment 3, there is a use case where a user wants to view a mail under a call.

The operation of the navigation device 100 in the use case where a mail is viewed under a handsfree call will be described below as Embodiment 4 with reference to the sequence diagram of FIG. 9.

In this use case, the MAP and the HFP operate in a multi-profile operation manner.

It is assumed that the vehicle-mounted device 100 and the portable device are registered in Bluetooth (registered trademark) in advance and a communication line is set up therebetween.

Figure 9:
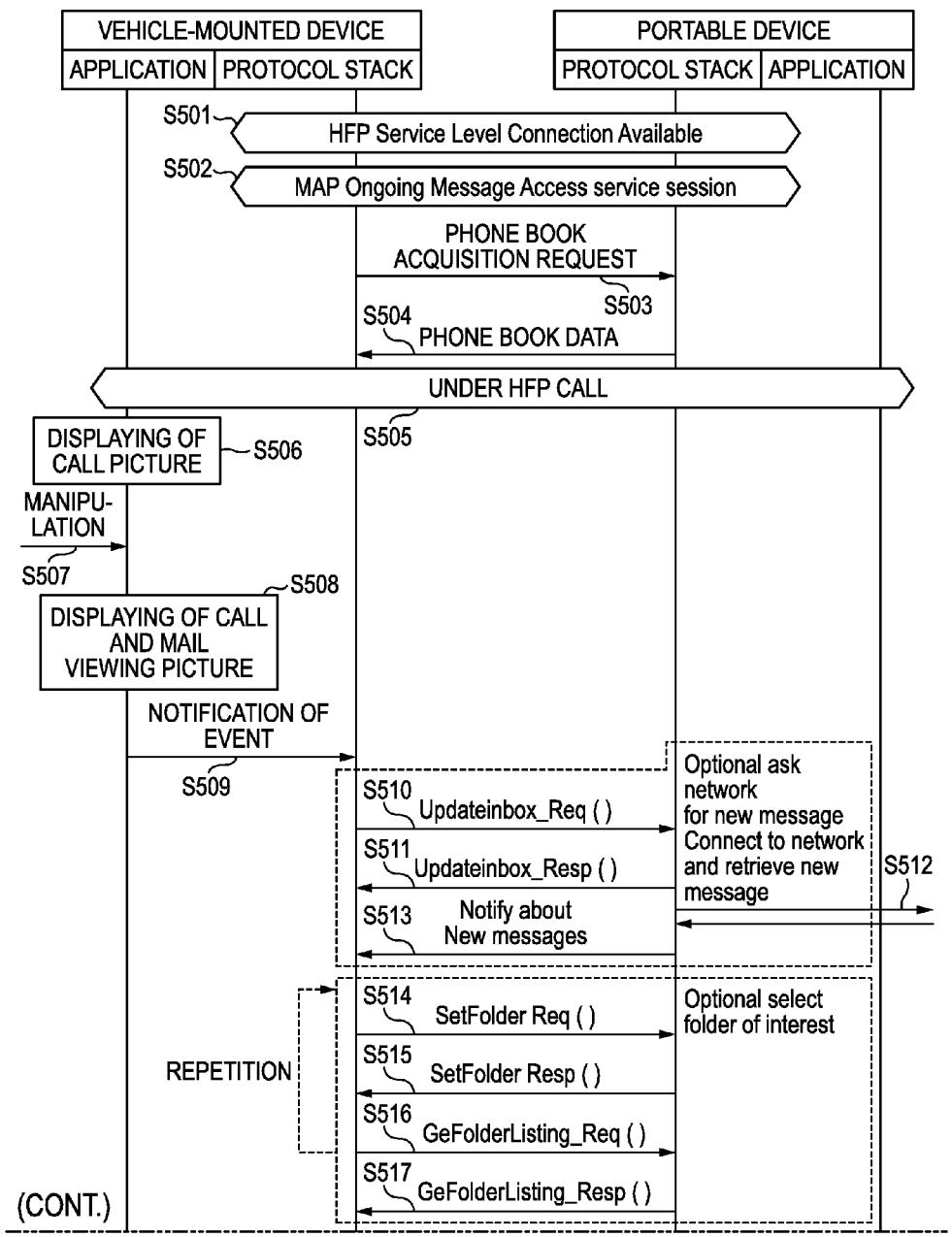
FIG. 9 is a sequence diagram illustrating the sequence of operations of the vehicle-mounted device when an E-mail is viewed under a handsfree call.

In FIG. 9, the processes of steps S501 to S502 are the same as the processes of steps S101 to S102 and thus description thereof will not be repeated.

In steps S503 and S504, the phone book of the portable device is input to the navigation device 100 using the profile such as the OPP or the PBAP in advance. For example, by using vCard ver. 2.1 or ver. 3.0 which is the standard format of an electronic business card as the phone book format, at least "name", "mail address", "phone number", and "data of attribute values corresponding to kana pronouncing" are input. The input data is stored in the storage unit 107.

Step S505 represents a state where a handsfree call is performed. A voice input from the microphone 105 reaches the portable device through the voice path and reaches the mobile phone 20 through the network 1. On the other hand, a voice from the mobile phone 20 reaches the navigation device 100 through the voice path similarly and is output from the speaker 106. Since it is in the handsfree call state, various messages are exchanged between the navigation device 100 and the portable device. Such messages are described above with reference to the sequence diagrams of FIGS. 3 and 5 and thus are not shown in this drawing.

When the navigation device 100 and the portable device enter the handsfree call state through the use of the exchange of the HFP commands, a call picture 50 is displayed on the display unit 102 (step S506).

An example of the call picture displayed on the display unit 102 in Embodiment 4 will be described below with reference to FIG. 10. A screen of a touch panel is shown in FIG. 10. Buttons 51 to 55 (corresponding to the input unit 103) are selectively arranged on the call picture 50. Information windows 56 to 58 are information windows for displaying information and a volume indicator 59 is additionally displayed on the screen of the touch panel.

The button 51 is a button used to lower the call volume. When the button 51 is pressed, the display of the volume indicator 59 is changed.

The button 52 is a button used to raise the call volume. When the button 52 is pressed, the display of the volume indicator 59 is changed.

The button 53 is a button used to end a call. When the button 53 is pressed, the handsfree call is ended.

The button 54 is a button used to enter a call and mail viewing picture 60 (a picture from which received mails exchanged with the opposite party of the call in the past can be checked) to be described later.

The button 55 is a button used to enter a call and mail viewing picture 70 (a picture from which transmitted mails exchanged with the opposite party of the call in the past can be checked) to be described later.

The buttons 54 and 55 execute the traveling regulation. In this case, a traveling state on whether the vehicle is traveling or is stopped is determined and a process corresponding to this determination result is performed. That is, when the traveling determining unit 109 determines that the vehicle is traveling, the buttons are toned down and are not manipulated by a user.

On the other hand, when the traveling determining unit 109 determines that the vehicle is stopped, the buttons can be manipulated. The information window 56 is a window for displaying a call time between the mobile phone 10 and the mobile phone 20. The navigation device 100 appropriately updates the display.

The information window 57 is a window for displaying information of the opposite party of the call. The information of the opposite party of a call includes the name of the opposite party or the phone number of the opposite party. This information is displayed on the basis of the phone book data acquired from the portable device. When the phone book data of the opposite party is not acquired yet, only the phone number of the opposite party is displayed.

In addition, the Bluetooth (registered trademark) signal strength, the remaining battery power of the portable device, the antenna state (reception intensity) of the portable device, and the like may be displayed on the call picture shown in FIG. 10.

The description is continued referring to the sequence diagram of FIG. 9 again.

When it is sensed in step S507 that the user presses one of the buttons 54 and 55, a call and mail viewing picture is displayed in step S508. The call and mail viewing picture is a picture which is displayed in the course of performing both a call process and a mail viewing process.

An example of the call and mail viewing picture displayed on the display unit 102 in Embodiment 4 will be described with reference to FIGS. 11 and 12.

In this embodiment, the call and mail viewing picture includes a call and mail viewing picture 60 (reception box) for displaying information relevant to the incoming mail received by the user and a call and mail viewing picture 70 (transmission box) for displaying information relevant to the outgoing mail transmitted by the user.

Figure 12:
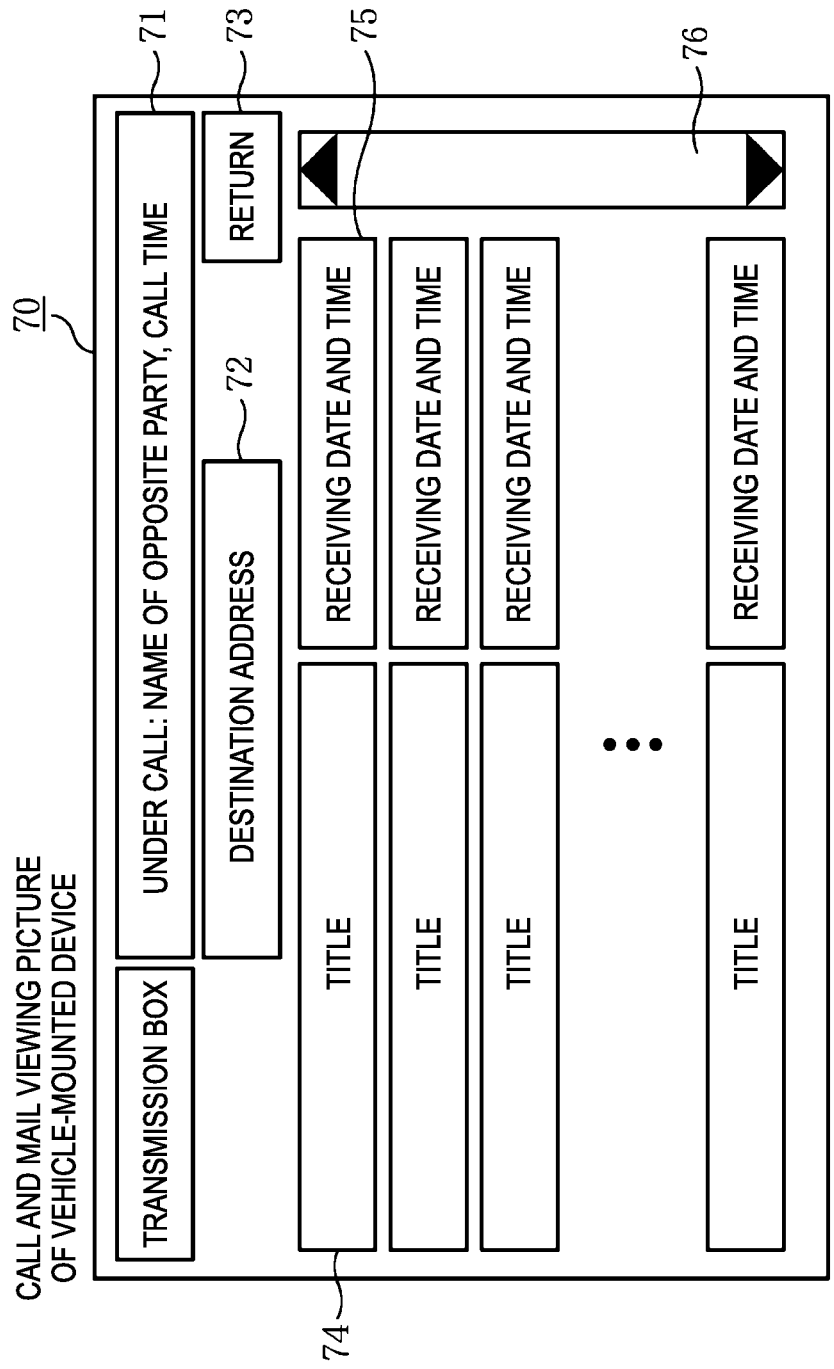
FIG. 12 is a schematic diagram illustrating an example of a call and mail viewing picture (Transmission Box) displayed on the display unit 102 of the vehicle-mounted device.

FIG. 11 shows the call and mail viewing picture 60 (reception box) which is entered by pressing the button 54 and FIG. 12 shows the call and mail viewing picture 70 (transmission box) which is entered by pressing the button 55.

As shown in FIG. 11, the information of the incoming mail is displayed on the call and mail viewing picture 60. That is, information windows 61 and 62, a selectable button 63 (corresponding to the input unit 103), a title 64 (selectable) of an incoming mail, a reception date and time 65 (selectable) of an incoming mail, and a slider bar 66 are arranged on the call and mail viewing picture 60.

The information window 61 is a window for displaying a character string indicating a call state, a name of the opposite party of the call, and a call time.

The information window 62 is a window for displaying a source address (the opposite party). The destination address may not be displayed since it is obvious as an address given to the portable device, but may be displayed when the portable device has plural addresses.

The button 63 is a button used to go back to the call picture. By pressing this button when it is intended to end the viewing of the mails, it is possible to go back to the call picture.

When the title 64 or the reception date and time 65 is pressed, the text of the corresponding mail is displayed on the display unit 102 and the details of the mail can be referred to by the user.

The title 64 and the reception date and time 65 are displayed as a list by the number which can be displayed on the screen of the navigation device 100. Regarding the parts not displayed on the screen, a display area can move to check a desired list of outgoing mails by causing a user to manipulate the slider bar 66.

The incoming mails are sorted from the mail closest to the current time and are sequentially displayed.

When a call is started up therebetween after the user of the mobile phone 20 transmits a mail to the user of the mobile phone 10, the delivery of the mail through the network 1 is delayed, the mail from the opposite party is not displayed on the call and mail viewing picture, and the mail arrives in the process of the call, the navigation device 100 updates the list of the title 64 and the reception date and time 65 on the call and mail viewing picture.

On the other hand, as shown in FIG. 12, the information of the outgoing mail is displayed on the call and mail viewing picture 70. That is, information windows 71 and 72, a selectable button 73 (corresponding to the input unit 103), a title 74 (selectable) of an incoming mail, a reception date and time 75 (selectable) of an incoming mail, and a slider bar 76 are arranged on the call and mail viewing picture 70.

The information window 71 is a window for displaying a character string indicating a call state, a name of the opposite party of the call, and a call time.

The information window 72 is a window for displaying a source address (the opposite party). The destination address may not be displayed since it is obvious as an address given to the portable device, but may be displayed when the portable device has plural addresses.

The button 73 is a button used to go back to the call picture. By pressing this button when it is intended to end the viewing of the mails, it is possible to go back to the call picture 70.

When the title 74 or the reception date and time 75 is pressed, the text of the corresponding mail can be referred to.

The title 74 and the reception date and time 75 are displayed as a list by the number which can be displayed on the screen of the navigation device 100. Regarding the parts not displayed on the screen, a display area can move to check a desired list of outgoing mails by causing a user to manipulate the slider bar 76.

The outgoing mails are sorted from the mail closest to the current time and are sequentially displayed.

The description is continued referring to the sequence diagram of FIG. 9 again.

In step S509, an event is notified from the application of the navigation device 100 to the protocol stack 2. This event is appropriately transmitted when the user manipulates the call and mail viewing picture (only one is shown but the other is not shown in the drawing).

Steps S510 to S523 represent the exchange of commands based on the MAP. The rectangle surrounded with a dotted line and the dotted arrow are an option, which represents that the exchange of commands is not fixed.

In step S524, the event notification of notifying the event from the protocol stack 2 of the navigation device 100 to the application is appropriately performed as a response to step S509.

UpdateInbox_Req( ) of step S510 is a command for instructing to update the details of the mail box of the portable device. UpdateInbox_Resp( ) of step S511 is a response to step S510.

In step S512, the portable device checks whether a new mail arrives through the network 1.

"Notify about New messages" of step S513 represents the notification of a newly-arriving mail and is transmitted when there is a newly-arriving mail as the result of updating the mail box of the portable device.

SetFolderReq( ) of step S514 is a command for setting the folder layer of the mail box of the portable device from the navigation device 100. SetFolderResp( ) of step S515 is a response to step S514.

GeFolderListing_Req( ) of step S516 is a command for acquiring the folder structure of the portable device. GeFolderListing_Resp( ) of step S517 is a response to step S516.

GetMessageListing_Req( ) of step S518 is a command for acquiring a list of messages (a list in which the title 64 and the reception date and time 65 of FIG. 11 are displayed). In step S518, when the call and mail viewing picture 60 (reception box) is displayed on the display unit 102, the source acquires the list through the filtering with the address of the opposite party. When the call and mail viewing picture 70 (transmission box) is displayed, the destination acquires the list through the filtering with the address of the opposite party. GetMessageListing_Resp( ) of step S519 is a response to step S518.

GetMessageReq( ) of step S520 is a command for acquiring a message of the mail text. In the example shown in FIG. 11, GetMessageReq( ) is issued when the title 64 or the reception date 65 is pressed. GetMessageResp( ) of step S521 shown in FIG. 11 is a response to step S520.

SetMessageStatusReq( ) of step S522 is a command for changing the status (reading/non-reading and the like) of the mail from the navigation device 100 to the portable device. SetMessageStatusResp( ) of step S523 is a response to step S522.

When the viewing is ended, that is, the "return" button 73 on the call and mail viewing picture is pressed, in step S525, the call picture is displayed in step S526.

As described above, by providing a button which can enable the viewing of a mail to the call picture, it is possible to check the mails exchanged with the opposite party of the call under the call by one manipulation and to implement the vehicle-mounted device which can actualize the multi-profile operation of the MAP and the HFP and which is convenient for use.

Particularly, when the recently transmitted and received mails become the topic under the call, the user can simply check the details of the mail transmitted and received to and from the opposite party. Accordingly, the user can check the details of the mails immediately without causing the opposite party to wait.

By the traveling regulation, the button 54 and the button 55 are not manipulated while driving.

When a call is given to the opposite party of which the mail address is not registered in the phone book acquired from the portable device, it is preferable that the button 54 and the button 55 on the call picture shown in FIG. 10 are toned down so as for a user not to manipulate the buttons or are not displayed.

The vehicle-mounted device according to Embodiment 4 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or may be embodied by the software operating by the use of the CPU of the control unit 104.

The call section is embodied using the near field communication unit 101, the control unit 104, the microphone 105, the speaker 106, and the application software causing the control unit 104 to perform the process of step S505 of FIG. 9 by the use of the HFP protocol stored in the near field communication unit 101.

The call picture display section is embodied using the control unit 104, the display unit 102, and the application software of performing at least the function corresponding to the display details shown in FIG. 10 and performing at least the process of step S506 of FIG. 9 in response to the user's manipulation.

The phone book acquiring section is embodied using the near field communication unit 101, the control unit 104, the storage unit 107, and the application software of performing the processes of steps S503 and S504 of FIG. 9 by the use of the OPP or PBAP communication protocol stored in the near field communication unit 101.

The opposite party specifying section is embodied using the near field communication unit 101, the control unit 104, the storage unit 107, and the application software of performing a process of combining the phone book data stored in the storage unit 107 in advance and the phone number data of the opposite party transmitted as the CLIP command of the HFP protocol.

The button arranging section is embodied using the display unit 102, the control unit 104, the application software of performing the process of step S506 of FIG. 9, and the application software of performing the function corresponding to the details indicated by the buttons 54 and 55 of FIG. 10 in response to the user's manipulation.

The traveling and stop determining means corresponds to the traveling determining unit 109 and the function thereof is embodied using the vehicle speed sensor or the GPS and the application software stored in the control unit 104, as described in Embodiment 1.

The traveling regulating section can be embodied using the control unit 104 and the display unit 102. That is, the control unit 104 regulates the details to be displayed on the display unit 102 depending on the traveling state of the vehicle (whether the vehicle is traveling or is stopped).

The button press sensing section is embodied using the display unit 102 or the input unit 103, the control unit 104, and the application software of performing the process of step S507 of FIG. 9.

The call and mail viewing picture display section is embodied using the control unit 104, the display unit 102, and the application software of causing the control unit 104 to perform the process of step S508 of FIG. 9.

The search section is embodied, using the near field communication unit 101, the control unit 104, the storage unit 107, and the application software of performing the processes of steps S514 to S517 of FIG. 9 by the use of the MAP communication protocol.

The list acquiring section is embodied using the near field communication unit 101, the control unit 104, the storage unit 107, and the application software of performing the processes of steps S518 and S519 of FIG. 9 by the use of the MAP communication protocol.

The list request means is embodied using the near field communication unit 101, the control unit 104, the storage unit 107, and the application software of performing the processes of steps S520 and S521 of FIG. 9 by the use of the MAP communication protocol.

The mail display section is embodied using the display unit 102, the control unit 104, and the application software of performing the process of step S508 of FIG. 9. The details displayed on the display unit 102 are appropriately updated through the process of step S524. The status change request section is embodied using the near field communication unit 101, the control unit 104, the storage unit 107, and the application software of performing the processes of steps S522 and S523 of FIG. 9 by the use of the AMP communication protocol.

Embodiment 5

A navigation device 100 as the vehicle-mounted device according to Embodiment 5 of the invention has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

The navigation device 100 as the vehicle-mounted device according to Embodiment 5 has features to be described below in a use case where a mail transmitting request is given under a handsfree call.

The operation of the navigation device 100 according to Embodiment 5 of the invention will be described below with reference to the sequence diagram of FIG. 13.

In this use case, the MAP and the HFP operate in a multi-profile operation manner.

It is assumed that the vehicle-mounted device 100 and the portable device are registered in Bluetooth (registered trademark) in advance and a communication line is set up therebetween.

Figure 13:
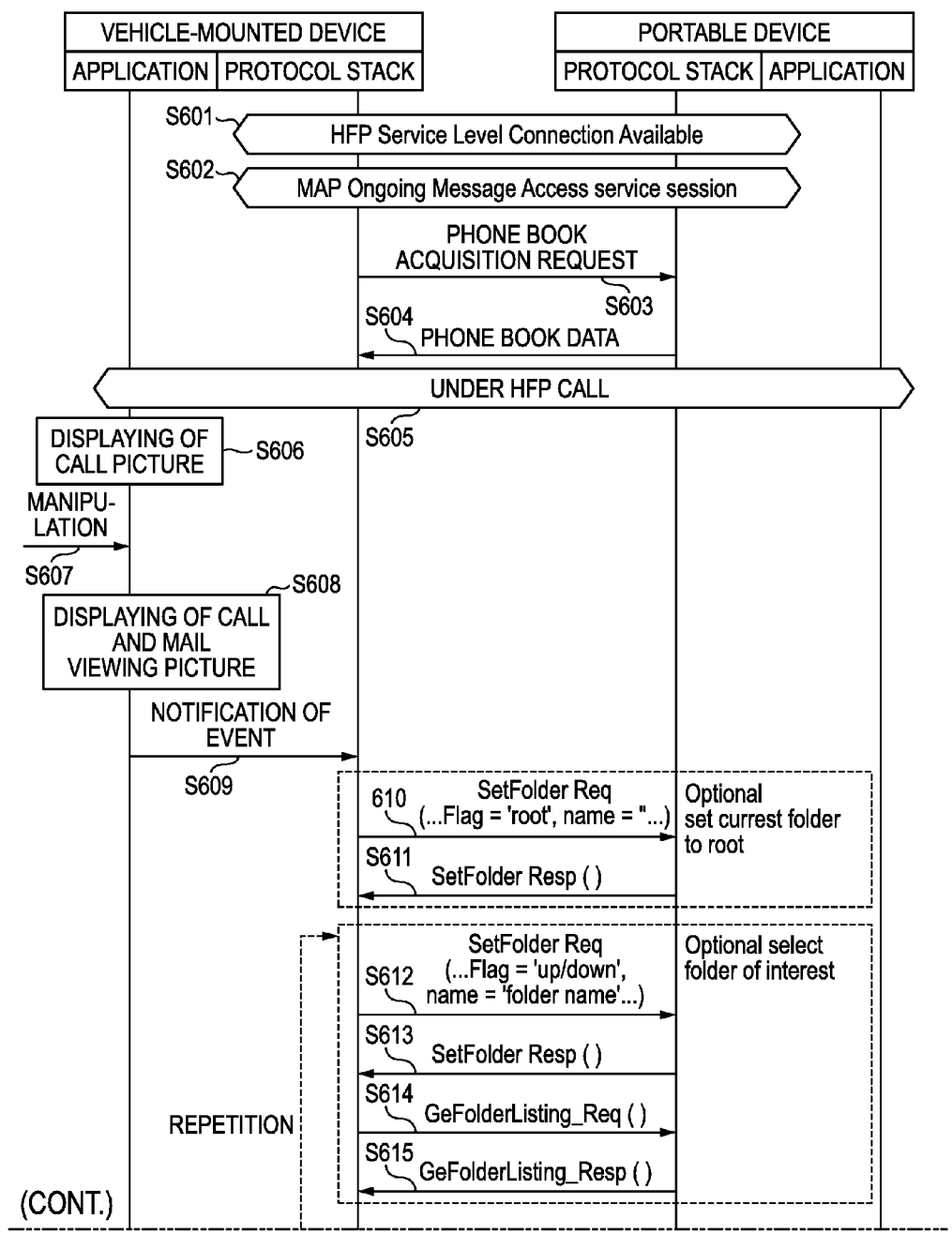
FIG. 13 is a sequence diagram illustrating the sequence of operations of the vehicle-mounted device when an E-mail is requested to transmit under a handsfree call.

In FIG. 13, the processes of steps S601 to S605 are the same as the processes of steps S501 to S505 described with reference to FIG. 9 in Embodiment 4 and thus description thereof will not be repeated.

When entering a handsfree call state, a call picture which is a display picture of information on the call situation is displayed on the display unit 102 (step S606).

An example of the call picture displayed on the display unit 102 will be described below with reference to FIG. 14.

Figure 14:
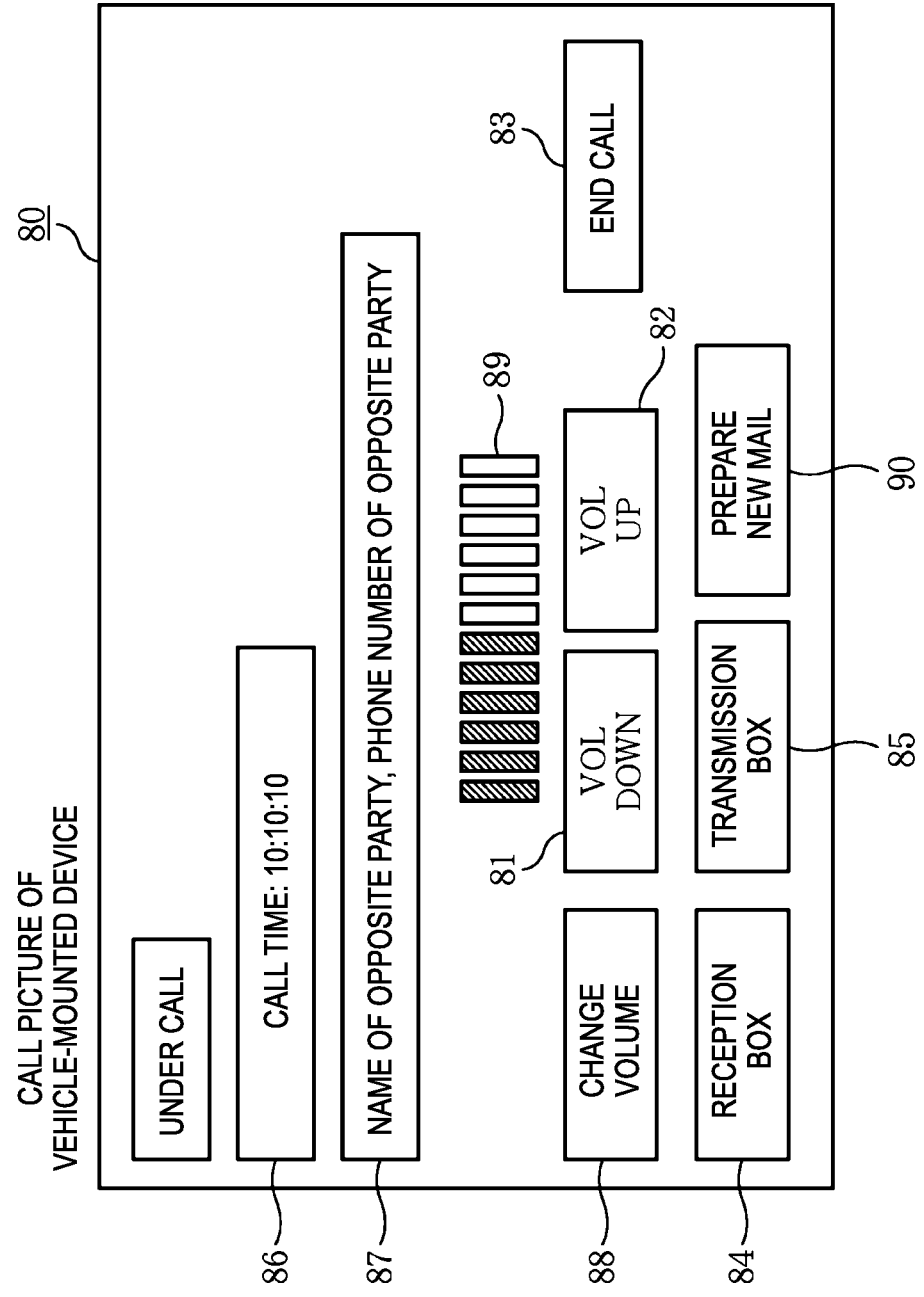
FIG. 14 is a schematic diagram illustrating an example of a call picture displayed on the display unit 102 of the vehicle-mounted device.

The call picture 80 shown in FIG. 14 is a screen of a touch panel. Buttons 81 to 85 and a button 90 (corresponding to the input unit 103) are selectively arranged on the call picture. Information windows 86 to 88 are information windows for displaying information and a volume indicator 89 is additionally displayed on the screen of the touch panel.

The buttons 81 to 89 have the same meanings and functions as the buttons 51 to 59 described with reference to FIG. 10 in Embodiment 4 and thus description thereof will not be repeated.

The button 90 is a button used to enter a call and mail preparing picture (a picture in which a mail can be prepared and transmitted to the opposite party of the call) to be described later.

The button 90 executes the traveling regulation. In this case, a traveling state on whether the vehicle is traveling or is stopped is determined and a process corresponding to this determination result is performed. That is, when the traveling determining unit 109 determines that the vehicle is traveling, the button is toned down and is not manipulated by a user. On the other hand, when the traveling determining unit 109 determines that the vehicle is stopped, the button can be manipulated.

In addition, the radio signal strength of the radio communication, the remaining battery power of the portable device, the antenna state (reception intensity) of the portable device, and the like may be displayed on the call picture 80 shown in FIG. 14.

When it is sensed in step S607 that the user presses the button 90, the navigation device 100 displays a call and mail preparing picture in step S608. The call and mail preparing picture is a picture which is displayed on the display unit 102 in the course of performing both a call process and a mail preparing process.

Figure 15:
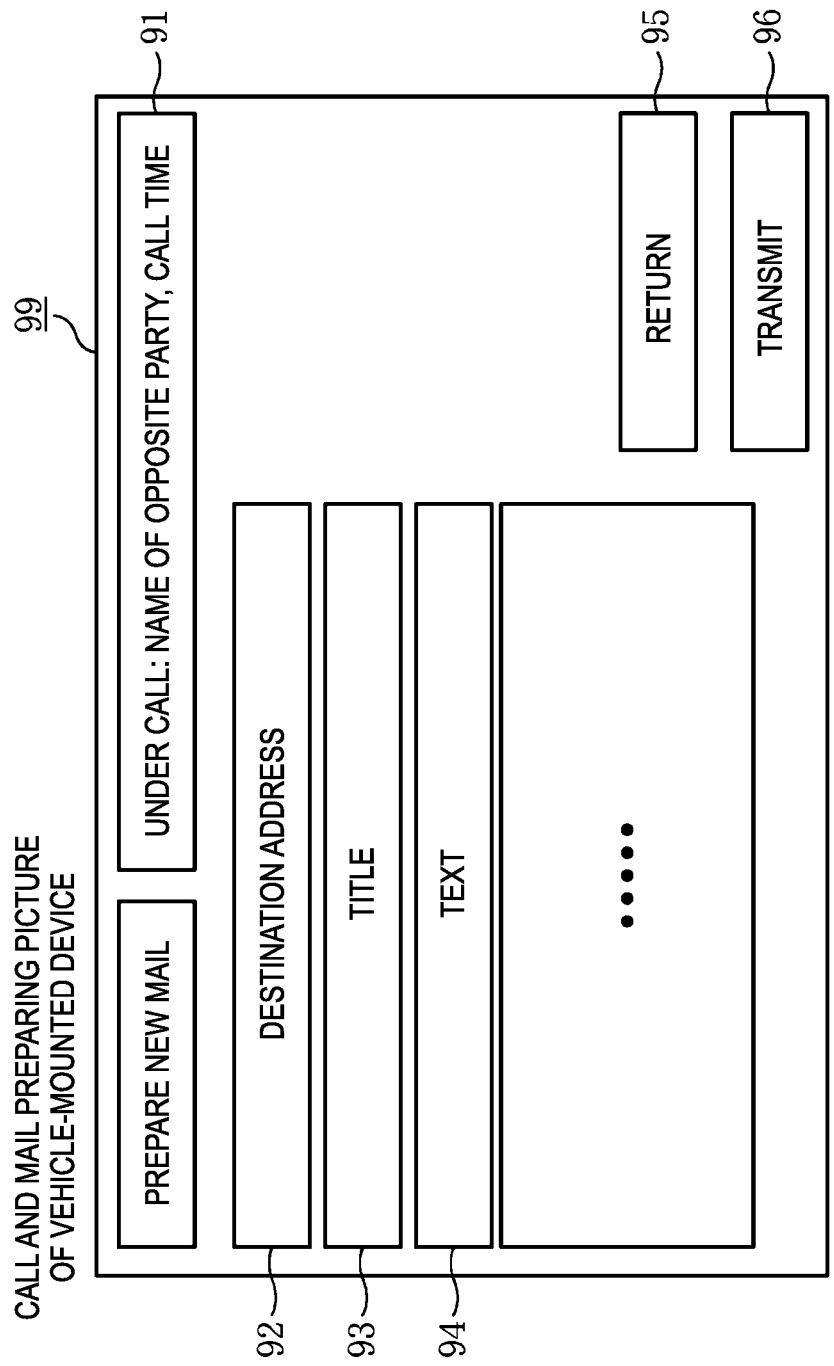
FIG. 15 is a schematic diagram illustrating an example of a call picture displayed on the display unit 102 of the vehicle-mounted device.

An example of the call and mail preparing picture displayed on the display unit 102 will be described with reference to FIG. 15. FIG. 15 shows a call and mail preparing picture 99 which is entered when the button 90 is pressed.

In FIG. 15, the call and mail preparing picture 99 includes an information window 91, selectable buttons (corresponding to the input unit 103) 95 and 96, and mail preparing windows 92, 93, and 94 (selectable). The address of the opposite party is automatically input as a destination address to the mail preparing window 92. The address of the opposite party of a call is acquired by searching the previously-acquired phone book data by the use of the phone number of the opposite party. When there are plural addresses, one address is selected. The mail preparing window 93 is a mail preparing window for inputting the title and the mail preparing window 94 is a mail preparing window for inputting the mail text.

When the mail preparing window 93 (title) of the call and mail preparing picture 99 is touched, the title of the mail can be input. At this time, a software keyboard for inputting characters is displayed on the display unit 102. Similarly, when the mail preparing window 94 (mail text) is touched, the text of the mail can be input. At this time, a software keyboard for inputting characters is also displayed. Several routine messages for the title or the mail text may be prepared in advance by the vehicle-mounted device and the user may be made to select one routine message. Alternatively the received mail may be transmitted to the opposite party.

A character string indicating a call state, a name of the opposite party of the call, and a call time are displayed in the information window 91. The call time is appropriately updated by the navigation device 100.

The button 95 is a button used to go back to the call picture 80. By pressing this button 95 when the user wants to cancel the preparing or transmitting of a mail, it is possible to go back to the call picture 80.

The button 96 is a button used to transmit the text of the prepared mail by the user.

In this way, by providing the buttons which can enable the preparing of a mail to the call picture, it is possible to enter the mail preparing picture having the opposite party of the call as the destination by one manipulation and to transmit the prepared mail text to the portable device. A process of automatically storing a variety of information based on the movement of the vehicle such as position information or route information of the vehicle-mounted device and expected destination arriving time may be performed on the mail text.

By storing the position information, for example, a driver can transmit the current position of the vehicle while having a call with the family at home. The mail address of the home may be set in advance and a button of "notification returned to home" may be disposed in the picture under the call. In this case, when the driver presses the button of "notification returned to home" under the call, it may be possible to transmit the mail storing the position information of the vehicle. At home, a variety of information based on the movement of the vehicle such as the position of the vehicle can be displayed on a display of the home on the basis of the position information received from the vehicle.

Accordingly, it is possible to implement a vehicle-mounted device which can actualize the multi-profile operation of the MAP and the HFP and which is convenient for use. Since the button 90 is not manipulated while driving due to the traveling regulation, the user can pay attention to the driving without simultaneously performing three tasks of the driving, the call, and the mail preparation.

The description is continued referring to the sequence diagram of FIG. 13 again.

In step S609, an event is notified from the application of the navigation device 100 to the protocol stack 2. This event is appropriately transmitted when the user manipulates the call and mail preparing picture 99. Although not shown in the call and mail preparing picture 99 of FIG. 15, it includes the operation designation such as pushing a message to a folder of the portable device.

Steps S610 to S617 represent the exchange of commands based on the MAP. The rectangle surrounded with a dotted line is an option, which represents that the exchange of commands is not fixed.

In step S618, the event notification of notifying the event from the protocol stack 2 of the navigation device 100 to the application is appropriately performed as a response to step S609.

SetFolderReq( . . . Flag='root', name=" . . . ) of step S610 is a command for setting the layer of the folder to the root. SetFolderResp( ) of step S611 is a response to step S610.

SetFolderReq( . . . Flag='up/down', name='folder name' . . . ) of step S612 is a command for raising or lowering the layer of the folder to set the folder name. Here, a mail is transmitted to the set folder. SetFolderResp( ) of step S613 is a response to step S612.

GeFolderListing_Req( ) of step S614 is a command for acquiring the folder structure. GeFolderListing_Resp( ) of step S615 is a response to step S614.

PushMessage_Req( ) of step S616 is a command for pushing the prepared mail to the portable device. PushMessage_Resp( ) of step S617 is a response to step S616.

When the transmission of the mail is ended, the call picture 80 is displayed in step S619.

The mail can be pushed to the folder of the portable device and can send to an external mobile phone through the network 1.

In the example, the picture for transmitting a mail to the opposite party under a call is started up by providing a button to the call picture. However, when the user's manipulation of transmitting an E-mail is carried out through a different method to request for starting up the mail transmitting picture under a call, it may be determined that the destination of the E-mail is a party other than the opposite party of the current call, the mail transmitting picture may not be started up, and the transmission status may be displayed using a message indicating that the E-mail is transmitted to a party other than the opposite party of the call after the call is ended.

Accordingly, it is possible to avoid a complicated operation of transmitting an E-mail to a party other than the opposite party under the call and thus to implement a vehicle-mounted device which provides consistency to the user in the vehicle.

When a call is given to the opposite party of which the mail address is not registered in the phone book acquired from the portable device, it is preferable that the button 84, the button 85, and the button 90 on the call picture 80 shown in FIG. 14 are toned down so as for a user not to manipulate the buttons or are not displayed.

As described above, according to Embodiment 5, it is possible to transmit a mail under a handsfree call and thus to actualize the multi-profile operation of the MAP and the HFP. By providing the buttons which can enable the preparing of a mail to the call picture, it is possible to start up the mail preparing picture having the opposite party of the call as the destination by one manipulation and thus to implement a vehicle-mounted device which is convenient for use. It is useful, for example, for transmitting details, which it is necessary to take notes of, to the opposite party of the call and a mail can be prepared immediately under a call, thereby saving the labor of taking notes for the opposite party of the call.

The vehicle-mounted device according to Embodiment 5 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or may be embodied by the software operating by the use of the CPU of the control unit 104.

The E-mail transmitting and receiving section is embodied using the near field communication unit 101, the control unit 104, the MAP communication protocol stored in the near field communication unit 101 so as to cause the control unit 104 to perform the processes of steps S609 to S618 of FIG. 13, and the application software (which is stored in the control unit 104) of processing a received mail.

The call section is embodied using the near field communication unit 101, the control unit 104, the microphone 105, the speaker 106, and the application software causing the control unit 104 to perform the process of step S605 of FIG. 13 by the use of the HFP protocol stored in the near field communication unit 101.

The destination determining section is embodied using the control unit 104, the display unit 102, and the application software of performing the process of step S607 of FIG. 13 in which the operation corresponding to the manipulation state of the display unit 102 is performed.

The notification changing section is embodied using the control unit 104 and the application software of performing a process of changing the notification method to the user. That is, it is determined whether the start-up of the call and mail preparing picture 99 is requested by pressing the button 90 disposed on the call picture 80, and the notification method is changed so as to start up the call and mail preparing picture 99 when the button 90 is pressed and to display a message when the start-up of the call and mail preparing picture is requested without pressing the button 90.

The call picture display section is embodied using the control unit 104, the display unit 102, and the application software of performing at least the process of step S606 of FIG. 13 in response to the user's manipulation.

The phone book acquiring section is embodied using the near field communication unit 101, the control unit 104, the storage unit 107, and the application software of causing the control unit 104 to perform the processes of steps S603 and S604 of FIG. 13 by the use of the OPP or PBAP communication protocol stored in the near field communication unit 101.

The opposite party specifying section is embodied using the near field communication unit 101, the control unit 104, the storage unit 107, and the application software of performing a process of combining the phone book data stored in the storage unit 107 in advance and the phone number data of the opposite party transmitted as the CLIP command of the HFP protocol.

The button arranging section is embodied using the display unit 102, the control unit 104, the application software of performing the process of step S506 of FIG. 9, and the application software of performing the function corresponding to the details indicated by the buttons 54 and 55 of FIG. 10 in response to the user's manipulation.

The traveling and stop determining means corresponds to the traveling determining unit 109 and the function thereof is embodied using the vehicle speed sensor or the GPS and the application software stored in the control unit 104, as described in Embodiment 1.

The traveling regulating section can be embodied using the control unit 104 and the display unit 102. That is, the control unit 104 regulates the details to be displayed on the display unit 102 depending on the traveling state of the vehicle (whether the vehicle is traveling or is stopped). In the above description, the mail transmitting picture corresponds to the call and mail preparing picture.

Embodiment 6

The navigation device as the vehicle-mounted device according to Embodiment 6 has features to be described below in a use case where a call arrives in a handsfree call-enabled state and a mail is received from the opposite party of which an arrival of a call is rejected.

A navigation device 100 as the vehicle-mounted device according to this embodiment has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

The operation of the navigation device 100 as the vehicle-mounted device according to this embodiment will be described below with reference to the sequence diagram of FIG. 16.

In this use case, the MAP and the HFP operate in a multi-profile operation manner.

It is assumed that the vehicle-mounted device 100 and the portable device are registered in Bluetooth (registered trademark) in advance and a communication line is set up therebetween.

The processes of steps S701 to S703 are the same as the processes of steps S401 to S403 described in Embodiment 3 and thus description thereof will not be repeated.

The processes of steps S704 to S712 are the same as the processes of steps S108 to S111 and the processes of steps S114 to S117 described in Embodiment 1 and thus description thereof will not be repeated.

When an arrival of a call is rejected by a user's manipulation using the input unit 103 in step S713, an event indicating the arrival of a call is notified from the application to the protocol stack 2 in step S714.

In step S715, the navigation device 100 temporarily stores the phone number of the opposite party from which an arrival of a call is rejected in the storage unit 107. The navigation device 100 deletes the phone number of the opposite party, from which the arrival of a call is rejected and which is temporarily stored, from the storage unit 107 when an ACC (accessory) power is turned on after the ACC is turned off. Without being limited to this, the temporarily-stored phone number of the opposite party from which the arrival of a call is rejected may be deleted from the storage unit 107 with the lapse of predetermined time.

In step S716, the navigation device 100 transmits an AT command (AT+CHUP(REJECT)) indicating the rejection of the arrival of a call. As a response thereto, the portable device returns an AT command (OK) indicating the acceptance (step S717).

In step S718, the portable device transmits a result command (+CIEV) in which an indicator (callsetup=0) indicating the call non-setup is set to the navigation device 100.

In step S719, an event indicating no call (nocall) is notified from the protocol stack 2 to the application.

The processes of steps S720 to S723 are the same as the processes of steps S423 to S426 and thus description thereof will not be repeated. These processes represent that a new mail arrives from the outside.

In step S724, it is determined whether a mail arrives from the opposite party from which the arrival of a call is rejected. This determination is performed depending on whether the source of the arriving mail is the same as the mail address of the name of the opposite party by searching the phone book data for the name of the opposite party on the basis of the phone number of the opposite party from which the arrival of a call is rejected and which is temporarily stored in the storage unit 107.

When a mail does not arrive from the opposite party from which the arrival of a call is rejected (No in step S724), the notification of the arrival of a new mail is performed in step S725.

On the other hand, when a mail arrives from the opposite party from which the arrival of a call is rejected (Yes in step S724), the notification of the arrival of a new mail is not performed.

As described above, when the arrival of a call is rejected and a mail is received from the opposite party from which the arrival of a call is rejected, it is controlled not to perform the notification of the arrival of a new mail. This is because a driver does another action for a certain reason, does not thus want to receive a call, and rejects the arrival of a call, whereby it is considered that the notification of the arrival of a mail is troublesome. Accordingly, it is possible to provide a vehicle-mounted device which is safe and convenient by suppressing the notification of a mail.

The vehicle-mounted device according to Embodiment 6 is not limited to the navigation device, but may be applied to a vehicle-mounted handsfree device.

In the above description, the communication section corresponds to the near field communication unit 101. Here, the entire protocol stack 2 may be built in the near field communication unit 101 (communication module), or may be embodied by the software operating by the use of the CPU of the control unit 104.

Figure 16:
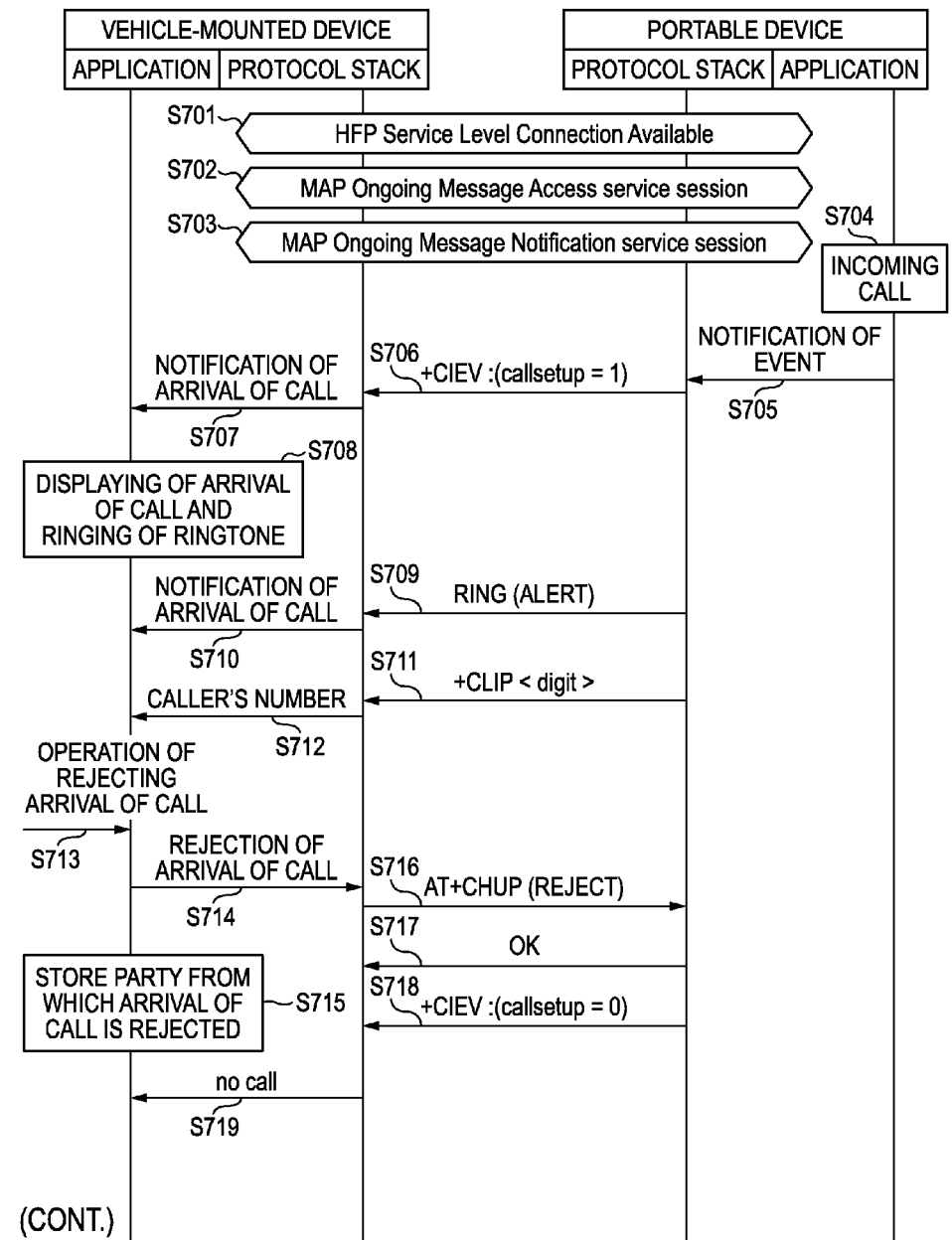
FIG. 16 is a sequence diagram illustrating the sequence of operations of the vehicle-mounted device when an arrival of a handsfree telephone call is rejected and an E-mail is received from the opposite party from which the arrival of a call is rejected.

The call section is embodied using the near field communication unit 101, the control unit 104, the microphone 105, the speaker 106, and the application software causing the control unit 104 to perform the processes of steps S706 to S719 of FIG. 16 by the use of the HFP protocol stored in the near field communication unit 101.

The incoming mail sensing means is embodied using the near field communication unit 101, the control unit 104, and the application software causing the control unit 104 to perform the processes of steps S721 to S723 of FIG. 16 by the use of the MAP communication protocol stored in the near field communication unit 101.

The phone book acquiring section is embodied using the near field communication unit 101, the control unit 104, the storage unit 107, and the application software of performing the process of acquiring the phone book data from the portable device by the use of the OPP or PBAP communication protocol stored in the near field communication unit 101.

The manipulation section is embodied by displaying a button for enabling a user to input a functional manipulation such as on-hook to the navigation device 100 on the display unit 102 by the use of the display unit 102 and the control unit 104 and causing the control unit 104 to sense the input of step S713 of FIG. 16 in response to the manipulation on the button.

The manipulation section is not limited to use in the touch panel, but the same function may be actualized using a mechanical switch.

The specification section is embodied using the control unit 104, the storage unit 107, and the application software of performing the process of step S724 of FIG. 16 of specifying whether a mail is received from the opposite party from which the arrival of a call is rejected and which is stored in the storage unit 107.

The call-rejected party mail-reception notification suppressing section is embodied using the control unit 104 by causing the control unit 104 not to perform the notification process of step S725 when the determination result of step S724 of FIG. 16 is "Yes".

Embodiment 7

The vehicle-mounted device according to Embodiment 7 has features to be described below in a use case where a mail is received while reproducing an audio stream from a portable device.

A navigation device 100 as the vehicle-mounted device according to this embodiment has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

The operation of the navigation device 100 as the vehicle-mounted device according to this embodiment will be described below with reference to the sequence diagrams of FIGS. 17 and 18.

In this use case, the MAP and the profile group (the A2DP, the AVRCP, the GAVDP, the AVDTP, and the AVCTP) necessary for the audio streaming operate in a multi-profile operation manner.

It is assumed that the vehicle-mounted device 100 and the portable device are registered in Bluetooth (registered trademark) in advance and a communication line is set up therebetween.

Prior to description of the operation of the navigation device 100, it will be described below with reference to FIG. 19 that the operation of the navigation device 100 can be set through the use of the setting picture displayed on the display unit 102 of the navigation device 100 in advance.

Figure 19:
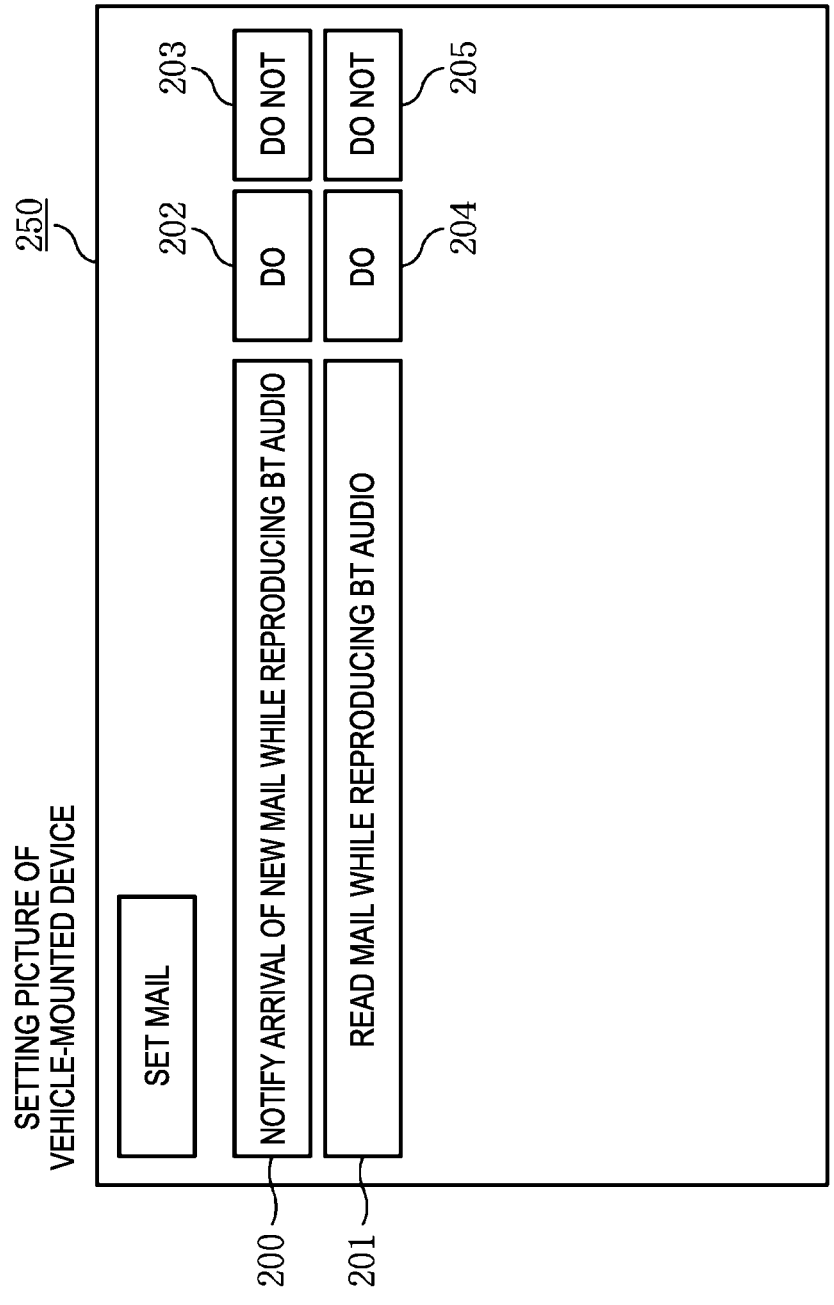
FIG. 19 is a schematic diagram illustrating an example of a setting picture displayed on the display unit 102 of the vehicle-mounted device.

The setting picture 250 shown in FIG. 19 is a screen of a touch panel. Information windows 200 and 201 disposed on the picture are information windows for displaying information and buttons 202 to 205 (corresponding to the input unit 103) are selectively arranged thereon.

The notification of the arrival of a new mail can be set while reproducing a BT (Bluetooth (registered trademark)) audio by the use of the buttons 202 and 203. The navigation device 100 operates so as to perform the notification of the arrival of a new mail even while reproducing an audio when a user selects (presses) the button 202 and not to perform the notification of the arrival of a new mail when the button 203 is selected.

The reading of a mail can be set while reproducing a BT (Bluetooth (registered trademark)) audio by the use of the buttons 204 and 205. The navigation device 100 operates so as to automatically read a mail after the notification of the arrival of a new mail when the button 204 is selected and not to read the mail when the button 205 is selected.

Only when it is set to perform the notification of the arrival of a new mail by manipulating the button 202, the user can select the button 204 and the button 205.

The buttons 202 to 205 are preferably set to default values in advance.

Figure 17:
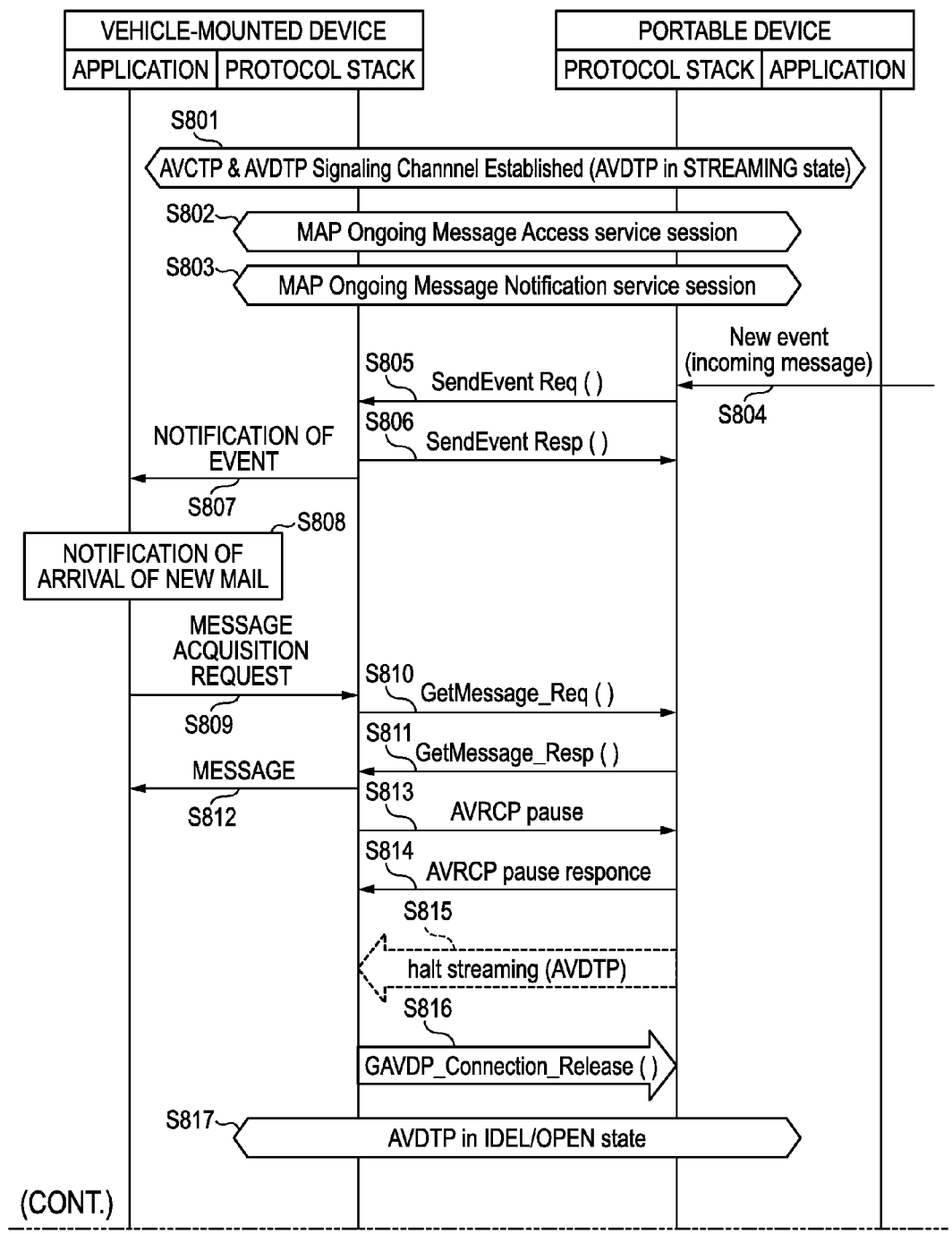
FIG. 17 is a sequence diagram illustrating the sequence of operations of the vehicle-mounted device when an E-mail is received while reproducing an audio stream from a portable device and the reproduction of the audio stream is interrupted.

FIG. 17 is a sequence diagram illustrating the sequence of operations of the navigation device 100 when the buttons 202 and 204 are selected, that is, the sequence of operations of notifying the arrival of a new mail and reading the mail when the mail is received while reproducing a BT audio stream. FIG. 18 is a sequence diagram illustrating the sequence of operations of the navigation device 100 when the buttons 202 and 205 are selected, that is, the sequence of operations of only notifying the arrival of a new mail when a mail is received while reproducing a BT audio stream.

In FIG. 17, step S801 represents a state where signaling channels of the AVCTP and the AVDTP are set up and an audio stream from the portable device to the navigation device 100 is reproduced. At this time, the navigation device 100 decodes the audio stream received from the portable device and outputs a voice through the speaker 106.

The processes of steps S802 and S803 are the same as the processes of steps S402 and S403 described in Embodiment 3 and thus description thereof will not be repeated.

The processes of steps S804 to S807 are the same as the processes of steps S423 to S426 described in Embodiment 3 and thus description thereof will not be repeated.

In step S808, the arrival of a new mail is notified. The notification of the arrival of a new mail is performed through the use of the display unit 102 and/or the speaker 106.

The processes of steps S809 to S812 are the same as the processes of steps S103 to S106 described in Embodiment 1 and thus description thereof will not be repeated.

When a mail is received and a message is received while reproducing an audio stream through the sequence up to step S812, a pause command for requesting for the stop of the AVRCP stream is transmitted from the navigation device 100 to the portable device in step S813.

In step S814, a response command to the pause command of step S813 is transmitted from the portable device to the navigation device 100.

In step S815, the portable device requests the navigation device 100 for stopping the AVDTP streaming. The process of step S815 is implementation-dependent on the portable device and is thus marked by a dotted line.

In step S816, the navigation device 100 requests the portable device for releasing the GAVDP connection.

At this time, the streaming is paused and the AVDTP becomes an IDLE/OPEN state (step S816). The IDLE/OPEN state means an IDLE state or an OPEN state.

The application of the navigation device 100 reads a message received I step S812 (step S818).

In step S819, it is determined whether the reading of the mail is ended.

When the reading of the mail is not ended (No in step S819), the sequence of operations goes back prior to step S819.

When the reading of the mail is ended (Yes in step S819), an event indicating the ending of the reading is notified to the protocol stack 2 (step S820).

In step S821, a play command for requesting for reproducing the AVRCP stream is transmitted from the navigation device 100 to the portable device.

In step S822, a response command to the play command of step S821 is transmitted from the portable device to the navigation device 100.

In step S823, the navigation device 100 requests the portable device for setting up the GAVP connection.

The portable device requests the navigation device 100 for starting the reproduction of the GAVDP stream (step S824).

In step S825, the AVDTP state becomes a STREAMING state and the reproduction of the audio stream is resumed.

The sequence diagram of FIG. 18 will be described below.

Figure 18:
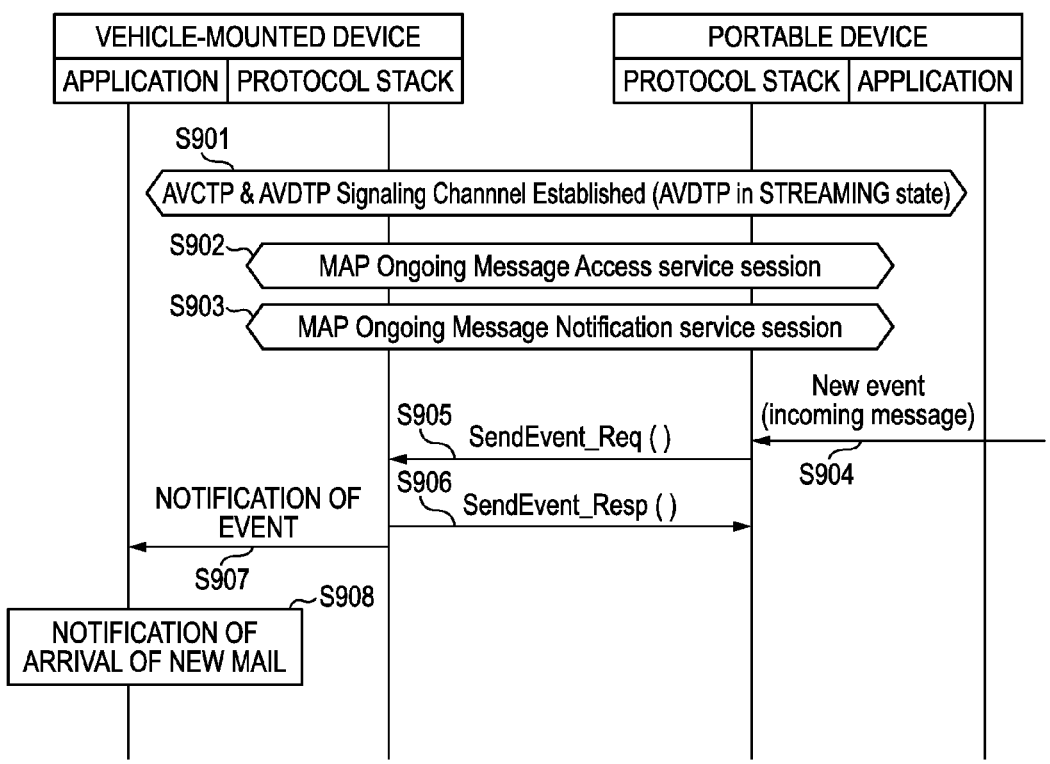
FIG. 18 is a sequence diagram illustrating the sequence of operations of the vehicle-mounted device when an E-mail is received while reproducing an audio stream from a portable device and the reproduction of the audio stream is continued.

In the sequence diagram of FIG. 18, the processes of steps S901 to S903 are the same as the processes of steps S801 to S803 and thus description thereof will not be repeated.

The processes of steps S904 to S907 are the same as the processes of steps S804 to S807 and thus description thereof will not be repeated.

In step S908, an arrival of a new mail is notified. Since the notification of the arrival of a new mail is performed while reproducing a stream, the notification of the arrival of a new mail is performed through the use of the display unit 102 without using the speaker 106.

In this way, in the sequence diagram of FIG. 18, the audio stream is neither paused nor resumed but is always continued to be reproduced, even when a new mail arrives.

As described above, as the operation of the vehicle-mounted device when a mail is received while reproducing an audio stream, it is possible to set whether to notify the arrival of a new mail through the use of the setting picture or to read the mail at the same as notifying the arrival of a new mail in advance and to actualize an operation desired by a user when the corresponding use case occurs. Particularly, when the user is driving a vehicle, it is not necessary to perform any manipulation in the corresponding use case, whereby the user can pay attention to only the driving.

In addition to a case where the vehicle-mounted device and the portable device are connected in a point-to-point manner, in a case where the vehicle-mounted device, the portable device, and a portable music player are connected in a point-to-multipoint manner (in a case where the MAP operates between the vehicle-mounted device and the portable device and the A2DP, the AVRCP, the GAVDP, the AVDTP, and the AVCTP operate between the vehicle-mounted device and the portable music player), the same operation can be performed.

Similarly, in addition to a case where the vehicle-mounted device and the portable device are connected in a point-to-point manner, in a case where the vehicle-mounted device and two portable devices (Portable 1 and Portable 2) are connected in a point-to-multipoint manner (in a case where the MAP operates between the vehicle-mounted device and Portable 1 and the A2DP, the AVRCP, the GAVDP, the AVDTP, and the AVCTP operate between the vehicle-mounted device and the Portable 2), the same operation can be performed.

The vehicle-mounted device according to Embodiment 7 is not limited to the navigation device, but may be applied to a vehicle-mounted audio device.

In the above description, the communication section corresponds to the near field communication unit 101. Here, the entire protocol stack 2 may be built in the near field communication unit 101 (communication module), or may be actualized by the software operating by the use of the CPU of the control unit 104.

The E-mail transmitting and receiving section is embodied using the near field communication unit 101, the control unit 104, the MAP communication protocol stored in the near field communication unit 101 so as to cause the control unit 104 to perform the processes of steps S805 to S812 of FIG. 17, and the application software (which is stored in the control unit 104) for processing a received mail.

The E-mail reading section is embodied using the control unit 104, the speaker 106, and the voice converting unit 108 by causing the control unit 104 to perform the process of step S818 of FIG. 17.

The stream reproducing section is embodied using the near field communication unit 101, the control unit 104, the speaker 106, and the application software causing the control unit 104 to the process of step S801 of FIG. 17 by the use of the A2DP protocol or the AVRCP protocol.

The first notification selecting section is embodied by the control unit 104 and the display unit 102 or the input unit 103, and is actualized using the application software of performing at least the function of corresponding to the display details shown in FIG. 19 in response to the user's manipulation.

The interruption section is embodied using the near field communication unit 101, the control unit 104, and the application software stored in the control unit 104 by causing the control unit 104 to perform the processes of steps S813 to S817 of FIG. 17 by the use of the A2DP protocol or the AVRCP protocol stored in the near field communication unit 101.

The resuming means is embodied using the near field communication unit 101, the control unit 104, and the application software stored in the control unit 104 by the use of the A2DP protocol or the AVRCP protocol stored in the near field communication unit 101 by causing the control unit 104 to perform the processes of steps S820 to S825 of FIG. 17.

Embodiment 8

A navigation device 100 as the vehicle-mounted device according to Embodiment 8 of the invention has the same entire configuration as the navigation device 100 as the vehicle-mounted device according to Embodiment 1 and thus detailed description thereof is not repeated. A mobile phone used in this embodiment has the functions equivalent to those of the mobile phone 10 and the like used in Embodiment 1.

The navigation device 100 as the vehicle-mounted device according to Embodiment 8 has features to be described below in a use case where it is instructed to start resuming of an audio stream from a portable device by a user while receiving and reading a mail by the use of the navigation device 100.

The operation of the navigation device 100 as the vehicle-mounted device will be described below with reference to the sequence diagram of FIG. 20.

In this use case, the MAP, the A2DP, the AVRCP, the GAVDP, the AVDTP, and the AVCTP operate in a multi-profile operation manner.

It is assumed that the vehicle-mounted device 100 and the portable device are registered in Bluetooth (registered trademark) in advance and a communication line is set up therebetween.

In the operation of the navigation device 100, the reading of a mail is interrupted and an audio stream is reproduced. When the switching to a different audio source (voice mode switching) occurs, the mail under reading is re-read. When re-reading the mail, a user can be made to select whether to read the mail from the beginning or to read the mail subsequently.

Figure 20:
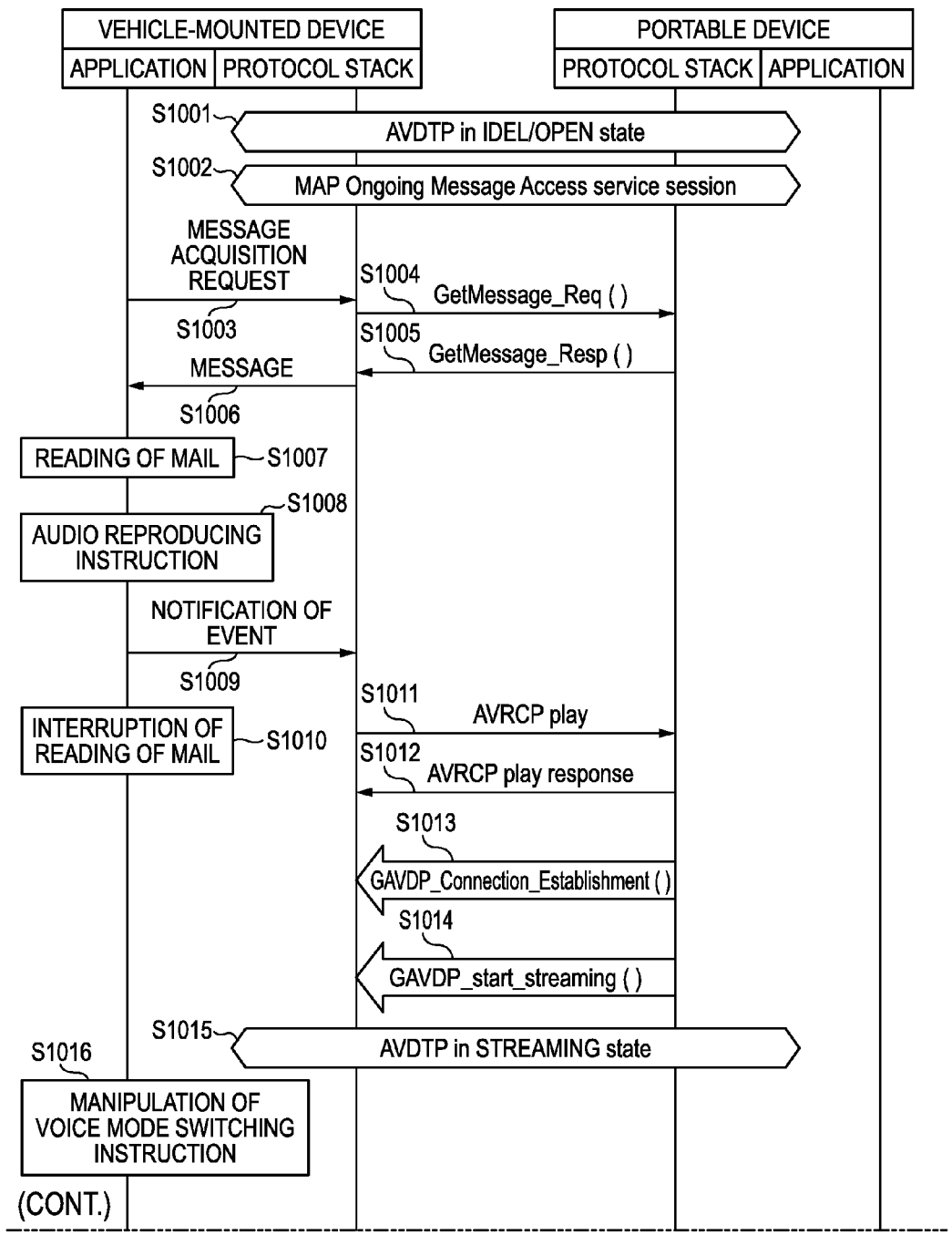
FIG. 20 is a sequence diagram illustrating the sequence of operations of the vehicle-mounted device when a user instructs to start reproduction of an audio stream through the use of a portable device while the vehicle-mounted device is receiving and reading an E-mail with the MAP.

That is, step S1001 of FIG. 20 represents the premise that a stream is not reproduced and the AVDTP state is an IDLE/OPEN state.

The processes of steps S1002 to S1007 are the same as the processes of steps S102 to S107 described in Embodiment 1 and thus description thereof will not be repeated.

In step S1008, the navigation device 100 is instructed to start the reproduction of an audio stream by a user. An event is notified to the protocol stack 2 from the application (step S1009).

In step S1010, the reading of a mail is interrupted.

In step S1011, a play command for requesting for reproducing of the AVRCP stream is transmitted from the navigation device 100 to the portable device.

In step S1012, a response command to the play command of step S1011 is transmitted from the portable device to the navigation device 100.

In step S1013, the navigation device 100 is requested to set up the GAVDP connection by the navigation device 100.

The navigation device 100 is requested to start the reproduction of the GAVDP stream by the portable device (step S1014).

In step S1015, the AVDTP state becomes a STREAMING state and the reproduction of the audio stream is resumed.

The navigation device 100 decodes the received audio stream and outputs a voice through the speaker 106.

When the navigation device 100 is instructed to switch the audio source to a different audio source (voice mode switching) by a user (step S1016), the application notifies an event to the protocol stack 2 (step S1017).

In step S1018, a pause command for requesting for pausing the AVRCP stream is transmitted from the navigation device 100 to the portable device.

In step S1019, a response command to the pause command of step S1018 is transmitted from the portable device to the navigation device 100.

In step S1020, the navigation device 100 is requested to pause the AVDTP streaming by the portable device. The process of step S1020 is implementation-dependent on the portable device and is thus marked by a dotted line.

In step S1021, the portable device is requested to release the GAVDP connection by the navigation device 100.

At this time, the streaming is paused and the AVDTP state becomes an IDLE/OPEN state (step S1022).

In step S1023, the application of the navigation device 100 displays a selection picture on the display unit 102. The selection picture displayed on the display unit 102 has the same details as the example of FIG. 4 described in Embodiment 1 and thus description thereof will not be repeated.

In step S1024, when the navigation device 100 senses that the user presses one of the buttons 31 and 32, the reading of the mail corresponding to the pressed button is performed in step S1025.

Thereafter, when the reading of the mail is ended (step S1026), the audio source is switched to a different audio source instructed by the user in step S1016. For example, when it is instructed to switch the audio source to a radio in step S1016, the audio source is switched to the radio after the reading of the mail with a voice is ended.

As described above, as the operation of the vehicle-mounted device according to this embodiment, the reading of a mail is interrupted and an audio stream is reproduced when the user instructs the portable device to start the reproduction of the audio stream while reading the mail. When the switching to a different audio source (the voice mode switching) occurs, the mail under reading is re-read. When re-reading the mail, the user is made to select whether to read the mail from the beginning or to read the mail subsequently. Accordingly, it is possible to prescribe the operation of the vehicle-mounted device which can actualize the multi-profile control of the MAP, the A2DP, the AVRCP, the GAVDP, the AVDTP, and the AVCTP.

Since the selection picture is automatically displayed after the switching to the voice mode, the user can smoothly go to the operation (the reading of the mail) performed before starting the reproducing of the audio stream and thus it is possible to implement a vehicle-mounted device which is convenient for use.

In addition to a case where the vehicle-mounted device and the portable device are connected in a point-to-point manner, in a case where the vehicle-mounted device, the portable device, and a portable music player are connected in a point-to-multipoint manner (in a case where the MAP operates between the vehicle-mounted device and the portable device and the A2DP, the AVRCP, the GAVDP, the AVDTP, and the AVCTP operate between the vehicle-mounted device and the portable music player), the same operation can be performed.

Similarly, in addition to a case where the vehicle-mounted device and the portable device are connected in a point-to-point manner, in a case where the vehicle-mounted device and two portable devices (Portable 1 and Portable 2) are connected in a point-to-multipoint manner (in a case where the MAP operates between the vehicle-mounted device and Portable 1 and the A2DP, the AVRCP, the GAVDP, the AVDTP, and the AVCTP operate between the vehicle-mounted device and the Portable 2), the same operation can be performed.

The vehicle-mounted device according to Embodiment 8 is not limited to the navigation device, but may be applied to a vehicle-mounted audio device.

In the above description, the communication section corresponds to the near field communication unit 101. Here, the entire protocol stack 2 may be built in the near field communication unit 101 (communication module), or may be actualized by the software operating by the use of the CPU of the control unit 104. The E-mail transmitting and receiving section is embodied using the near field communication unit 101, the control unit 104, the MAP communication protocol stored in the near field communication unit 101 so as to cause the control unit 104 to perform the processes of steps S1003 to S1006 of FIG. 20, and the application software (which is stored in the control unit 104) for processing a received mail.

The E-mail reading section is embodied using the control unit 104, the speaker 106, and the voice converting unit 108 by causing the control unit 104 to perform the process of step S1007 of FIG. 20.

The interruption section is embodied by causing the control unit 104 to perform the process of step S1010 of FIG. 20 by the use of the application software stored in the control unit 104.

The stream reproducing section is embodied using the near field communication unit 101, the control unit 104, the speaker 106, and the application software causing the control unit 104 to the processes of steps S1011 to S1015 of FIG. 20 by the use of the A2DP protocol or the AVRCP protocol.

The voice mode switching sensing section is embodied using the input unit 103, the control unit 104, and the application software of performing the process of steps S1016 of FIG. 20.

The reading resuming section is embodied using the control unit 104, the speaker 106, and the voice converting unit 108 by causing the control unit 104 to perform the process of step S1025 of FIG. 20.

The switching section is embodied using the control unit 104 and the application software causing the control unit 104 to perform the process of step S1027 of FIG. 20.

The selection section can be embodied by the control unit 104 and the input unit 103, and the function corresponding to at least the display details shown in FIG. 4 is actualized by the use of the application software of performing the process of step S1023 of FIG. 20 in response to the user's manipulation.

Embodiment 9

A navigation device 100 as the vehicle-mounted device according to Embodiment 9 of the invention has the same entire configuration as the navigation device 100 as the vehicle-mounted device according to Embodiment 1 and thus detailed description thereof is not repeated. A mobile phone used in this embodiment has the functions equivalent to those of the mobile phones 10 and 20 used in Embodiment 1.

The navigation device 100 as the vehicle-mounted device according to Embodiment 9 has features to be described below in a use case where an arrival of a new mail is notified to the navigation device 100 from a portable device while the navigation device 100 performs data communication using the DUN.

The operation of the navigation device 100 as the vehicle-mounted device according to this embodiment will be described below with reference to the sequence diagrams of FIGS. 21 to 23.

In this use case, the MAP and the HFP operate in a multi-profile operation manner.

It is assumed that the vehicle-mounted device 100 and the portable device are registered in Bluetooth (registered trademark) in advance and a communication line is set up therebetween.

As the operation of the navigation device 100, a content is downloaded and reproduced from the Internet by the data communication of the DUN, the user is made to select whether to only notify the arrival of a new mail or to notify and read the arrival of a new mail through the use of the setting picture in advance when a voice is being output from the speaker 106. Details thereof are as follows.

Figure 24:
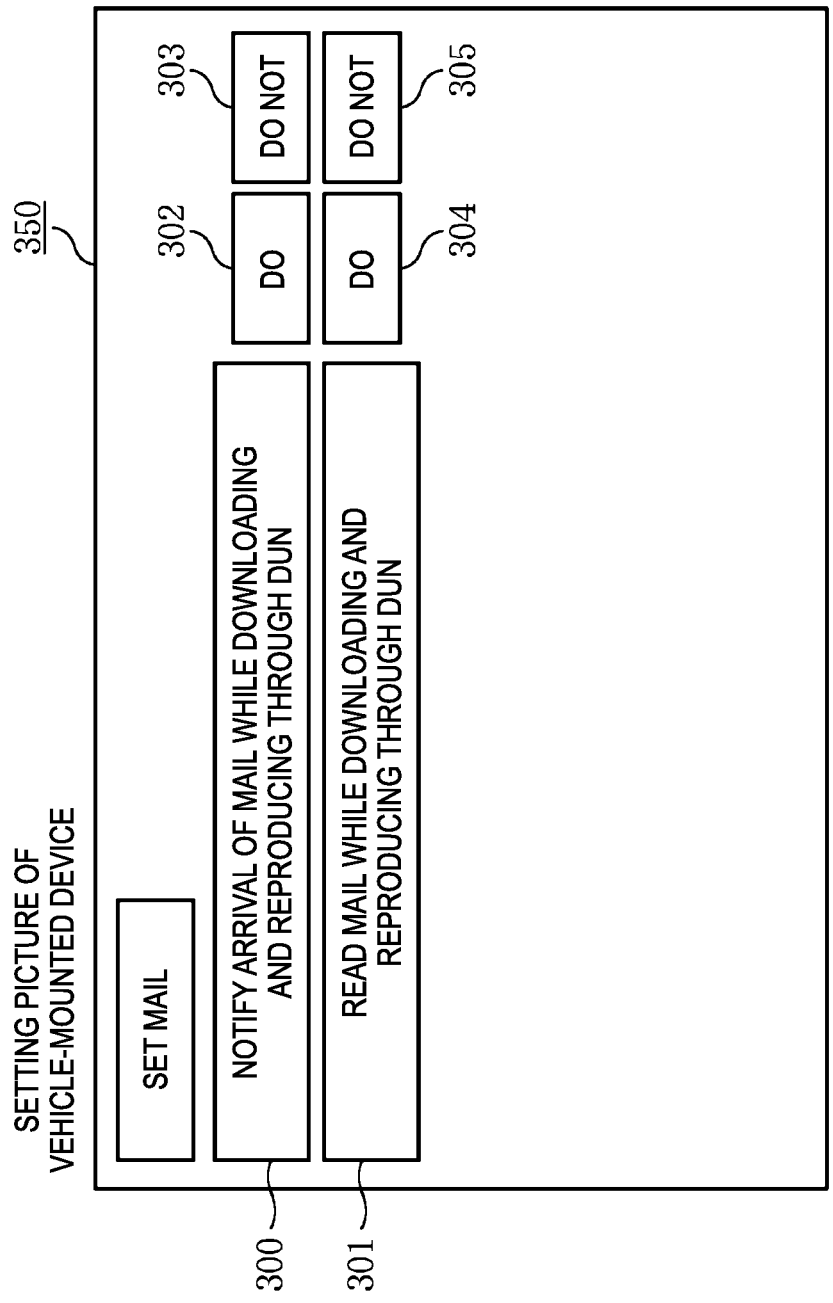
FIG. 24 is a schematic diagram illustrating an example of a setting picture displayed on the display unit 102 of the vehicle-mounted device.

FIG. 24 shows a state where information windows 300 and 301 and buttons 302 to 305 (corresponding to the input unit 103) which are selectively provided are displayed on the setting picture 350 on the display unit 102.

In the setting picture 350, a user can set the notification of the arrival of a new mail while downloading and reproducing a content by the use of the DUN by manipulating (selecting) the buttons 302 and 303. The navigation device 100 operates so as to notify the arrival of a new mail when the button 302 is selected and not to notify the arrival of a new mail when the button 303 is selected. Here, the DUN connection is continued regardless of notifying the arrival of a new mail or not notifying the arrival of a new mail.

The navigation device 100 can set the reading of a mail while downloading and reproducing a content by the use of the DUN by manipulating (select) the buttons 304 and 305 before the corresponding use case occurs. The navigation device 100 operates so as to automatically read a mail after notifying the arrival of a new mail when the button 304 is selected and not to read the mail when the button 305 is selected. Here, the DUN connection is once cut off when the mail is read and the DUN connection is continued when the mail is not read.

Only when the notification of the arrival of a new mail is set by the use of the button 302, the button 304 and the button 305 can be selected.

To avoid the user from forgetting the setting, it is preferable that the buttons 302 to 305 are set to default values.

On the other hand, when a data communication not accompanied with the voice output is performed by the use of the DUN, the DUN connection is always continued.

Figure 21:
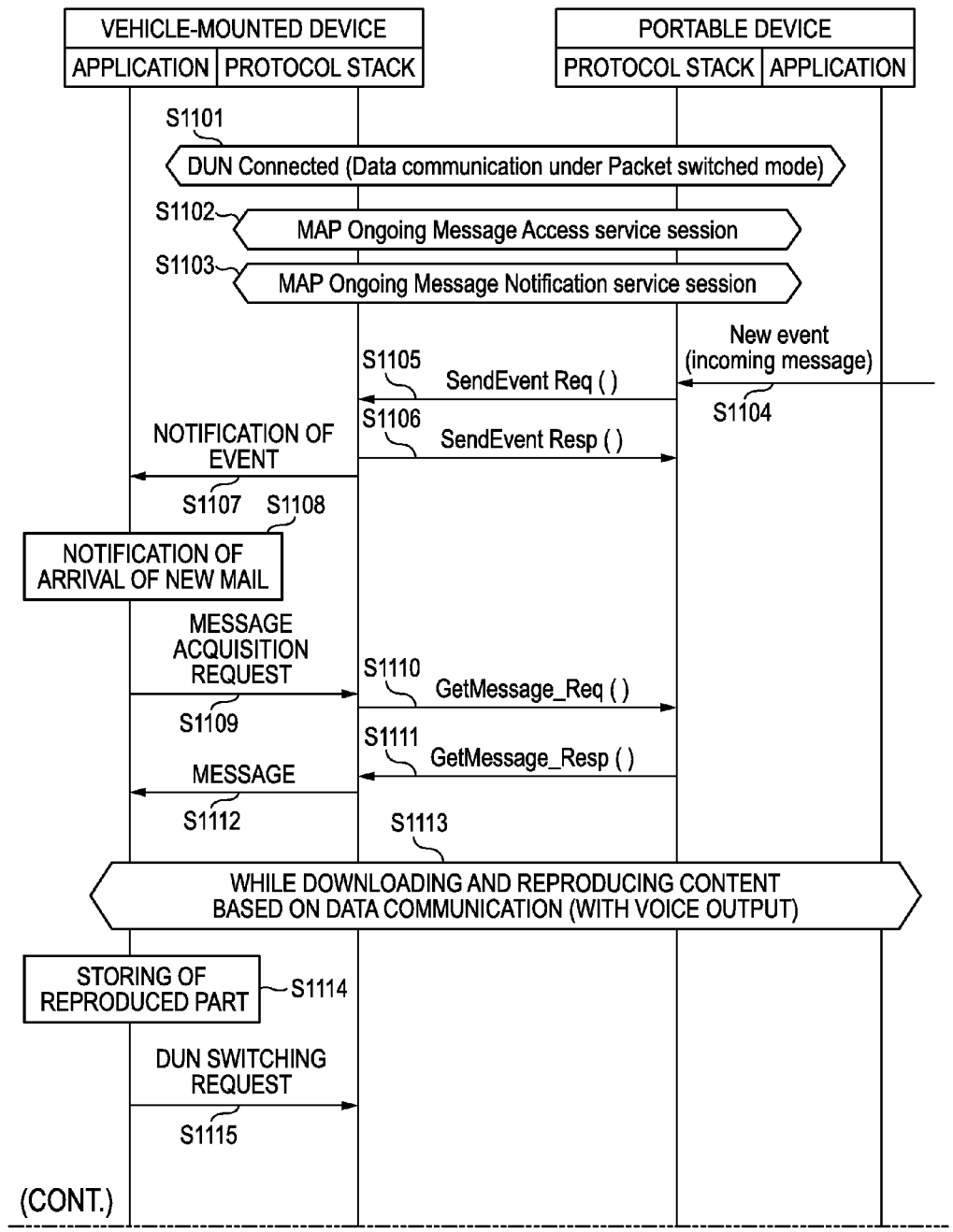
FIG. 21 is a sequence diagram illustrating the sequence of operations of the vehicle-mounted device when an E-mail is received while the vehicle-mounted device is downloading and reproducing contents with the DUN and the DUN connection is interrupted.

FIG. 21 is a sequence diagram illustrating the sequence of operations of the navigation device 100 when the buttons 302 and 304 are selected, that is, the sequence of operations of notifying the arrival of a new mail and reading the mail when the mail newly arrives while downloading and reproducing a content through the use of the DUN. FIG. 22 is a sequence diagram illustrating the sequence of operations of the navigation device 100 when the buttons 302 and 305 are selected, that is, the sequence of operations of only notifying the arrival of a new mail when the mail newly arrives while downloading and reproducing a content through the use of the DUN.

Figure 23:
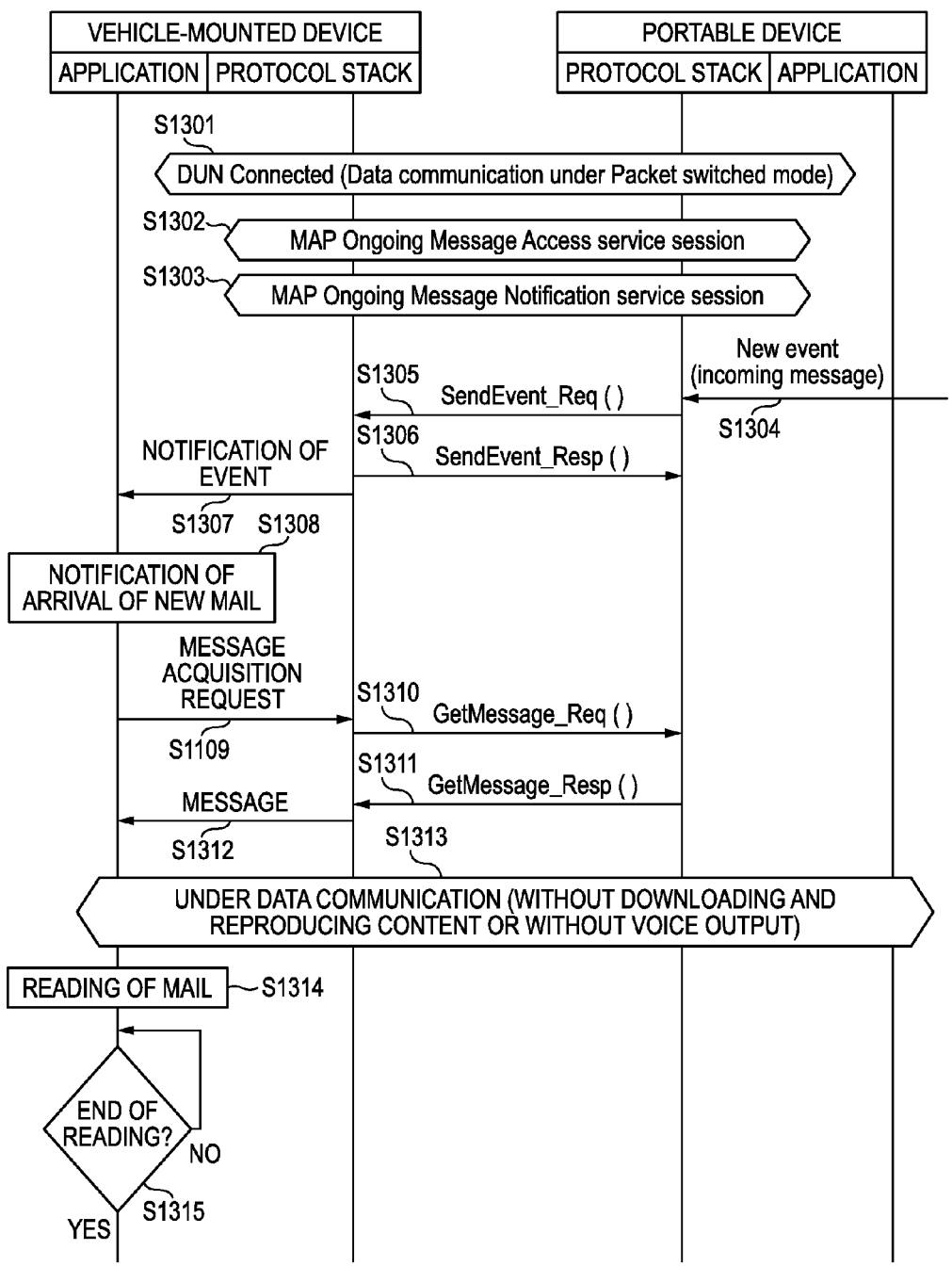
FIG. 23 is a sequence diagram illustrating the sequence of operations of the vehicle-mounted device when an E-mail is received while the vehicle-mounted device is in data communication with the DUN.

FIG. 23 is a sequence diagram illustrating the sequence of operations of the navigation device 100 when a data communication not accompanied with a voice output is performed through the use of the DUN and a new mail arrives.

In FIG. 21, step S1101 represents a state where the DUN connection is set up to perform a packet communication.

The processes of steps S1102 to S1112 are the same as the processes of steps S802 to S812 described in Embodiment 7 and thus description thereof will not be repeated.

Step S1113 represents a state where a content is being downloaded and reproduced by the data communication and a voice is output from the speaker 106.

In step S1114, the reproduced part of the content under downloading and reproducing is stored in the storage unit 107.

When the reproduced part is stored in the storage unit 107, the DUN connection is cut off. This is performed by transmitting a request for cutting off the DUN connection from the application to the protocol stack 2 in step S1115 and transmitting the request for cutting off the DUN connection from the protocol stack 2 to the portable device (step S1116).

In step S1117, a response to the cutoff request of step S1116 is returned. The protocol stack 2 of the navigation device 100 is notified of normally cutting off the DUN connection. The protocol stack 2 notifies the application of the cutoff response of the DUN connection (step S1118).

When the DUN connection is cut off, the application of the navigation device 100 reads the mail (step S1119).

In step S1120, it is determined whether the reading of the mail is ended.

When the reading of the mail is not ended yet (No in step S1120), the sequence of operations goes back prior to step S1120.

When it is determined in step S1120 that the reading of the mail is ended (Yes in step S1120), the DUN connection is resumed.

First, in step S1121, a request for the DUN connection is transmitted from the application to the protocol stack 2 and the protocol stack 2 transmits a request for the DUN connection to the portable device (step S1122).

In step S1123, a response to the connection request of step S1122 is returned. The protocol stack 2 of the navigation device 100 is notified of the normal DUN connection. The protocol stack 2 notifies the DUN connection response to the application (step S1124).

When the DUN is re-connected, the application of the navigation device 100 calls out the reproduced part stored in step S1114 (step S1125).

Step S1126 represents a state where the content is downloaded and reproduced from the part at which the downloading and reproducing is interrupted through the use of the DUN.

The operation of the navigation device 100 when the navigation device 100 receives a mail while downloading and reproducing a content through the use of the DUN and the DUN connection is continued will be described below with reference to FIG. 22. FIG. 22 is a sequence diagram illustrating the operation of the navigation device 100 when the navigation device 100 receives a mail while downloading and reproducing a content through the use of the DUN and the DUN connection is continued.

Figure 22:
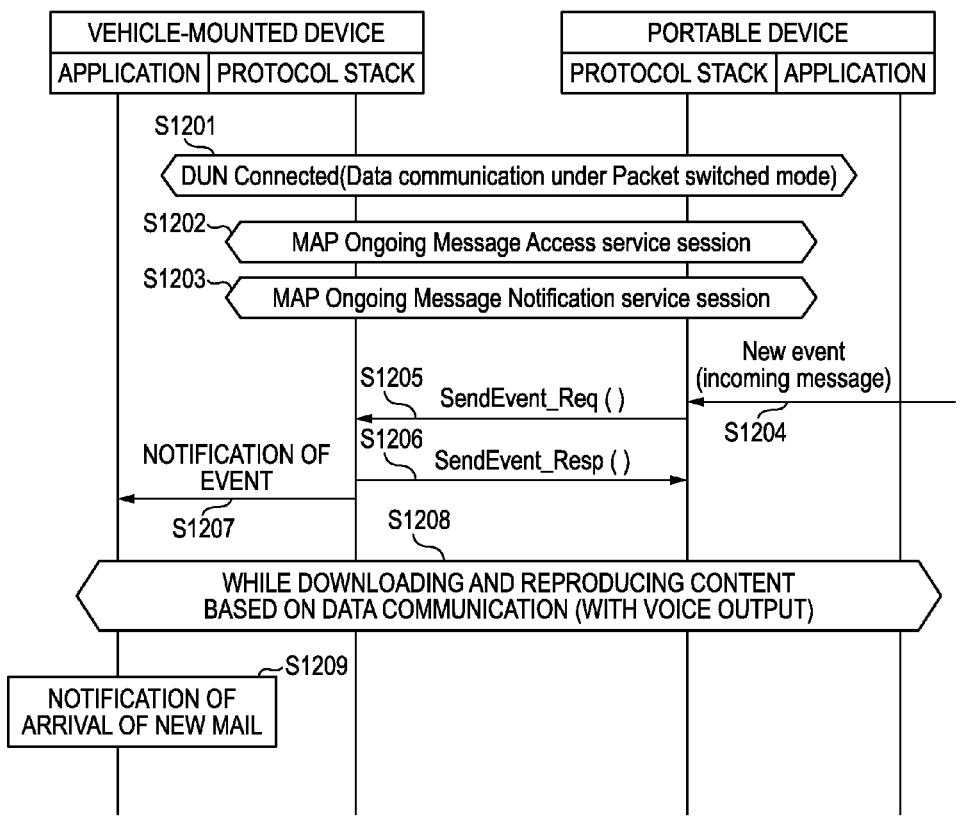
FIG. 22 is a sequence diagram illustrating the sequence of operations of the vehicle-mounted device when an E-mail is received while the vehicle-mounted device is downloading and reproducing contents with the DUN and the DUN connection is continued.

In the sequence diagram of FIG. 22, the processes of steps S1201 to S1203 are the same as the processes of steps S1101 to S1103 and thus description thereof will not be repeated. Similarly, the processes of steps S1204 to S1207 are the same as the processes of steps S1104 to S1107 and thus description thereof will not be repeated.

Step S1208 represent a state where a content is being downloaded and reproduced by the data communication and a voice is output from the speaker 106.

In step S1209, the notification of the arrival of a new mail is performed. At this time, since a content is being downloaded and reproduced, the notification of the arrival of a new mail is performed through the use of the display unit 102 without using the speaker 106.

In this way, the navigation device 100 does not pause and resume of the downloading and reproducing of the content (not cut off the DUN connection) but always continues to reproduce the content, even when a new mail arrives while downloading and reproducing the content through the use of the DUN.

FIG. 23 is a sequence diagram illustrating the sequence of operations of the navigation device 100 when the navigation device 100 does not download and reproduce a content even under the data communication through the DUN and a mail is received with no voice output.

In the sequence diagram of FIG. 23, the processes of steps S1301 to S1312 are the same as the processes of steps S1101 to S1112 and thus description thereof will not be repeated.

Step S1313 represents a state where the data communication through the DUN is performed but a content is not downloaded and reproduced and a voice is not output.

In step S1314, a mail is read. In step S1315, it is determined whether the reading of the mail is ended.

When the reading of the mail is not ended yet (No in step S1315), the sequence of operations goes back prior to step S1315.

When the reading of the mail is ended (Yes in step S1315), the sequence of operations goes to the next step.

In this way, when a data communication is performed through the DUN without a voice output, the data communication through the DUN is always continued.

When the mail is read in step S1314 and a voice not based on the downloading and reproducing through the DUN is output, the voice output is once interrupted and the mail is read. When the reading of the mail is ended, the output of the voice reproduced before the reading is resumed.

As described above, as the operation of the vehicle-mounted device when a mail is received while downloading and reproducing contents by the use of the DUN, it is possible to set whether to notify the arrival of a new mail before the DUN downloads and reproduces the contents or to read the mail at the same as notifying the arrival of a new mail in advance and to actualize an operation desired by a user when the corresponding use case occurs. Particularly, when the user is driving a vehicle, it is not necessary to perform any manipulation in the corresponding use case, whereby the user can pay attention to only the driving.

In the above description, the communication section corresponds to the near field communication unit 101. Here, the entire protocol stack 2 may be built in the near field communication unit 101 (communication module), or may be actualized by the software operating by the use of the CPU of the control unit 104.

The E-mail transmitting and receiving section is embodied using the near field communication unit 101, the control unit 104, the MAP communication protocol stored in the near field communication unit 101 so as to cause the control unit 104 to perform the processes of steps S1105 to S1107 of FIG. 21 or the processes of steps S1305 to S1307 of FIG. 23, and the application software (which is stored in the control unit 104) for processing a received mail.

The data communication section is embodied using the near field communication unit 101, the control unit 104, and the application software (which is stored in the control unit 104) of processing a data communication process by the use of the DUN communication protocol stored in the near field communication unit 101 so as to cause the control unit 104 to perform the processes of steps S1101 and S1113 of FIG. 21 or the processes of steps S1301 and S1313 of FIG. 23.

The E-mail reading section is embodied using the control unit 104, the speaker 106, and the voice converting unit 108 by causing the control unit 104 to perform the process of step S1119 of FIG. 21 or the processes of steps S1314 and S1315 of FIG. 23.

The second notification selecting section can be embodied by the control unit 104 and the display unit 102 or the input unit 103, and the function corresponding to at least the display details shown in FIG. 24 is actualized using the application software of performing a process in response to the user's manipulation.

The control means is embodied by causing the control unit 104 to perform the processes of the sequences shown in FIGS. 21 to 23.

The interruption section is embodied using the near field communication unit 101, the control unit 104, and the application software stored in the control unit 104 by causing the control unit 104 to perform the processes of steps S1115 to S1118 of FIG. 21 by the use of the DUN protocol stored in the near field communication unit 101.

The resuming means is embodied using the near field communication unit 101, the control unit 104, and the application software stored in the control unit 104 by the use of the DUN protocol stored in the near field communication unit 101 by causing the control unit 104 to perform the processes of steps S1121 to S1126 of FIG. 21.

The voice output means is embodied by the speaker 106.

The voice output determining section is embodied using the near field communication unit 101, the control unit 104, and the application software of determining the state of step S1313 of FIG. 23.

The data communication continuing section is embodied using the near field communication unit 101, the control unit 104, and the application software (which is stored in the control unit 104) of performing the data communication process by the use of the DUN communication protocol stored in the near field communication unit 101 by causing this application software to continue to perform the data communication of step S1313 of FIG. 23.

As described above, in the vehicle-mounted device according to the invention, when the vehicle-mounted device and the portable device such as a mobile phone are connected to each other using Bluetooth (registered trademark) to transmit and receive an E-mail, it is possible to provide a vehicle-mounted device which can operate in combination with existing profiles and a vehicle-mounted device which is convenient for use to a user in a case where the existing handsfree call function, audio stream reproducing function, or data communication function is started up to operate in combination with the E-mail transmitting and receiving function in an executable state.

The use cases in which the MAP as a main profile and another profile or a profile group such as the map and the HFP, the MAP and the AV profile group (the A2DP, the AVRGP, the GAVDP, the AVDTP, and the AVCTP), and the MAP and the DUN operate in a multi-profile manner have been described. However, the same is true of the case where the MAP as a main profile and two or more other profiles or profile groups such as the MAP, the HFP, and the DUN operate in a multi-profile manner.

Although Bluetooth (registered trademark) has been described as the communication standard, the communication standard is not limited to Bluetooth (registered trademark), but other communication standards may be used.

The configurations described in the above-mentioned embodiments are only specific examples, but do not limit the technical scope of the invention. Any configuration may be employed, as long as it achieves the advantageous effects of the invention.

According to the above-mentioned invention, there is provided a vehicle-mounted device which is mounted on a vehicle and which is connected to a portable device having a call function, an E-mail function, and phone book data by near field communication, including: a communication section for wirelessly communicating with the portable device by near field communication; a call section for having a call via the communication section; a phone book acquiring section for acquiring the phone book data of the portable device via the communication section; a manipulation section for rejecting an arrival of a call at the call section; a specification section for specifying a mail address of the opposite party from which the arrival of a call is rejected by the manipulation section with reference to the phone book data; and a call-rejected party mail-reception notification suppressing section for suppressing the notification of reception of an E-mail from the mail address specified by the specification section to the vehicle-mounted device.

By employing this configuration, when an arrival of a mail is rejected and a mail is received from the party from which the arrival of a mail is rejected, the notification of the arrival of a new mail is not performed. This is because a driver does another action for a certain reason, does not thus want to receive a call, and rejects the arrival of a call, whereby it is considered that the notification of the arrival of a mail is troublesome. Accordingly, it is possible to provide a vehicle-mounted device which is safe and convenient by suppressing the notification of a mail.

According to the invention, there is provided a vehicle-mounted device which is mounted on a vehicle and which is connected to a portable device having an E-mail function and an AV stream transmitting function by near field communication, including: a communication section for wirelessly communicating with the portable device by near field communication; a stream reproducing section for receiving and reproducing an AV stream transmitted from the portable device; and a first notification selecting section for selecting whether to notify an arrival of a new E-mail from the portable device while the stream reproducing section is reproducing the AV stream.

By employing this configuration, as the operation of the vehicle-mounted device when a mail is received while reproducing an AV stream, it can be set whether to notify the arrival of a new mail through the use of the setting picture in advance and the operation desired by the user can be performed depending on which of the AV streaming and the notification of the arrival of a new mail priority is given to.

The vehicle-mounted device according to the invention may further include: E-mail reading section for reading the received E-mail with voice; an stream reproduction interrupting section for interrupting the reproduction of the AV stream in the stream reproducing section; and a stream reproduction resuming section for resuming the reproduction of the AV stream, wherein when the first notification selecting section select that the arrival of a new E-mail should be notified to read the E-mail if the E-mail is received by the E-mail transmitting and receiving section during reproducing the AV stream, the stream reproduction interrupting section interrupts the reproduction of the AV stream, the E-mail reading section reads the received E-mail with voice, and the stream reproduction resuming section resumes the reproduction of the AV stream after the reading of the E-mail is ended.

By employing this configuration, as the operation of the vehicle-mounted device when a mail is received while reproducing an AV stream, it is possible to set whether to notify the arrival of a new mail through the use of the setting picture and whether to simultaneously read the mail when notifying the arrival of a new mail in advance and it is thus possible to perform an operation desired by a user when the corresponding use case occurs. Particularly, when the user is driving a vehicle, it is not necessary to perform any manipulation in the corresponding use case. The AV streaming is paused, the mail is then read, and the AV streaming is resumed, whereby the user can pay attention to only the driving.

According to the invention, there is provide a vehicle-mounted device which is mounted on a vehicle and which is connected to a portable device having an E-mail function by near field communication, including: a communication section for wirelessly communicating with the portable device by near field communication; an E-mail transmitting and receiving section for causing the portable device to transmit and receive an E-mail via the communication section; E-mail reading section for reading the received E-mail with voice; an interruption section for interrupting the reading of the E-mail in the E-mail reading section; a stream reproducing section for receiving and reproducing an AV stream transmitted from the portable device; a switching section for switching an audio source to another audio source; voice mode switching sensing section for sensing the interruption of the AV stream or the switching to another audio source; and a reading resuming section for resuming the reading of the E-mail under reading, wherein when the reproduction of the AV stream is requested to the portable device while the E-mail reading section is reading the E-mail with voice, the interruption section interrupts the reading of the E-mail with voice, the stream reproducing section receives and reproduces the AV stream transmitted from the portable device, the reading resuming section resumes the reading of the E-mail under reading with voice when the voice mode switching sensing section senses the switching to another audio source, and the switching section switches the audio source to another audio source after the reading of the E-mail with voice is ended.

By employing this configuration, even when the application is performing a process requiring a predetermined time such as a mail reading process, the vehicle-mounted device can reproduce an AV stream and it is possible to prescribe the operation of the vehicle-mounted device actualizing the multi-profile control of the A2DP, the AVRCP, the GAVDP, the AVDTP, the AVCTP, and the MAP. Since the reading of the E-mail is resumed after the reproduction of the AV stream is ended, the user can smoothly enter the operation performed before the reproduction of the AV stream and it is thus possible to implement a vehicle-mounted device which is convenient for use.

In the vehicle-mounted device according to the invention, when the voice mode switching sensing section senses the interruption of the AV stream while the E-mail reading section is reading the E-mail with voice, the reading resuming section may resume the reading of the E-mail under reading with voice.

The vehicle-mounted device according to the invention may further include a selection section for selecting whether to read the E-mail under reading from the beginning or to read the E-mail subsequently.

By employing this configuration, since the reading of the E-mail is resumed after the reproduction of the AV stream is ended, the user can smoothly enter the operation performed before the reproduction of the AV stream. When the reproduction time of the AV stream is long, the user has a high possibility of forgetting the details of the mail under reading before the reproduction of the AV stream. Accordingly, the mail may be read from the beginning in consideration thereof.

According to the invention, there is provided a vehicle-mounted device which is mounted on a vehicle and which is connected to a portable device having an E-mail function by near field communication, including: a communication section for wirelessly communicating with the portable device by near field communication; an E-mail transmitting and receiving section for causing the portable device to transmit and receive an E-mail via the communication section; a data communication section for performing data communication with the outside via the communication section; E-mail reading section for reading the received E-mail with voice; and a second notification selecting section for selecting whether to notify an arrival of a new E-mail from the portable device while the data communication section is performing the data communication.

By employing this configuration, the vehicle-mounted device can actualize the operation desired by the user.

In the vehicle-mounted device according to the invention, when an E-mail is received by the an E-mail transmitting and receiving section while outputting voice based on the data communication, the second notification selecting section may be able to select whether to notify the arrival of the new E-mail and to read the E-mail, or to only notify the arrival of the new E-mail and not to read the E-mail.

By employing this configuration, the vehicle-mounted device can actualize the operation desired by the user.

The vehicle-mounted device according to the invention may further include: a data communication interrupting section for interrupting the data communication by the data communication section; and a data communication resuming section for resuming the data communication by the data communication section, wherein when the second notification selecting section selects to notify the arrival of the new E-mail and to read the E-mail and the E-mail is received while outputting voice based on the data communication by the data communication section, the data communication interrupting section interrupts the data communication, the E-mail reading section reads the received mail of which the arrival is notified, and the data communication resuming section resumes the data communication after the reading of the E-mail is ended.

By employing this configuration, the vehicle-mounted device can perform an operation intended by the user. Particularly, when the user is driving a vehicle, it is not necessary to perform any manipulation in the corresponding use case, whereby the user can pay attention to only the driving.

According to the invention, there is provided a vehicle-mounted device which is mounted on a vehicle and which is connected to a portable device having a call function and an E-mail function by near field communication, including: a communication section for wirelessly communicating with the portable device by near field communication; an E-mail transmitting and receiving section for causing the portable device to transmit and receive an E-mail via the communication section; a data communication section for performing data communication with the outside via the communication section; E-mail reading section for reading the received E-mail with voice; a voice outputting section for outputting voice; a voice output determining section for determining whether voice based on the data communication is output; and a data communication continuing section for continuing data communication while the E-mail reading section is reading the received E-mail with voice, wherein when the voice output determining section determines that voice based on the data communication is not output, the data communication continuing section continues the data communication while the E-mail reading section is reading the E-mail.

By employing this configuration, it is possible to implement a vehicle-mounted device in which the MAP and the DUN can operate in a multi-profile manner. Particularly, since it is checked in advance that a voice based on the data communication is not output and the data communication is continued, the core of data is not interrupted, thereby performing an efficient data communication.

According to the invention, there is provided a control method of a vehicle-mounted device which is mounted on a vehicle and which is connected to a portable device having a call function, an E-mail function, and phone book data by near field communication, including: rejecting an arrival of a call from a specific opposite party using the call function; specifying a mail address of the opposite party from which the arrival of a call is rejected with reference to the phone book data; and suppressing the notification of reception of an E-mail transmitted to the portable device from the specified mail address.

By employing this configuration, when an arrival of a mail is rejected and a mail is received from the party from which the arrival of a mail is rejected, the notification of the arrival of a new mail is not performed. This is because a driver does another action for a certain reason, does not thus want to receive a call, and rejects the arrival of a call, whereby it is considered that the notification of the arrival of a mail is troublesome. Accordingly, it is possible to provide a vehicle-mounted device which is safe and convenient by suppressing the notification of a mail.

According to the invention, there is provided a control method of a vehicle-mounted device which is mounted on a vehicle and which is connected to a portable device having an E-mail function and an AV stream transmitting function by near field communication, including: receiving and reproducing an AV stream transmitted using the AV stream transmitting function; and selecting whether to notify an arrival of a new E-mail from the portable device while reproducing the AV stream on the basis of a previously-performed operation of a selection section performed.

By employing this configuration, as the operation of the vehicle-mounted device when a mail is received while reproducing an AV stream, it can be set whether to notify the arrival of a new mail through the use of the setting picture in advance and the operation desired by the user can be performed depending on which of the AV streaming and the notification of the arrival of a new mail priority is given to.

According to the invention, there is provided a control method of a vehicle-mounted device which is mounted on a vehicle and which is connected to a portable device having an E-mail function and an AV stream transmitting function by near field communication, wherein when the reproduction of an AV stream is requested to the portable device while reading an E-mail with voice, the reading of the E-mail with voice is interrupted, the AV stream transmitted from the portable device is received and reproduced, the interrupted reading of the E-mail with voice is resumed when the switching to another audio source is sensed, and the audio source is switched to another audio source after the reading of the E-mail with voice is ended.

By employing this configuration, even when the application is performing a process requiring a predetermined time such as a mail reading process, the vehicle-mounted device can reproduce an AV stream and it is possible to prescribe the operation of the vehicle-mounted device actualizing the multi-profile control of the A2DP, the AVRCP, the GAVDP, the AVDTP, the AVCTP, and the MAP. Since the reading of the E-mail is resumed after the reproduction of the AV stream is ended, the user can smoothly enter the operation performed before the reproduction of the AV stream and it is thus possible to implement a vehicle-mounted device which is convenient for use.

According to the invention, there is provided a control method of a vehicle-mounted device which is mounted on a vehicle and which is connected to a portable device having an E-mail function and a data communication function by near field communication, wherein when the portable device and the vehicle-mounted device perform data communication with each other, whether to notify an arrival of a new E-mail from the portable device is selected on the basis of a previously-performed operation by a selection section.

By employing this configuration, the vehicle-mounted device can actualize the operation desired by the user.

According to the invention, there is provided a control method of a vehicle-mounted device which is mounted on a vehicle and which is connected to a portable device having an E-mail function and a data communication function by near field communication, including: determining whether voice based on the data communication is output when the portable device and the vehicle-mounted device perform data communication with each other; and continuing the data communication while the E-mail reading section is reading the E-mail with voice when it is determined that voice based on the data communication is not output from the vehicle-mounted device.

By employing this configuration, it is possible to implement a vehicle-mounted device in which the MAP and the DUN can operate in a multi-profile manner. Particularly, since it is checked in advance that a voice based on the data communication is not output and the data communication is continued, the core of data is not interrupted, thereby performing an efficient data communication.

According to the invention, there is provided a vehicle-mounted device which is mounted on a vehicle and which is connected to a portable device having a call function and an E-mail function by near field communication, including: a communication section for wirelessly communicating with the portable device by near field communication; an E-mail transmitting and receiving section for causing the portable device to transmit and receive an E-mail via the communication section; an E-mail reading section for reading a received E-mail with voice; an interruption section for interrupting the reading of the E-mail by the E-mail reading section; a ringtone ringing section for ringing a ringtone for alerting an arrival of a call; a call receiving section for receiving an arriving call receiving operation; a call entering section for causing the vehicle-mounted device to enter a call state; a call end sensing section for sensing the end of the call; and a reading resuming section for resuming the reading of the E-mail under reading, wherein when an arrival of a call is sensed while the E-mail reading section is reading an E-mail with voice, the interruption section interrupts the reading of the E-mail, the ringtone ringing section rings a ringtone, and the call receiving section receives the call receiving operation, the call entering section causes the vehicle-mounted device to enter the call state, and the reading resuming section resumes the reading of the E-mail under reading when the telephone call end sensing section senses the end of the call. Here, the vehicle-mounted device may further include a selection section for selecting whether to read the E-mail under reading with voice from the beginning or to read the E-mail under reading subsequently.

By employing this configuration, even when the application of the vehicle-mounted device is performing a process requiring a predetermined time such as a mail reading process, the vehicle-mounted device can receive a call of the HFP and it is possible to prescribe the operation of the vehicle-mounted device actualizing the multi-profile control of the MAP and the HFP. Since the reading of the E-mail is resumed after the call is ended, the user can smoothly enter the operation performed before the call and it is thus possible to implement a vehicle-mounted device which is convenient for use. When the call time is long, the user has a high possibility of forgetting the details of the mail under reading before the call. Accordingly, the mail may be read from the beginning in consideration thereof.

According to the invention, there is provided a vehicle-mounted device which is mounted on a vehicle and which is connected to a portable device having a call function and an E-mail function by near field communication, including: a communication section for wirelessly communicating with the portable device by near field communication; an E-mail transmitting and receiving section for causing the portable device to transmit and receive an E-mail via the communication section; an E-mail reading section for reading a received E-mail with voice; an outgoing call sensing section for sensing an outgoing call via the communication section; an outgoing call selecting section for selecting whether to interrupt the reading of the E-mail and to send a call or to send a call after the reading of the E-mail is ended; and an interruption section for interrupting the reading of the E-mail by the E-mail reading section, wherein the interruption section interrupts the reading of the E-mail under reading and a call is sent when the outgoing call sensing section senses the outgoing call while the E-mail reading section is reading the E-mail with voice and the outgoing call selecting section selects to interrupt the reading of the E-mail under reading and to send a call, and a call is sent after the reading of the E-mail with voice is ended when the outgoing call selecting section selects to send a call after the reading of the E-mail is ended. Here, the vehicle-mounted device may further include a reading resuming section for resuming the reading of the E-mail under reading, wherein the reading resuming section resumes the reading of the E-mail under reading when the call state is entered and is then ended after the reading of the E-mail under reading is interrupted and a call is sent.

By employing this configuration, even when the application is performing a process requiring a predetermined time such as a mail reading process, the vehicle-mounted device can send an outgoing call of the HFP and it is possible to prescribe the operation of the vehicle-mounted device actualizing the multi-profile control of the MAP and the HFP. Since the selection picture is automatically displayed before sending the outgoing call, the user can smoothly enter the operation desired by the user. Particularly, even when the user unintentionally sends a call, the call can be sent after the end of the reading, which is confident to the user. When the user wants to send the outgoing call, the reading of the mail is resumed after the end of the call and thus the user can rapidly enter the operation performed before the call. Accordingly, it is thus possible to implement a vehicle-mounted device which is convenient for use.

According to the invention, there is provided a control method of a vehicle-mounted device which is mounted on a vehicle and which is connected to a portable device having a call function and an E-mail function by near field communication, including: reading the received E-mail with voice; interrupting the reading of the E-mail when an arrival of a call is sensed while reading the E-mail with voice; ringing a ringtone after interrupting the reading of the E-mail; receiving a call receiving operation while ringing the ringtone; entering a call state after receiving the call receiving operation; sensing the end of the call after entering the call state; and resuming the reading of the E-mail under reading when the end of the call is sensed.

By employing this configuration, even when the application of the vehicle-mounted device is performing a process requiring a predetermined time such as a mail reading process, the vehicle-mounted device can receive a call of the HFP and it is possible to prescribe the operation of the vehicle-mounted device actualizing the multi-profile control of the MAP and the HFP. Since the reading of the E-mail is resumed after the call is ended, the user can smoothly enter the operation performed before the call and it is thus possible to implement a vehicle-mounted device which is convenient for use.

According to the invention, there is provided a control method of a vehicle-mounted device which is mounted on a vehicle and which is connected to a portable device having a call function and an E-mail function by near field communication, including: sensing an outgoing call while reading an E-mail with voice; interrupting the reading of the E-mail under reading when it is selected to interrupt the reading of the E-mail under reading and to send a call; and sending a call after the reading of the E-mail with voice is ended when it is selected to send a call after the reading of the E-mail is ended.

By employing this configuration, even when the application is performing a process requiring a predetermined time such as a mail reading process, the vehicle-mounted device can send an outgoing call of the HFP and it is possible to prescribe the operation of the vehicle-mounted device actualizing the multi-profile control of the MAP and the HFP. Since the selection picture is automatically displayed before sending the outgoing call, the user can smoothly enter the operation desired by the user. Particularly, even when the user unintentionally sends a call, the call can be sent after the end of the reading, which is confident to the user.

According to the invention, there is provided a control method of a vehicle-mounted device which is mounted on a vehicle and which is connected to a portable device having a call function and an E-mail function by near field communication, including: acquiring a state under a call, or under an outgoing call, or under an incoming call; suppressing notification of the reception of an E-mail when the reception of the E-mail is sensed; and notifying the reception of the E-mail after the call is ended.

By employing this configuration, in the use case where a new mail arrives under a call or under an outgoing call or under an incoming call, the vehicle-mounted device operates so as to give priority to the call under a call or under an outgoing call or under an incoming call, to suppress the arrival of a new mail, and to notify the arrival of a new mail after the call is ended.

Accordingly, even when the application is performing the HFP process under a call, it is possible to receive a new mail of the MAP and to prescribe the operation of the vehicle-mounted device actualizing the multi-profile control of the MAP and the HFP. Since the user can continue to have a call without caring about other events such as the notification of the arrival of a new mail, it is possible to implement a vehicle-mounted device which can achieve the simplified manipulation and which is convenient for use.

According to the invention, there is provided a vehicle-mounted device which is mounted on a vehicle and which is connected to a portable device having a call function, an E-mail function, and phone book data by near field communication, including: a communication section for wirelessly communicating with the portable device by near field communication; a call section for having a call via the communication section; a call picture display section for displaying a call picture which is a display picture of information on a call status; a phone book acquiring section for acquiring the phone book data of the portable device via the communication section; an opposite party specifying section for specifying the opposite party under a call with reference to the phone book data; and a button arranging section for arranging a button on the picture displayed by the call picture display section, wherein the button arranged by the button arranging section is a button for acquiring at least one of an information piece of an outgoing mail to the opposite party under a call specified by the opposite party specifying section and an information piece of an incoming mail from the opposite party under a call.

According to this configuration, by providing a button which can enable the viewing of a mail received from the opposite party under the call and/or a mail transmitted to the opposite party under the call to the call picture, it is possible to check the mails exchanged with the opposite party of the call under the call by a slight manipulation and to implement the vehicle-mounted device which can actualize the multi-profile operation of the MAP and the HFP and which is convenient for use. Particularly, when the recently transmitted and received mails become the topic under the call, the user can simply check the details of the mail transmitted and received to and from the opposite party. Accordingly, the user can check the details of the mails immediately without causing the opposite party to wait.

The vehicle-mounted device according to the invention may further include: a traveling state determining section for determining whether the vehicle is traveling or stopped; and a traveling regulating section for determining whether to allow the press of the button arranged by the button arranging section on the basis of the determination result of the traveling state determining section, wherein the traveling regulating section determines that the press of the button arranged by the button arranging section is not allowed when the traveling state determining section determines that the vehicle is traveling, and the traveling regulating section determines that the press of the button arranged by the button arranging section is allowed when the traveling state determining section determines that the vehicle is stopped.

By employing this configuration, since the button is not allowed to press while the vehicle is traveling, the operation of viewing a mail under a call is not allowed. Accordingly, while the vehicle traveling, only the handsfree call is allowed for the user and thus the user can pay attention to only the driving.

The vehicle-mounted device according to the invention may further include: a button press sensing section for sensing the press of the button; a call and mail viewing picture display section for displaying a call and mail viewing picture on which at least one of an outgoing mail and an incoming mail with respect to the opposite party under a call; a search section for searching a folder in which outgoing and incoming mail information with respect to the opposite party under a call accumulated in the portable device is stored; a list acquiring section for acquiring a list of mail information stored in the folder searched by the search section; a viewing request section for requesting the portable device of viewing a mail included in the list of mail information acquired by the list acquiring section; a mail display section for displaying the mail requested by the viewing request section on the call and mail viewing picture; and a status change request section for requesting for changing a reading status of the mail requested by the viewing request section to an already-read state.

By employing this configuration, it is possible to browse a mail of a mobile phone using the MAP even under the HFP call. Accordingly, it is possible to implement the vehicle-mounted device which can actualize the multi-profile operation of the MAP and the HFP and which is convenient for use.

According to the invention, there is provided a vehicle-mounted device which is mounted on a vehicle and which is connected to a portable device having a call function, an E-mail function, and phone book data by near field communication, including: a communication section for wirelessly communicating with the portable device by near field communication; an E-mail transmitting and receiving section for causing the portable device to transmit and receive an E-mail via the communication section; a call section for having a call via the communication section; a destination determining section for determining whether the destination of an E-mail is the opposite party having a call via the call section when the E-mail is requested to transmit; and a notification changing section for changing a mail transmission state notifying method depending on the destination of the E-mail determined by the destination determining section.

By employing this configuration, when a mail is transmitted to the opposite party under a call, it can be determined that the opposite party of the call is equal to the destination of the mail and the user is not confused. Accordingly, the vehicle-mounted device can perform the notification without damaging the consistency. On the other hand, when a mail is transmitted to a party other than the opposite party under a call, it can be determined that the user may be confused and the consistency may be damaged. Accordingly, the vehicle-mounted device can perform the notification in consideration thereof.

The vehicle-mounted device according to the invention may further include: a call picture display section for displaying a call picture which is a display picture of information on a call status; a phone book acquiring section for acquiring the phone book data of the portable device via the communication section; an opposite party specifying section for specifying the opposite party under a call with reference to the phone book data; and a button arranging section for arranging a button on the picture displayed by the call picture display section, wherein the button arranged by the button arranging section is a button for transmitting an E-mail to the opposite part under a call specified by the opposite party specifying section, the destination determining section determines whether the destination of the E-mail is the opposite party depending on the press of the button, and the notification changing section displays a mail transmission picture in which the mail address of the opposite party under a call is designated as the destination.

By employing this configuration, when a mail is transmitted to the opposite party under a call, the mail transmitting picture having the mail address of the opposite party under the call as a destination can be started up by a slight manipulation and a mail can be transmitted. Accordingly, it is possible to implement the vehicle-mounted device which can actualize the multi-profile operation of the MAP and the HFP and which is convenient for use.

In the vehicle-mounted device according to the invention, when the button for transmitting an E-mail to the opposite party under a call is not pressed and the mail transmission picture is requested to start up, the destination determining section may determine that the destination of the E-mail is not the opposite party, the notification changing section may not display the mail transmission picture, and the E-mail may be transmitted to a party other than the opposite party after the call is ended.

By employing this configuration, it is possible to avoid a complicated operation of transmitting an E-mail to a party other than the opposite party under the call and thus to implement a vehicle-mounted device which provides consistency to the user in the vehicle.

The vehicle-mounted device according to the invention may further include: a traveling state determining section for determining whether the vehicle is traveling or stopped; and a traveling regulating section for determining whether to allow the press of the button arranged by the button arranging section on the basis of the determination result of the traveling state determining section, wherein the traveling regulating section determines that the press of the button arranged by the button arranging section is not allowed when the traveling state determining section determines that the vehicle is traveling, and the traveling regulating section determines that the press of the button arranged by the button arranging section is allowed when the traveling state determining section determines that the vehicle is stopped.

By employing this configuration, since the button is not allowed to press while the vehicle is traveling, the operation of viewing a mail under a call is not allowed. Accordingly, while the vehicle traveling, only the handsfree call is allowed for the user and thus the user can pay attention to only the driving.

According to the invention, there is provided a control method of a vehicle-mounted device which is mounted on a vehicle and which is connected to a portable device having a call function, an E-mail function, and a phone book function by near field communication, including: displaying a call picture when a call is taken using the call function; specifying the opposite party using the phone book function; and arranging a button for acquiring at least one of outgoing mail information to the opposite party and incoming mail information from the opposite party.

According to this configuration, by providing a button which can enable the viewing of a mail received from the opposite party under the call and/or a mail transmitted to the opposite party under the call to the call picture, it is possible to check the mails exchanged with the opposite party of the call under the call by a slight manipulation and to implement the vehicle-mounted device which can actualize the multi-profile operation of the MAP and the HFP and which is convenient for use. Particularly, when the recently transmitted and received mails become the topic under the call, the user can simply check the details of the mail transmitted and received to and from the opposite party. Accordingly, the user can check the details of the mails immediately without causing the opposite party to wait.

According to the invention, there is provided a control method of a vehicle-mounted device which is mounted on a vehicle and which is connected to a portable device having a call function and an E-mail function by near field communication, including: determining whether the destination of an E-mail is the opposite party of a call when the E-mail is requested to transmit while the call is being taken using the call function; and changing a notification method to a user depending on the determined destination of the E-mail and notifying the user of the E-mail.

By employing this configuration, when a mail is transmitted to the opposite party under a call, it can be determined that the opposite party of the call is equal to the destination of the mail and the user is not confused. Accordingly, the vehicle-mounted device can perform the notification without damaging the consistency. On the other hand, when a mail is transmitted to a party other than the opposite party under a call, it can be determined that the user may be confused and the consistency may be damaged. Accordingly, the vehicle-mounted device can perform the notification in consideration thereof.

Priority is claimed on Japanese Patent Application (Japanese Patent Application No. 2009-234777), filed on Oct. 9, 2009, Japanese Patent Application (Japanese Patent Application No. 2009-234778), field on Oct. 9, 2009, and Japanese Patent Application (Japanese Patent Application No. 2009-234779), field on Oct. 9, 2009, the contents of which are incorporated herein by reference.

INDUSTRIAL APPLICABILITY

The vehicle-mounted device according to the invention can be used usefully as a car navigation system, a car multimedia terminal, and a car audio which are mounted on a vehicle.

REFERENCE SIGNS LIST

1: NETWORK
10, 20: MOBILE PHONE
100: NAVIGATION DEVICE
101: NEAR FIELD COMMUNICATION UNIT
102: DISPLAY UNIT
103: INPUT UNIT
104: CONTROL UNIT
105: MICROPHONE
106: SPEAKER
107: STORAGE UNIT
108: VOICE CONVERTING UNIT
109: TRAVELING DETERMINING UNIT

The invention claimed is:

1. A vehicle-mounted device which is mounted on a vehicle and which is connected to a portable device having a call function and a function of exchanging a message by near field communication, the vehicle-mounted device comprising:
a controller which performs a multi-profile control of a Message Access Profile and a Hands Free Profile;
wherein the call function and the function of exchanging a message are performed by using the Message Access Profile used to exchange message information by connecting the portable device and vehicle-mounted device, and the Hands Free profile used to perform a hands free call function by connecting vehicle-mounted device and the portable device, and
wherein the controller for performing the multi-profile control of the Message Access Profile and the Hands Free Profile, includes:
a communication section that wirelessly communicates with the portable device by near field communication;
a message transmitting and receiving section that controls the portable device to transmit and receive a message via the communication section;
a message reading section that reads a received message with voice;
an outgoing call sensing section that senses that an outgoing call is in progress via the communication section;
an outgoing call selecting section provides a request to a user of said vehicle-mounted device, and based on a response to said request, performs physical selection between a) to interrupt the reading of the message with voice and to send the outgoing call before the reading of the message with voice is ended, and b) to not interrupt the reading of the message with voice and to send the outgoing call after the reading of the message with voice is ended,
wherein said request to said user occurs when the outgoing call sensing section senses that the outgoing call is in progress via the communication section while the message reading section is reading the received message with voice, and
wherein the selection made by the user is stored for determining whether to interrupt the reading of the message based on future outgoing calls; and
an interruption section that interrupts the reading of the message with voice by the message reading section, when the outgoing call sensing section senses the outgoing call while the message reading section is reading the message with voice.

2. The vehicle-mounted device according to claim 1, wherein the portable device has phone book data, the vehicle-mounted device further comprising:
a call section that has a call via the communication section;
a phone book acquiring section that acquires the phone book data of the portable device via the communication section;
a manipulation section that rejects an arrival of a call at the call section;
a specification section that specifies a mail address of the opposite party from which the arrival of the call is rejected by the manipulation section with reference to the phone book data; and
a call-rejected party mail-reception notification suppressing section that suppresses a notification of reception of a message from the mail address specified by the specification section to the vehicle-mounted device.

3. The vehicle-mounted device according to claim 1, further comprising:
a telephone communication section that has a call via the communication section;
a mail reception sensing section that senses reception of a message;
a state acquiring section that acquires the state of the call section under a call, or under an outgoing call, or under an incoming call;
a notification section that notifies the reception of the message; and
a suppression section that suppresses the notification by the notification section,
wherein when the mail reception sensing section senses the reception of the message in the state acquiring section acquires that the call section is under a call, or under an outgoing call, or under an incoming call, the suppression section suppresses the notification by the notification section and the notification section notifies the reception of the message after the call by the call section is ended.

4. The vehicle-mounted device according to claim 1, wherein the portable device has a message function and an AV stream transmitting function, the vehicle-mounted device further comprising:
a stream reproducing section that receives and reproduces an AV stream transmitted from the portable device;
a first notification selecting section that selects whether to notify an arrival of a new message from the portable device while the stream reproducing section is reproducing the AV stream;
a message reading section that reads the received message with voice;

an stream reproduction interrupting section that interrupts the reproduction of the AV stream in the stream reproducing section; and a stream reproduction resuming section that resumes the reproduction of the AV stream, wherein when the first notification selecting section selects that the arrival of the new message should be notified to read the message if the message is received by the message transmitting and receiving section during reproducing the AV stream, the stream reproduction interrupting section interrupts the reproduction of the AV stream, the message reading section reads the received message with voice, and the stream reproduction resuming section resumes the reproduction of the AV stream after the reading of the message is ended.

5. The vehicle-mounted device according to claim 1, wherein the portable device has a message function and a data communication function, the vehicle-mounted device further comprising:

a data communication section that performs data communication with the outside via the communication section;

a second notification selecting section that selects whether to notify an arrival of a new message from the portable device while the data communication section is performing the data communication;

a data communication interrupting section that interrupts the data communication by the data communication section; and a data communication resuming section that resumes the data communication by the data communication section, wherein when a message is received by the message transmitting and receiving section while outputting voice based on the data communication, the second notification selecting section can select to notify the arrival of the new message and to read the message with voice, or to only notify the arrival of the new message and not to read the message with voice; and wherein when the second notification selecting section selects to notify the arrival of the new message and to read the message with voice and the message is received while outputting voice based on the data communication by the data communication section, the data communication interrupting section interrupts the data communication, the message reading section reads the received mail of which the arrival is notified, and the data communication resuming section resumes the data communication after the reading of the message is ended.

6. The vehicle-mounted device according to claim 1, further comprising:

a reading resuming section that resumes the reading of the message under reading, wherein the reading resuming section resumes the reading of the message under reading when the call state is entered and is then ended after the reading of the message under reading is interrupted and a call is sent.

7. The vehicle-mounted device according to claim 1, further comprising:

a ringtone ringing section that rings a ringtone for alerting an arrival of a call;

a call receiving section that receives an arriving call receiving operation;

a call entering section that causes the vehicle-mounted device to enter a call state;

a call end sensing section that senses the end of the call; and a reading resuming section that resumes the reading of the message under reading, wherein when an arrival of a call is sensed while the message reading section is reading a message with voice, the interruption section interrupts the reading of the message, the ringtone ringing section rings a ringtone, and the call receiving section receives the call receiving operation, the call entering section causes the vehicle-mounted device to enter the call state, and the reading resuming section resumes the reading of the message under reading when the telephone call end sensing section senses the end of the call.

8. The vehicle-mounted device according to claim 1, wherein the portable device has phone book data, the vehicle-mounted device comprising:

a call section that has a call via the communication section;

a call picture display section that displays a call picture which is a display picture of information on a call status;

a phone book acquiring section that acquires the phone book data of the portable device via the communication section;

an opposite party specifying section that specifies the opposite party under a call with reference to the phone book data; and a button arranging section that arranges a button on the picture displayed by the call picture display section, wherein the button arranged by the button arranging section is a button for acquiring at least one of an information piece of an outgoing mail to the opposite party under a call specified by the opposite party specifying section and an information piece of an incoming mail from the opposite party under a call.

9. The vehicle-mounted device according to claim 1, wherein the portable device has phone book data, the vehicle-mounted device comprising:

a call section that has a call via the communication section;

a destination determining section that determines whether the destination of a message is the opposite party having a call via the call section when the message is requested to transmit; and a notification changing section that changes a mail transmission state notifying method depending on the destination of the message determined by the destination determining section.

10. The vehicle mounted device of claim 1, wherein the controller performs the multi-profile control of the Message Access Profile and the Hands Free Profile simultaneously.

* * * * *